US009087151B2

(12) United States Patent
Nakai et al.

(10) Patent No.: US 9,087,151 B2
(45) Date of Patent: Jul. 21, 2015

(54) PROGRAM ANALYSIS SUPPORT DEVICE

(75) Inventors: Satoru Nakai, Tokyo (JP); Hirohisa Furuta, Tokyo (JP); Akira Ishihara, Tokyo (JP); Kimiaki Sato, Tokyo (JP); Takashi Tsuboi, Tokyo (JP); Akira Kaneko, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 393 days.

(21) Appl. No.: 13/144,037

(22) PCT Filed: Aug. 11, 2009

(86) PCT No.: PCT/JP2009/064163
§ 371 (c)(1),
(2), (4) Date: Jul. 11, 2011

(87) PCT Pub. No.: WO2010/095289
PCT Pub. Date: Aug. 26, 2010

(65) Prior Publication Data
US 2011/0270424 A1    Nov. 3, 2011

(30) Foreign Application Priority Data

Feb. 18, 2009    (JP) ................. 2009-034895

(51) Int. Cl.
*G05B 19/42* (2006.01)
*G06F 11/36* (2006.01)
(52) U.S. Cl.
CPC .................. *G06F 11/3604* (2013.01)
(58) Field of Classification Search
CPC ................. G06F 11/3604; G05B 2219/13004; G05B 2219/13128
USPC .......................................... 700/87
See application file for complete search history.

(56) References Cited

U.S. PATENT DOCUMENTS 5,586,335 A * 12/1996 Utan ............................ 700/18
2002/0120636 A1   8/2002 Ishizaka et al.
(Continued)

FOREIGN PATENT DOCUMENTS

CN         1677290 A    10/2005
JP         9 16389      1/1997
(Continued)

OTHER PUBLICATIONS

Combined Taiwanese Office Action and Search Report issued May 31, 2013 in Patent Application No. 098134579 with Partial English Translation.
(Continued)

*Primary Examiner* — Robert Fennema
*Assistant Examiner* — Sivalingam Sivanesan
(74) *Attorney, Agent, or Firm* — Oblon, McClelland, Maier & Neustadt, L.L.P.

(57) ABSTRACT

A program analysis support device that can freely combine program analysis conditions and can realize desired program analysis. An analysis condition setting part inputs a program analysis condition in a form of a conditional equation (analysis command, an analysis subject, and analysis condition) having an inherent equation number. A POU list extraction processing executing part executes an analysis command that reads a program to generate a collection of POUs serving as analysis subjects constituting the program, and a variable use list extraction processing executing part executes an analysis command that extracts a cross-reference of a variable to extract a cross-reference of a variable to the POU collection serving as the analysis subject. Both the parts further extract a cross-reference of a variable to another POU collection. An AND processing part further performs processing of a logical product of the cross-references of both the variables and outputs a result thereof to an analysis result display part.

16 Claims, 68 Drawing Sheets

HARDWARE CONFIGURATION

(56) References Cited

U.S. PATENT DOCUMENTS

| | | | |
|---|---|---|---|
| 2005/0085928 A1* | 4/2005 | Shani | 700/18 |
| 2005/0222697 A1* | 10/2005 | Inoue et al. | 700/87 |
| 2006/0247806 A1* | 11/2006 | Inoue et al. | 700/86 |
| 2009/0125130 A1* | 5/2009 | Eldridge et al. | 700/87 |
| 2011/0283255 A1* | 11/2011 | Ito et al. | 717/106 |

FOREIGN PATENT DOCUMENTS

| | | |
|---|---|---|
| JP | 2002-251391 | 9/2002 |
| JP | 2003-36170 | 2/2003 |
| JP | 2004 5060 | 1/2004 |
| JP | 2005-316986 | 11/2005 |
| JP | 2005 316986 | 11/2005 |
| JP | 2006-294011 | 10/2006 |
| JP | 2006-294013 | 10/2006 |
| JP | 2007 122370 | 5/2007 |
| JP | 2008-293486 | 12/2008 |

OTHER PUBLICATIONS

International Search Report issued Nov. 17, 2009 in PCT/JP09/64163 filed Aug. 11, 2009.

International Preliminary Report on Patentability issued Sep. 22, 2011, in PCT/JP2009/064163.

English translation of the Written Opinion of the International Searching Authority issued Nov. 17, 2009, in PCT/JP2009/064163.

"Operation Maintenance Programming", GX Developer Version 8, Operating Manual, 6.4.17., Apr. 2008, 6 pages.

"CX-Programmer, Ver. 7.0", Operation Manual, OMRON Corporation, Jul. 2006, 9 pages.

Takao Shimomura, "Program slicing technique and application" Kyoritsu Shuppan Co. Ltd, Jul. 7, 1995, 5 pages.

Combined Chinese Office Action and Search Report Issued Feb. 17, 2013 in Patent Application No. 200980156859.9 (with partial English translation).

* cited by examiner

F I G . 1
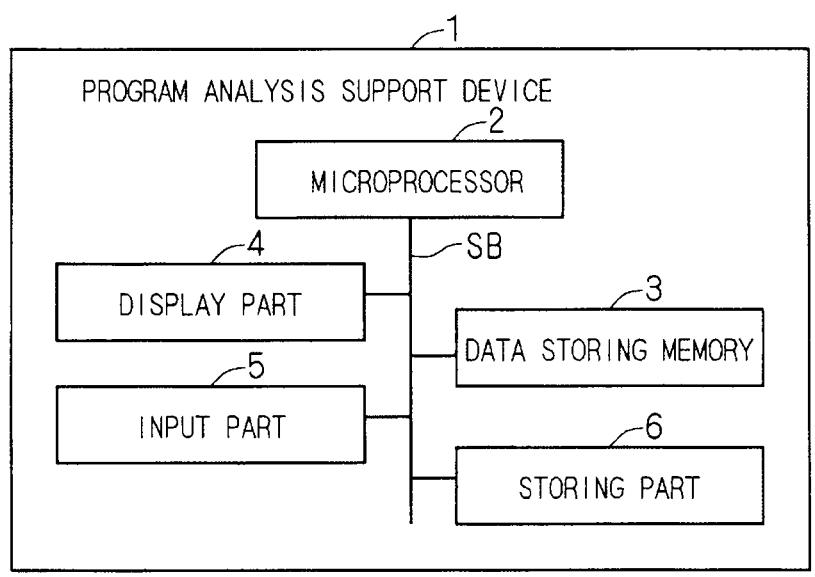
HARDWARE CONFIGURATION

F I G . 2
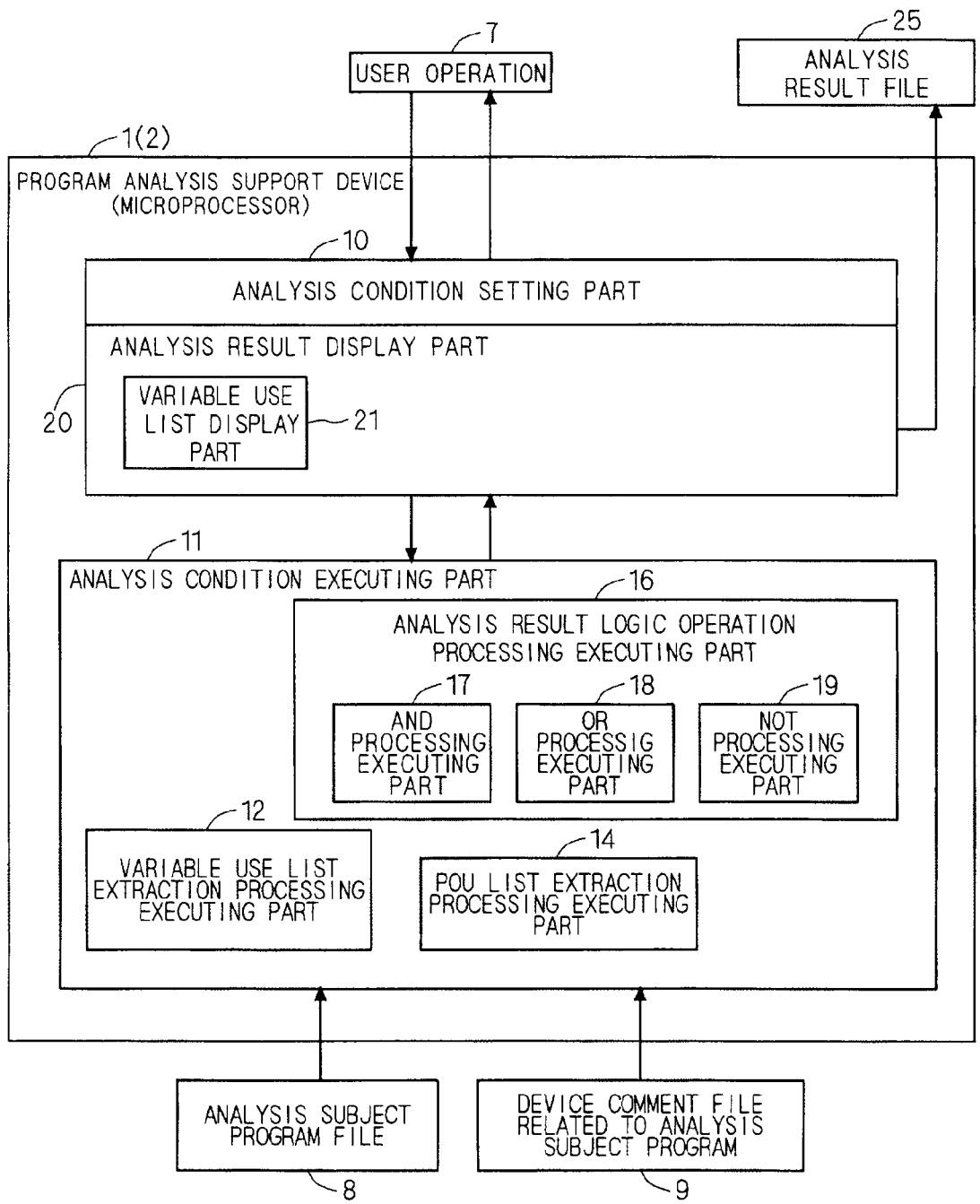

F I G . 4

MAIN LADDER IL

| STEP NUMBER | INSTRUCTION | OPERAND |
|---|---|---|
| 0 | LD= | D0 |
|  |  | D1 |
| 3 | OUT | M1 |
| 4 | LD | X222 |
| 5 | SET | M3 |
| 6 | LD | M3 |
| 7 | RST | M4 |
| 8 | LDI | X223 |
| 9 | AND= | D2 |
|  |  | D3 |
| 12 | OUT | M5 |
| 13 | OUT | M6 |

F I G . 6

SUB-LADDER CIRCUIT

| STEP NUMBER | INSTRUCTION | OPERAND |
|---|---|---|
| 0 | LDI | M4 |
| 1 | OR | M5 |
| 2 | OUT | M7 |
| 3 | OUT | M8 |
| 4 | LDI | M6 |
| 5 | MOV | D4 |
|  |  | D5 |
| 8 | AND | M7 |
| 9 | OUT | YOC10 |

FIG. 7

PROGRAM ANALYSIS SUPPORT SCREEN S001~S010

PROGRAM ANALYSIS SUPPORT SCREEN

[EXECUTION]

PROGRAM ANALYSIS CONDITION

| EQUATION NUMBER | ANALYSIS COMMAND | ANALYSIS SUBJECT (FIRST ARGUMENT) | ANALYSIS CONDITION (SECOND ARGUMENT) | NUMBER OF RESULTS |
|---|---|---|---|---|
| ● S001 | POU_READ ▶ | MAIN | | 1 |
| ● S002 | VAR_REF ▶ | S001 | M | 6 |
| ● S003 | POU_READ ▶ | SUB | | 1 |
| ● S004 | VAR_REF ▶ | S003 | M | 6 |
| ● S005 | AND ▶ | S002 | S004 | 6 |
| ● S006 | OR ▶ | S002 | S004 | 12 |
| ● S007 | NOT ▶ | S002 | S003 | 3 |
| ● S008 | OR ▶ | S001 | M | 2 |
| ● S009 | VAR_REF ▶ | S008 | | 12 |
| ● S010 | VAR_REF ▶ | S008 | M[0-9],M[20-29] | 12 |

PROGRAM ANALYSIS SUPPORT SCREEN S001~S010

PROGRAM ANALYSIS SUPPORT SCREEN

[EXECUTION]

| EQUATION NUMBER | PROGRAM ANALYSIS CONDITION | NUMBER OF RESULTS |
|---|---|---|
| ● S001 | POU_READ ( MAIN ) | 1 |
| ● S002 | VAR_REF ( S001 , M ) | 6 |
| ● S003 | POU_READ ( SUB ) | 1 |
| ● S004 | VAR_REF ( S003 , M ) | 7 |
| ● S005 | AND ( S002 , S004 ) | 6 |
| ● S006 | OR ( S002 , S004 ) | 13 |
| ● S007 | NOT ( S002 , S004 ) | 3 |
| ● S008 | OR ( S001 , S003 ) | 2 |
| ● S009 | VAR_REF ( S008 , M ) | 13 |
| ● S010 | VAR_REF ( S008 , M[0-9],M[20-29] ) | 13 |

F I G . 1 1

VAR_REF RESULT DISPLAY SCREEN S002

| DEVICE | PROGRAM NAME | STEP NUMBER | INSTRUCTION |
|--------|--------------|-------------|-------------|
| M1 | MAIN | 3 | —( )— |
| M3 | MAIN | 5 | —[SET]— |
| M3 | MAIN | 6 | —⊢⊢— |
| M4 | MAIN | 7 | —[RST]— |
| M5 | MAIN | 12 | —( )— |
| M6 | MAIN | 13 | —( )— |

FIG. 12

VAR_REF RESULT DISPLAY SCREEN S002

VAR_REF RESULT DISPLAY SCREEN S002

| DEVICE | COMMENT | PROGRAM NAME | STEP NUMBER | INSTRUCTION |
|---|---|---|---|---|
| M1 | | MAIN | 3 | —( )— |
| M3 | ACTIVATION SIGNAL | MAIN | 5 | —[SET]— |
| M3 | ACTIVATION SIGNAL | MAIN | 6 | —\|  \|— |
| M4 | ACTIVATION SIGNAL INVERSION | MAIN | 7 | —[RST]— |
| M5 | | MAIN | 12 | —( )— |
| M6 | | MAIN | 13 | —( )— |

F I G . 1 3

VAR_REF RESULT SCREEN S004

VAR_REF RESULT DISPLAY SCREEN S004

| DEVICE | PROGRAM NAME | STEP NUMBER | INSTRUCTION |
|---|---|---|---|
| M4 | SUB | 0 | —I/I— |
| M5 | SUB | 1 | ⊔⊓ |
| M6 | SUB | 6 | —I/I— |
| M7 | SUB | 2 | —( )— |
| M7 | SUB | 8 | —I— |
| M8 | SUB | 3 | —( )— |

FIG. 16

AND RESULT VAR_REF SCREEN S005

VAR_REF RESULT DISPLAY SCREEN S005

| DEVICE | PROGRAM NAME | STEP NUMBER | INSTRUCTION |
|---|---|---|---|
| M4 | MAIN | 7 | —[RST]— |
| M4 | SUB | 0 | —|/|— |
| M5 | MAIN | 12 | —( )— |
| M5 | SUB | 1 | ⊣⊢ |
| M6 | MAIN | 13 | —( )— |
| M6 | SUB | 6 | —|/|— |

F I G . 1 9

OR RESULT VAR_REF SCREEN S006

VAR_REF RESULT DISPLAY SCREEN S006

| DEVICE | PROGRAM NAME | STEP NUMBER | INSTRUCTION |
|--------|--------------|-------------|-------------|
| M1 | MAIN | 3 | —( )— |
| M3 | MAIN | 5 | —[SET]— |
| M3 | MAIN | 6 | —| |— |
| M4 | MAIN | 7 | —[RST]— |
| M4 | SUB | 0 | —|/|— |
| M5 | MAIN | 12 | —( )— |
| M5 | SUB | 1 | —| |— |
| M6 | MAIN | 13 | —( )— |
| M6 | SUB | 6 | —|/|— |
| M7 | SUB | 2 | —( )— |
| M7 | SUB | 8 | —| |— |
| M8 | SUB | 3 | —( )— |

FIG. 22

NOT RESULT VAR_REF SCREEN S007

VAR_REF RESULT DISPLAY SCREEN S007

| DEVICE | PROGRAM NUMBER | STEP NUMBER | INSTRUCTION |
|---|---|---|---|
| M1 | MAIN | 3 | —( )— |
| M3 | MAIN | 5 | —[SET]— |
| M3 | MAIN | 6 | —| |— |

F I G . 2 4
LADDER STRUCTURE
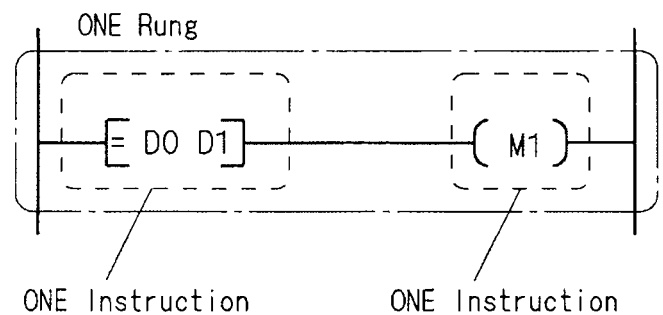
F I G . 2 5
EXPLANATION OF Instruction/Operator/Operand
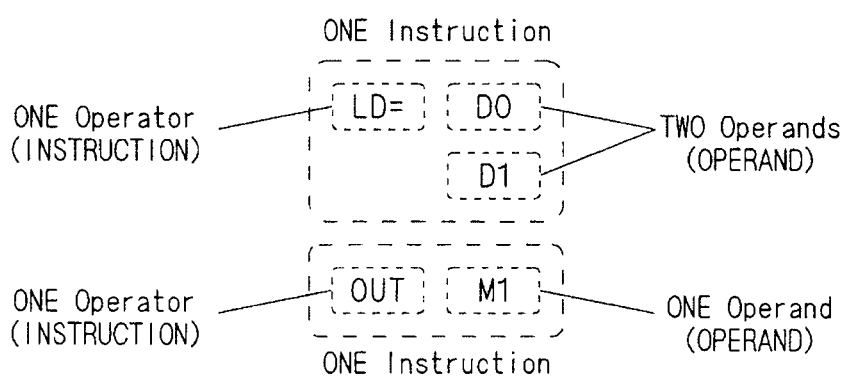

F I G . 2 6
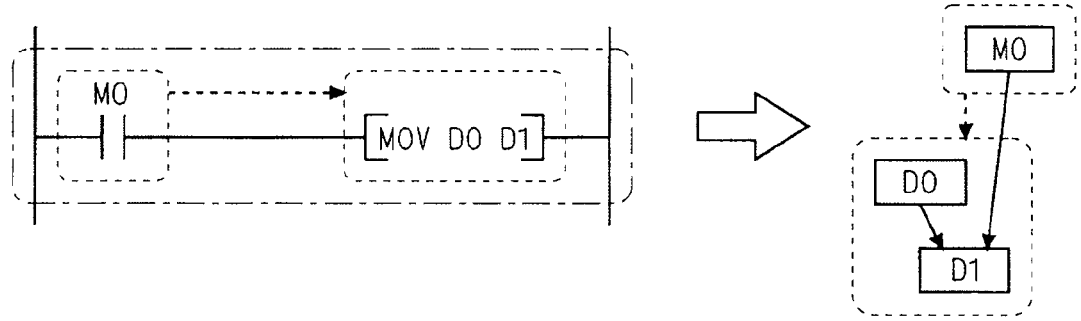
F I G . 2 7
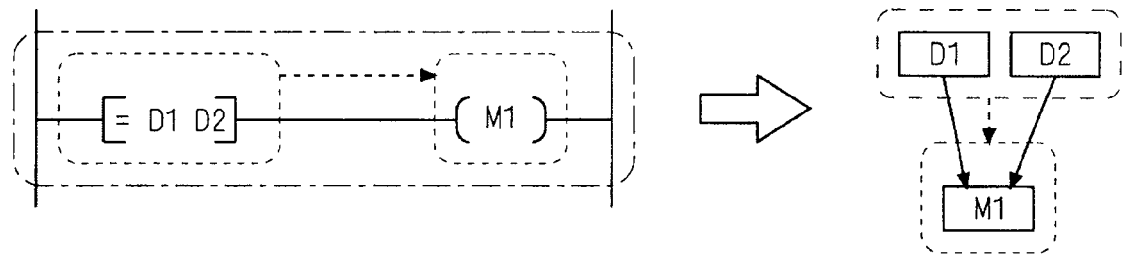

FIG. 28
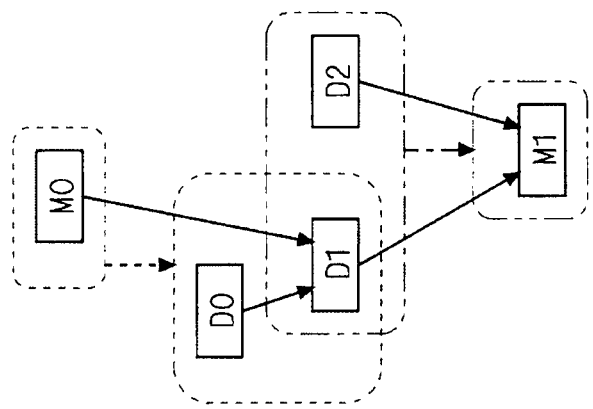
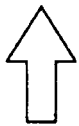
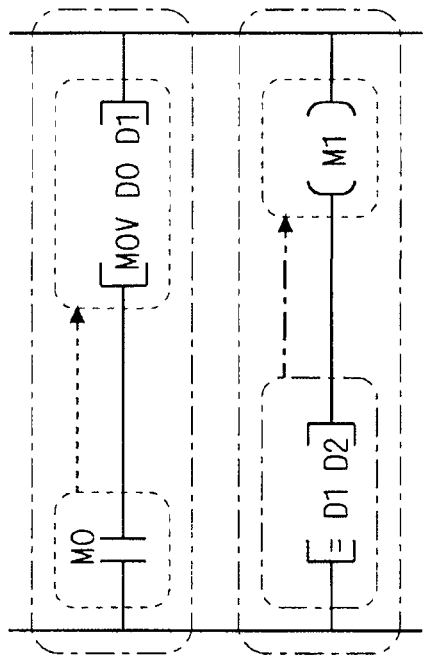

FIG. 29

PROGRAM ANALYSIS SUPPORT SCREEN S011~S019

PROGRAM ANALYSIS SUPPORT SCREEN

[EXECUTION]

| EQUATION NUMBER | ANALYSIS COMMAND | | ANALYSIS OBJECT (FIRST ARGUMENT) | ANALYSIS CONDITION (SECOND ARGUMENT) | NUMBER OF RESULTS |
|---|---|---|---|---|---|
| ● S011 | VAR_FWD | ▶ | S008 | X222 | 1 |
| ● S012 | VAR_FWD | ▶ | S008 | X223 | 1 |
| ● S013 | OR | ▶ | S011 | S012 | 1 |
| ● S014 | VAR_FWD | ▶ | S008 | X222,X223 | 1 |
| ● S015 | VAR_BWD | ▶ | S008 | YC10 | 1 |
| ● S016 | AND | ▶ | S014 | S015 | 1 |
| ● S017 | AND | ▶ | S015 | S014 | 1 |
| ● S018 | VAR_REF | ▶ | S011 | | 9 |
| ● S019 | VAR_REF | ▶ | S011 | M | 7 |

BT

FIG. 31
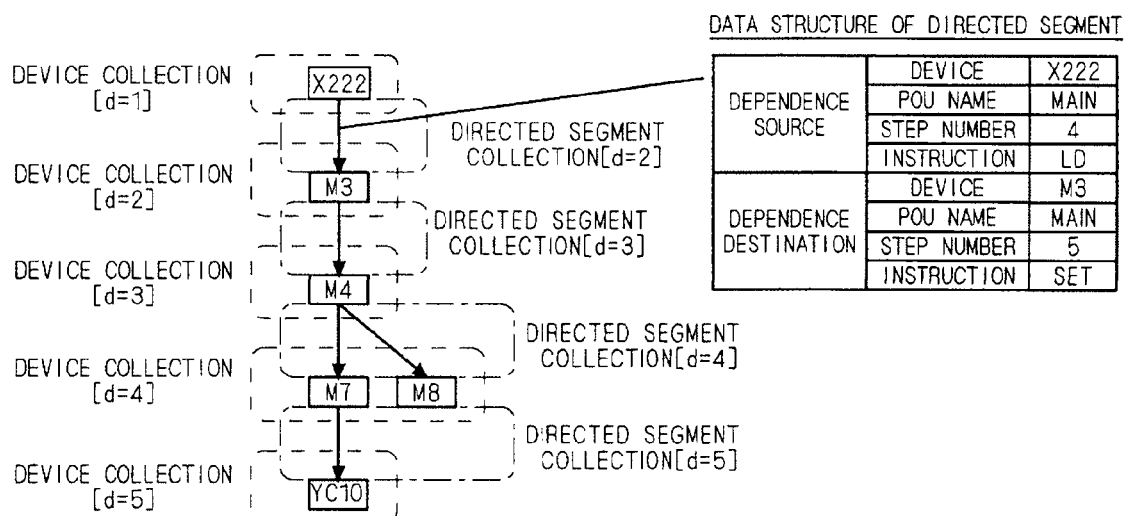
VAR_FWD RESULT DIRECTED GRAPH S011
WHEN RELATED DEVICE COMMENT IS ABSENT
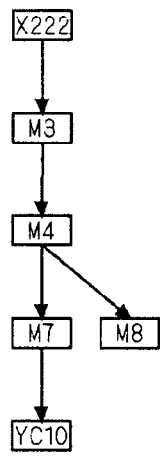
WHEN RELATED DEVICE COMMENT IS PRESENT
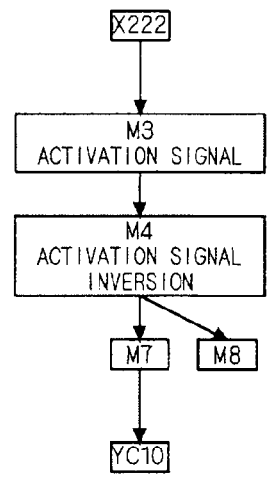

F I G . 3 2
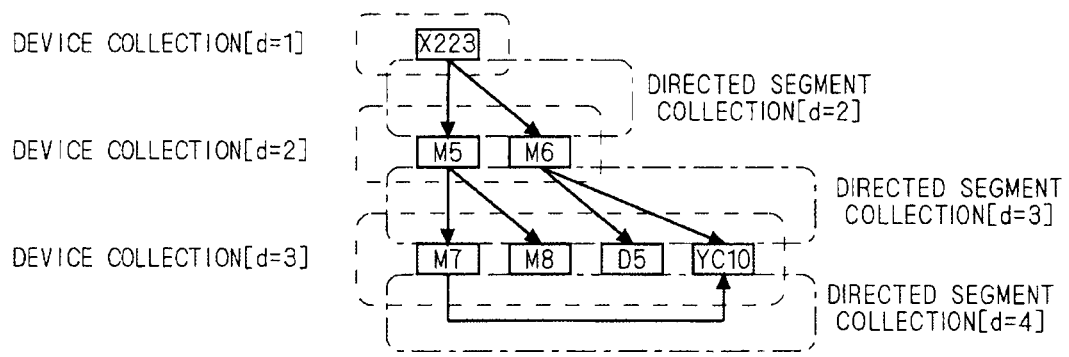

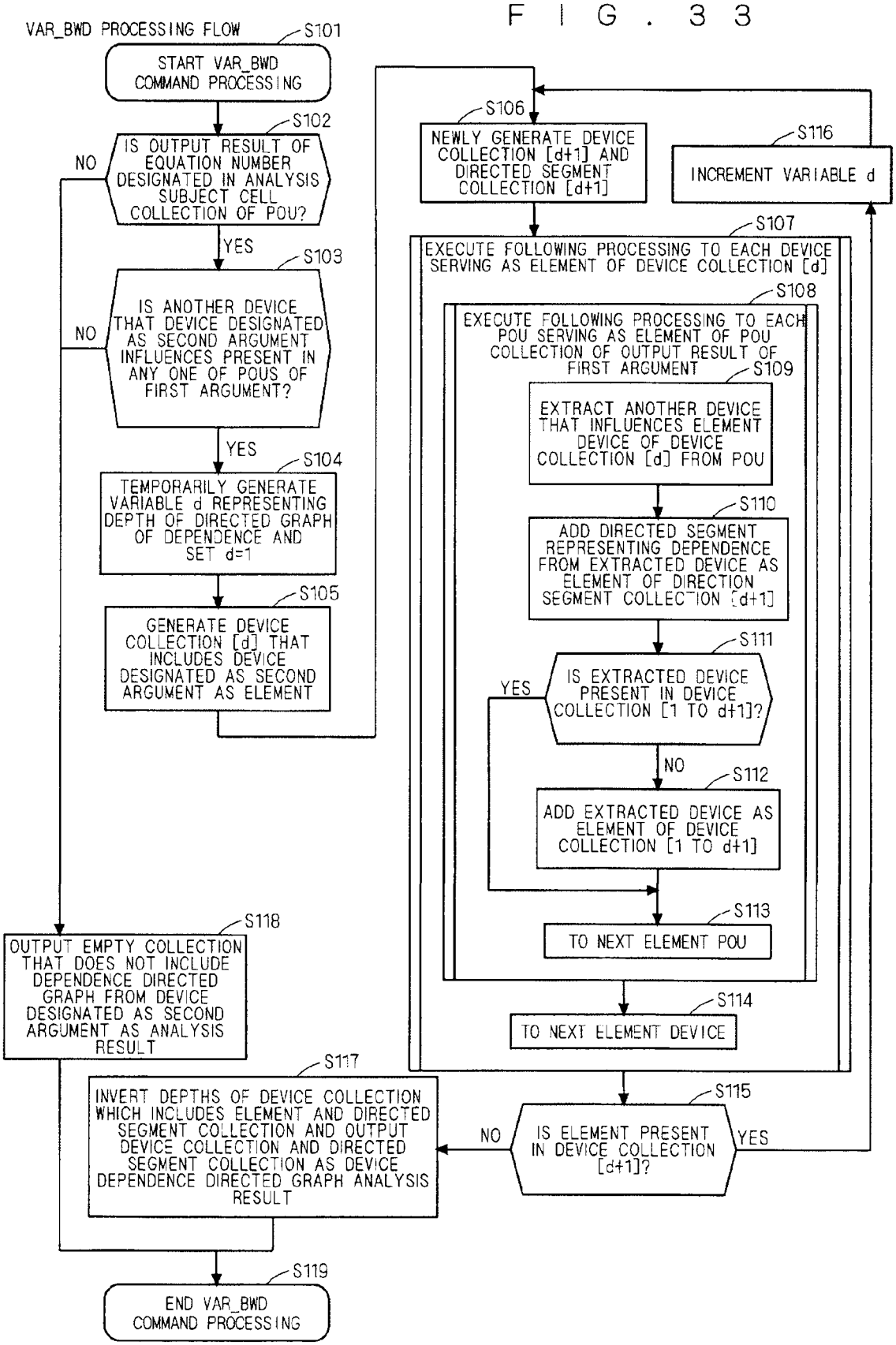

FIG. 34
VAR_BWD RESULT DIRECTED GRAPH S015
INVERT NUMBERS OF COLLECTIONS FOR OBTAINED RESULT
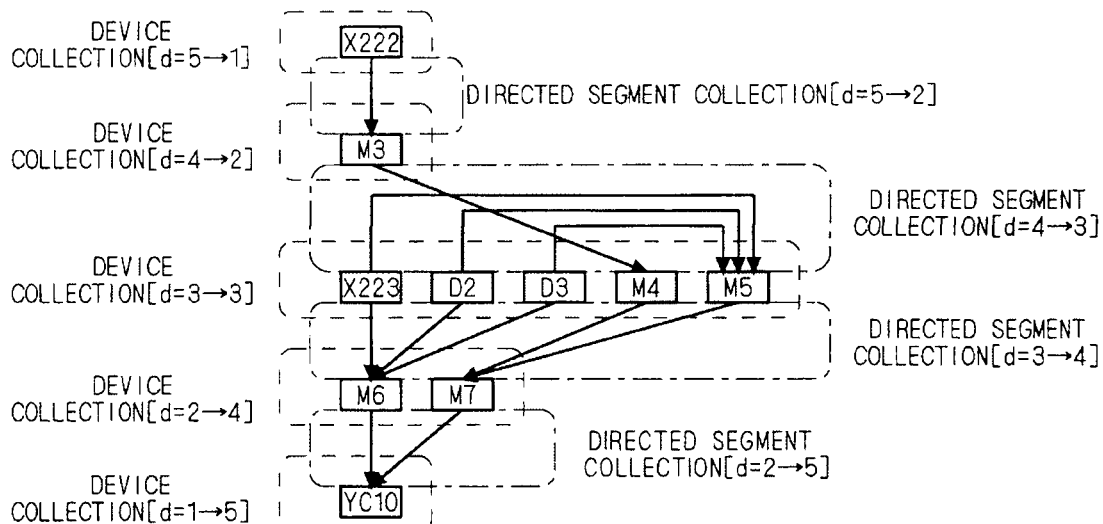
MOVE DIRECTED SEGMENT TO DEPTH TO WHICH DIRECTED SEGMENT SHOULD BELONG
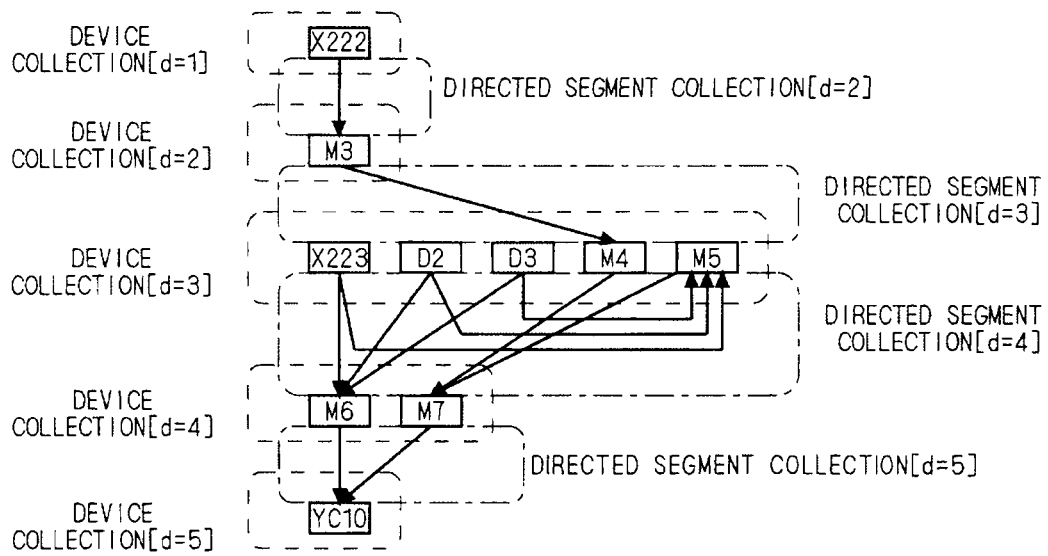

F I G . 3 6
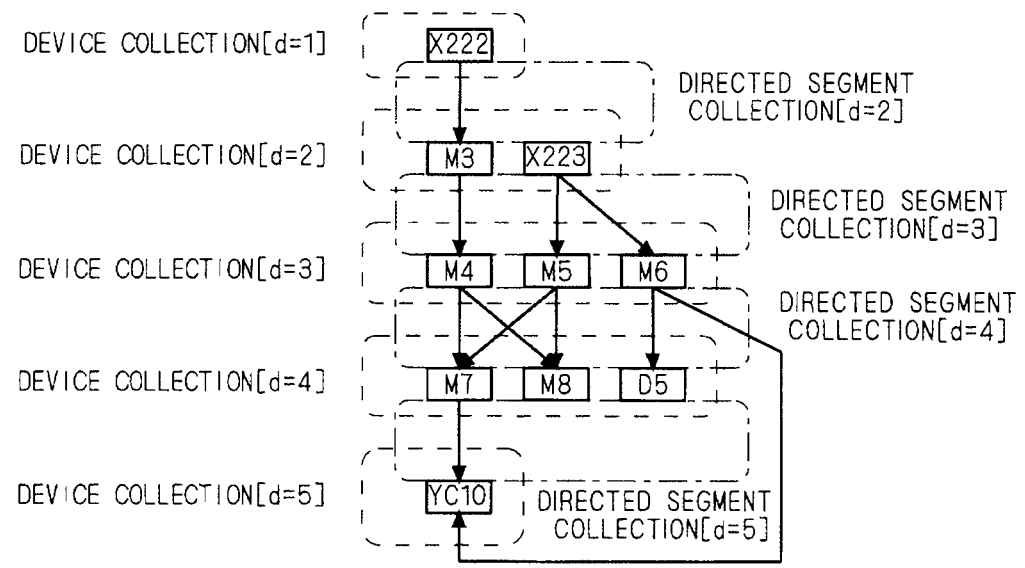

FIG. 38
AND RESULT VAR DIRECTED GRAPH S016/S017
S016 : RESULT OF AND (S014, S015)
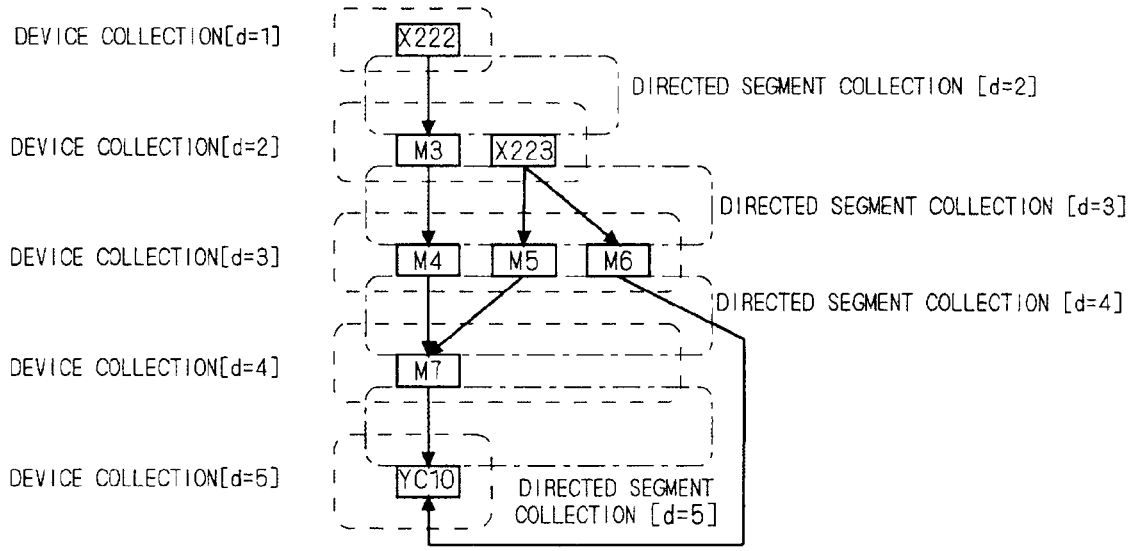
S017 : RESULT OF AND (S015, S014)
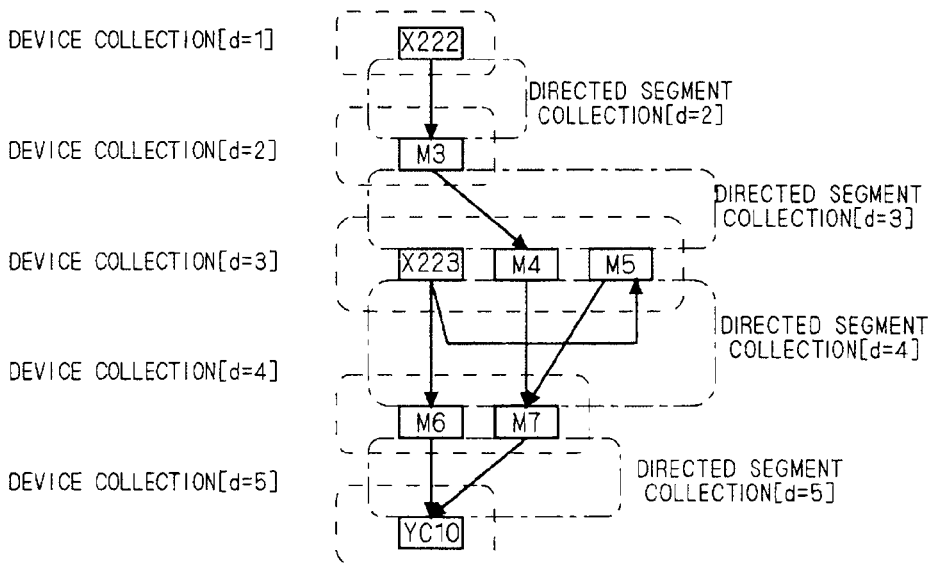

FIG. 40

VAR_REF RESULT SCREEN S018

VAR_REF RESULT DISPLAY SCREEN S018

| DEVICE | PROGRAM NAME | STEP NUMBER | INSTRUCTION |
|---|---|---|---|
| M3 | MAIN | 5 | —[SET]— |
| M3 | MAIN | 6 | —\|\|— |
| M4 | MAIN | 7 | —[RST]— |
| M4 | SUB | 0 | —\|/\|— |
| M7 | SUB | 2 | —( )— |
| M7 | SUB | 8 | —\|\|— |
| M8 | SUB | 3 | —( )— |
| X222 | MAIN | 4 | —\|\|— |
| YC10 | SUB | 9 | —( )— |

F I G . 4 1

VAR_REF RESULT SCREEN S019
VAR_REF RESULT DISPLAY SCREEN S019

| DEVICE | PROGRAM NAME | STEP NUMBER | INSTRUCTION |
|---|---|---|---|
| M3 | MAIN | 5 | —[SET]— |
| M3 | MAIN | 6 | —∣ ∣— |
| M4 | MAIN | 7 | —[RST]— |
| M4 | SUB | 0 | —∣/∣— |
| M7 | SUB | 2 | —( )— |
| M7 | SUB | 8 | —∣ ∣— |
| M8 | SUB | 3 | —( )— |

F I G . 4 2
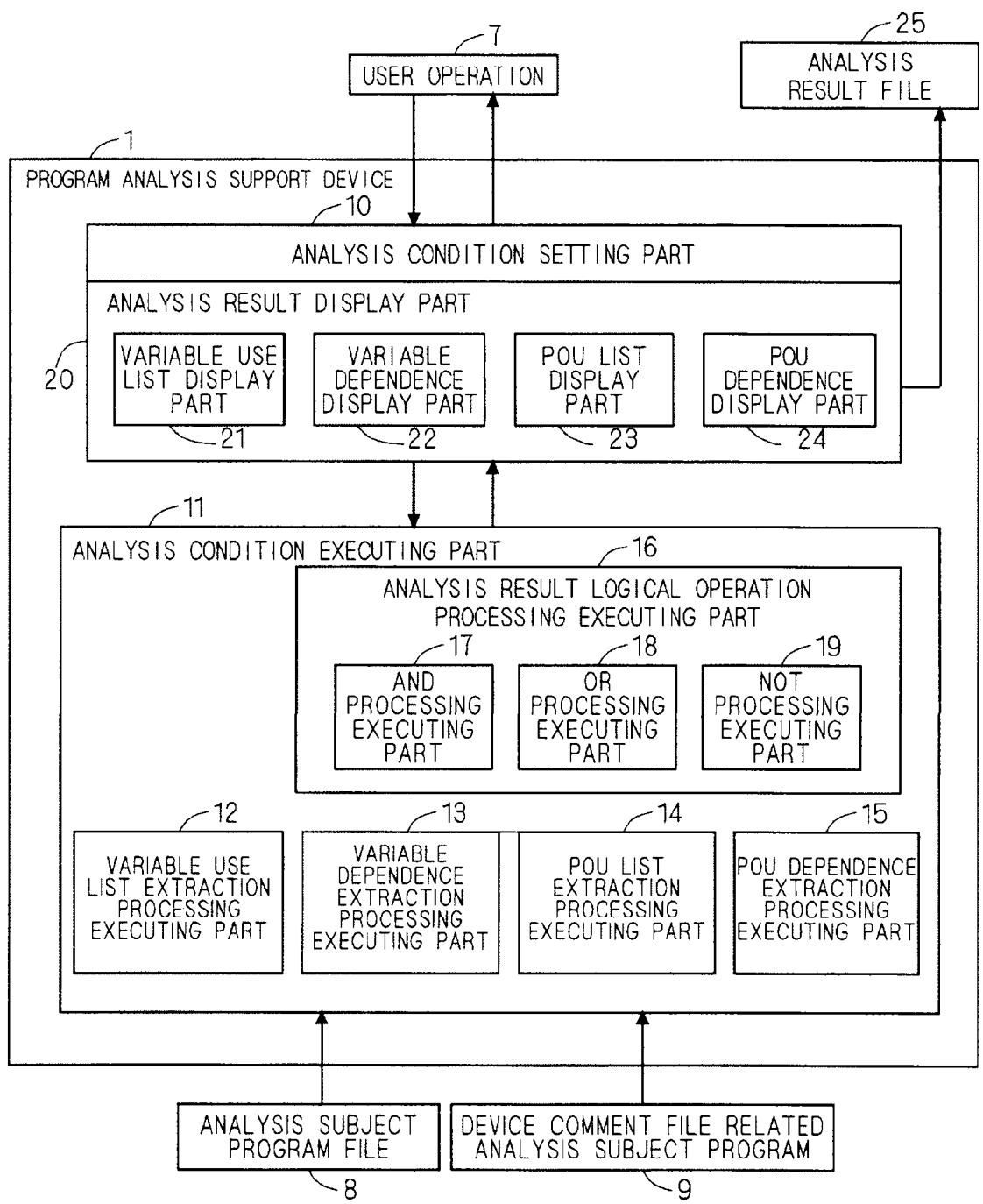

F I G. 4 4

PROGRAM ANALYSIS SUPPORT SCREEN S020~S027

PROGRAM ANALYSIS SUPPORT SCREEN

[EXECUTION]

| EQUATION NUMBER | ANALYSIS COMMAND | | ANALYSIS SUBJECT (FIRST ARGUMENT) | ANALYSIS CONDITION (SECOND ARGUMENT) | NUMBER OF RESULTS |
|---|---|---|---|---|---|
| ● S020 | POU_READ | ▶ | | | 21 |
| ● S021 | POU_FWD | ▶ | S020 | MAIN | 1 |
| ● S022 | POU_FWD | ▶ | S020 | SUB1 | 1 |
| ● S023 | OR | ▶ | S021 | S022 | 1 |
| ● S024 | POU_FWD | ▶ | S020 | MAIN,SUB1 | 1 |
| ● S025 | POU_BWD | ▶ | S020 | P39 | 1 |
| ● S026 | AND | ▶ | S024 | S025 | 1 |
| ● S027 | AND | ▶ | S025 | S024 | 1 |

F I G . 4 6
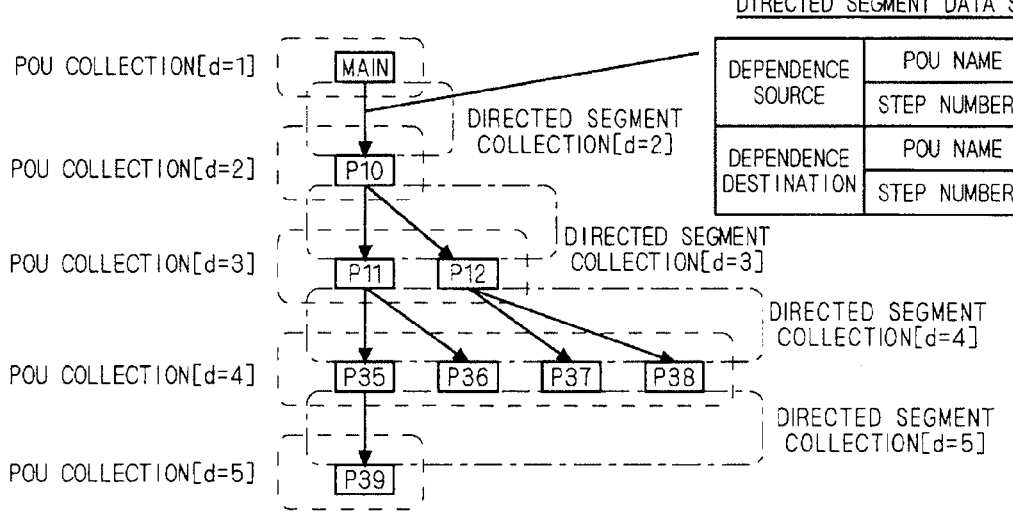
F I G . 4 7
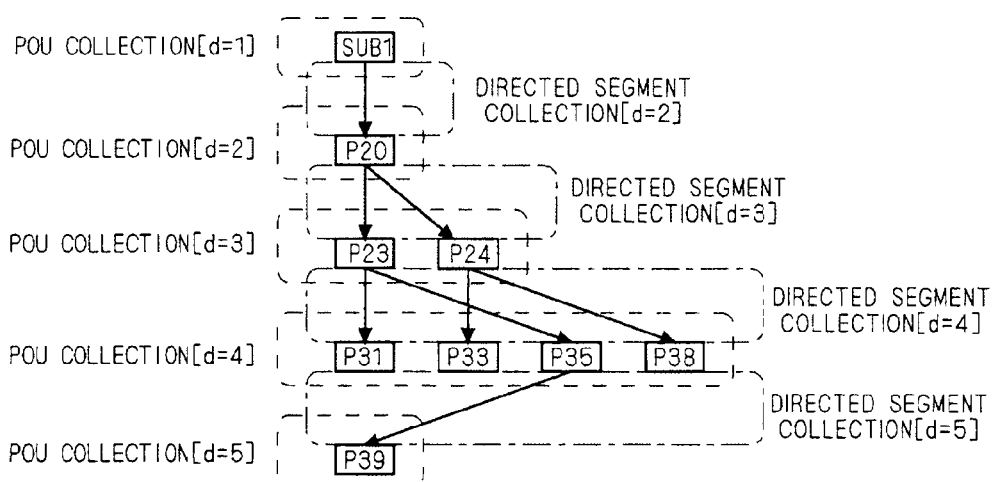

F I G . 4 9
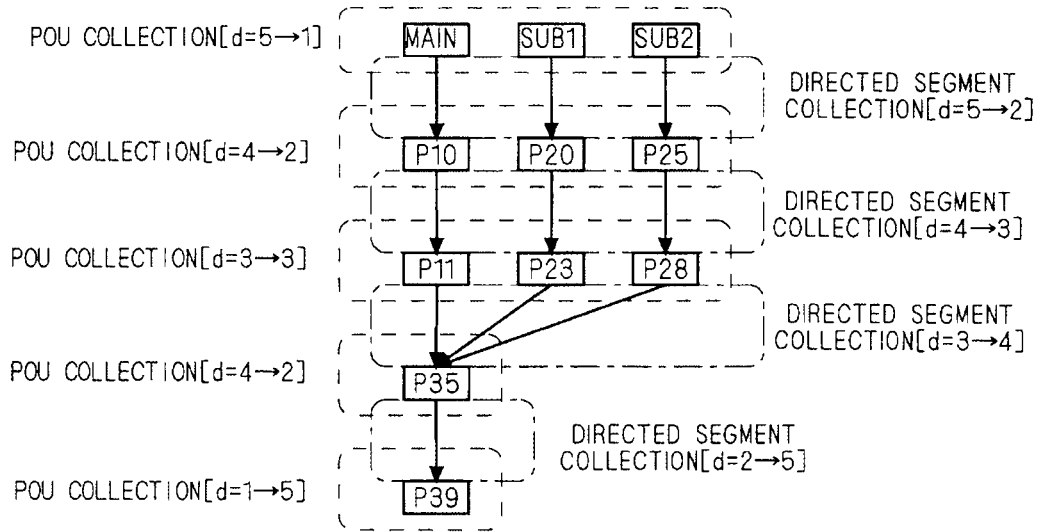

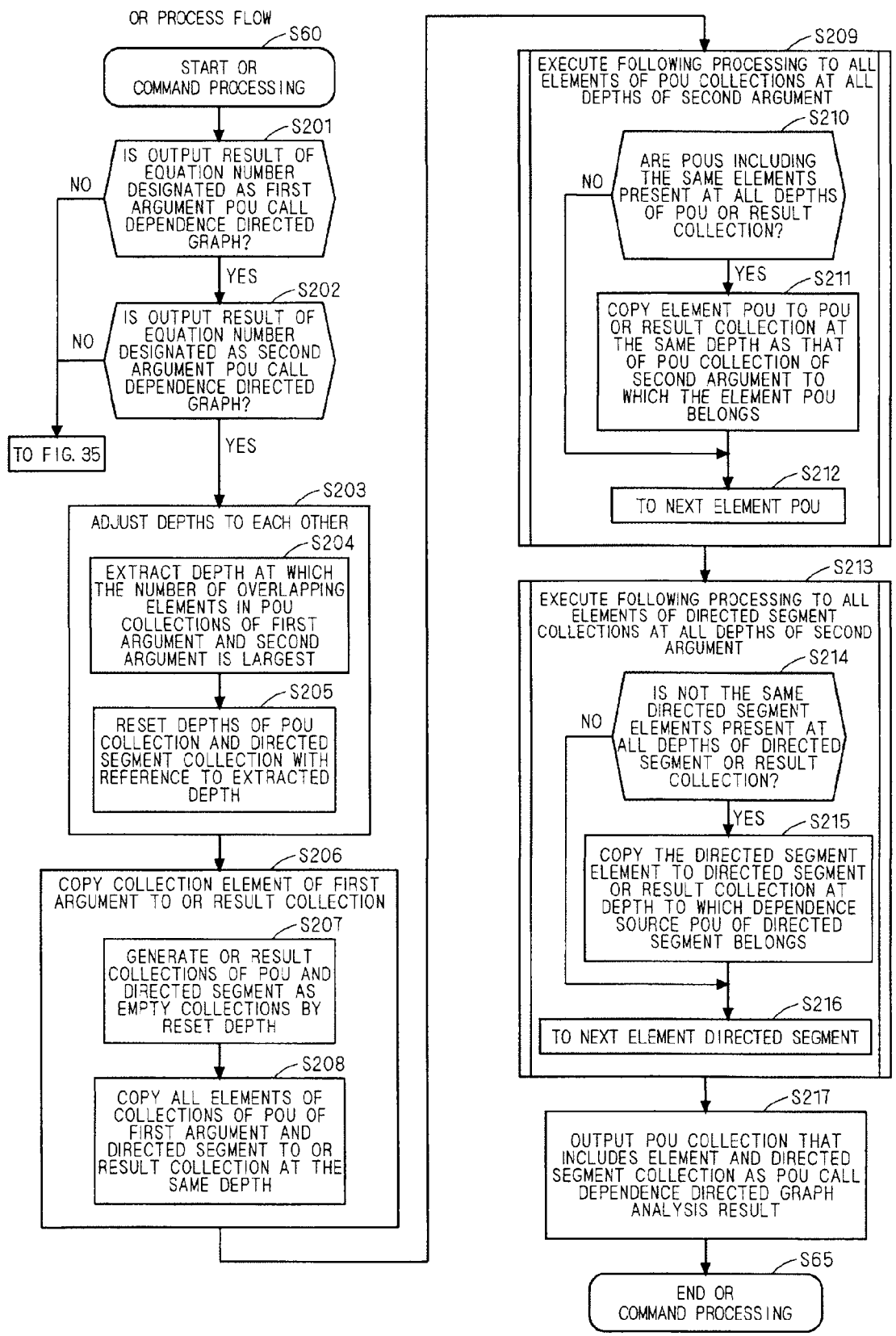

F I G . 5 1
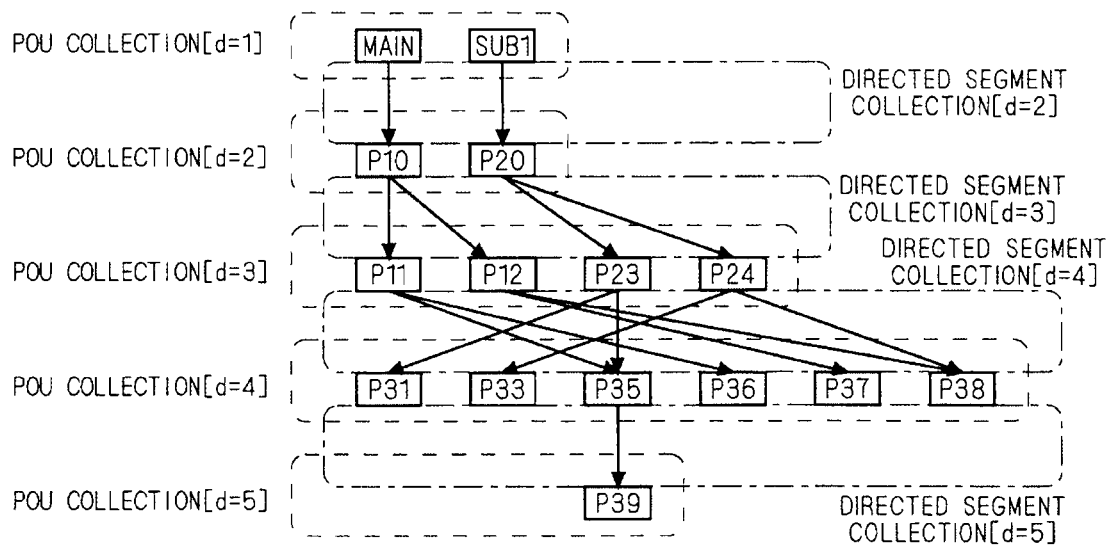

F I G. 5 4

PROGRAM ANALYSIS SUPPORT SCREEN S028~S042

PROGRAM ANALYSIS SUPPORT SCREEN

| | EQUATION NUMBER | ANALYSIS COMMAND | | ANALYSIS SUBJECT (FIRST ARGUMENT) | ANALYSIS CONDITION (SECOND ARGUMENT) | THE NUMBER OF RESULTS |
|---|---|---|---|---|---|---|
| ● | S028 | POU_READ | ▶ | S021 | | 8 |
| ● | S029 | VAR_REF | ▶ | S028 | M | 246 |
| ● | S030 | VAR_FWD | ▶ | S028 | M4095 | 1 |
| ● | S031 | VAR_REF | ▶ | S021 | M | 246 |
| ● | S032 | VAR_FWD | ▶ | S006 | | 1 |
| ● | S033 | POU_READ | ▶ | S020 | | 2 |
| ● | S034 | VAR_REF | ▶ | S034 | M[0-9].[20-29] | 43 |
| ● | S035 | POU_READ | ▶ | S020 | M4095 | 10 |
| ● | S036 | VAR_FWD | ▶ | S037 | | 1 |
| ● | S037 | VAR_REF | ▶ | S036 | | 1 |
| ● | S038 | POU_READ | ▶ | S036 | | 5 |
| ● | S039 | POU_READ | ▶ | S005 | | 5 |
| ● | S040 | AND | ▶ | S005 | S018 | 2 |
| ● | S041 | AND | ▶ | S005 | S011 | 2 |
| ● | S042 | AND | ▶ | S011 | S005 | 2 |

EXECUTION

FIG. 61

AND RESULT VAR_REF SCREEN S041

VAR_REF RESULT DISPLAY SCREEN S041

| DEVICE | PROGRAM NAME | STEP NUMBER | INSTRUCTION | | | |
|---|---|---|---|---|---|---|
| M4 | MAIN | 7 | —[RST]— | | | |
| M4 | SUB | 0 | —|/|— | | | |
| | | | | | | |
| | | | | | | |
| | | | | | | |

FIG. 65

PROCESSING FLOW THAT NEEDS DEFINITION AS NEW COMMAND DEFINITION
(1) COMMAND NAME

| | |
|---|---|
| FIRST ARGUMENT / SECOND ARGUMENT | (2) |
| POU NAME | (3) |
| EQUATION NUMBER (VAR_REF RESULT AND LOGICAL OPERATION RESULT THEREOF) THAT OUTPUTS DEVICE CROSS-REFERENCE | (4) |
| EQUATION NUMBER (VAR_FWD/BWD RESULT AND LOGICAL OPERATION RESULT THEREOF) THAT OUTPUTS DEVICE DEPENDENCE DIRECTED GRAPH | (5) |
| EQUATION NUMBER THAT OUTPUT COLLECTION OF POU (POU_READ RESULT AND LOGICAL OPERATION RESULT THEREOF) | (6) |
| EQUATION NUMBER THAT OUTPUT POU CALL DEPENDENCE DIRECTED GRAPH (POU_FWD/BWD RESULT AND LOGICAL OPERATION RESULT THEREOF) | (7) |
| EQUATION NUMBER THAT OUTPUT ANALYSIS RESULT DATA FORMAT BY NEW COMMAND (NEW COMMAND RESULT AND LOGICAL OPERATION RESULT THEREOF) | (8) |

F I G . 6 6

PROCESSING FLOW CORRESPONDING TO VAR_REF COMMAND DEFINITION

| FIRST ARGUMENT \ SECOND ARGUMENT | DEVICE |
|---|---|
| POU NAME | △<br><PROCESSING FLOW> NOT SHOWN<br><EQUATION NUMBER SERVING AS EXAMPLE> NON<br><REMARKS> ALTHOUGH THIS IS CONVENTIONAL TECHNIQUE, IN THE PRESENT INVENTION, POU_READ (FIG. 9) IS INTERNALLY PROCESSED TO FIRST ARGUMENT, AND FIG. 10 IS PROCESSED |
| EQUATION NUMBER (VAR_REF RESULT AND LOGICAL OPERATION RESULT THEREOF) THAT OUTPUTS DEVICE CROSS-REFERENCE | ×<br><PROCESSING FLOW> NON<br><EQUATION NUMBER SERVING AS EXAMPLE> NON<br><REMARKS> THIS DESIGNATION IS MADE IMPOSSIBLE<br>(IF DESIGNATED, RESULT IS MADE EMPTY) |
| EQUATION NUMBER (VAR_FWD/BWD RESULT AND LOGICAL OPERATION RESULT THEREOF) THAT OUTPUTS DEVICE DEPENDENCE DIRECTED GRAPH | ○<br><PROCESSING FLOW> FIG. 39<br><EQUATION NUMBER SERVING AS EXAMPLE> S018<br><REMARKS> NON |
| EQUATION NUMBER THAT OUTPUT COLLECTION OF POU (POU_READ RESULT AND LOGICAL OPERATION RESULT THEREOF) | ◎<br><PROCESSING FLOW> FIG. 10<br><EQUATION NUMBER SERVING AS EXAMPLE> S002<br><REMARKS> NON |
| EQUATION NUMBER THAT OUTPUT POU CALL DEPENDENCE DIRECTED GRAPH (POU_FWD/BWD RESULT AND LOGICAL OPERATION RESULT THEREOF) | △<br><PROCESSING FLOW> FIG. 56<br><EQUATION NUMBER SERVING AS EXAMPLE> S031<br><REMARKS> POU_READ (FIG. 55) IS INTERNALLY PROCESSED TO FIRST ARGUMENT, AND FIG. 10 IS PROCESSED |
| EQUATION NUMBER THAT OUTPUT ANALYSIS RESULT DATA FORMAT BY NEW COMMAND (NEW COMMAND RESULT AND LOGICAL OPERATION RESULT THEREOF) | (9)<br>◎ OR ○ OR △: ADDITION OF NEW PROCESSING FLOW<br>× : THIS DESIGNATION IS MADE IMPOSSIBLE |

FIG. 67

PROCESSING FLOW CORRESPONDING TO VAR_FWD COMMAND DEFINITION

| FIRST ARGUMENT \ SECOND ARGUMENT | DEVICE |
|---|---|
| POU NAME | △<br><PROCESSING FLOW> NOT SHOWN<br><EQUATION NUMBER SERVING AS EXAMPLE> NON<br><REMARKS> POU_READ (FIG. 9) IS INTERNALLY PROCESSED TO FIRST ARGUMENT, AND FIG. 30 IS PROCESSED |
| EQUATION NUMBER (VAR_REF RESULT AND LOGICAL OPERATION RESULT THEREOF) THAT OUTPUTS DEVICE CROSS-REFERENCE | ×<br><PROCESSING FLOW> NON<br><EQUATION NUMBER SERVING AS EXAMPLE> NON<br><REMARKS> THIS DESIGNATION IS MADE IMPOSSIBLE<br>(IF DESIGNATED, RESULT IS MADE EMPTY) |
| EQUATION NUMBER (VAR_FWD/BWD RESULT AND LOGICAL OPERATION RESULT THEREOF) THAT OUTPUTS DEVICE DEPENDENCE DIRECTED GRAPH | ×<br><PROCESSING FLOW> NON<br><EQUATION NUMBER SERVING AS EXAMPLE> NON<br><REMARKS> THIS DESIGNATION IS MADE IMPOSSIBLE<br>(IF DESIGNATED, RESULT IS MADE EMPTY) |
| EQUATION NUMBER THAT OUTPUT COLLECTION OF POU (POU_READ RESULT AND LOGICAL OPERATION RESULT THEREOF) | ◎<br><PROCESSING FLOW> FIG. 30<br><EQUATION NUMBER SERVING AS EXAMPLE> S001<br><REMARKS> NON |
| EQUATION NUMBER THAT OUTPUT POU CALL DEPENDENCE DIRECTED GRAPH (POU_FWD/BWD RESULT AND LOGICAL OPERATION RESULT THEREOF) | △<br><PROCESSING FLOW> FIG. 57<br><EQUATION NUMBER SERVING AS EXAMPLE> S032<br><REMARKS> POU_READ (FIG. 55) IS INTERNALLY PROCESSED TO FIRST ARGUMENT, AND FIG. 30 IS PROCESSED |
| EQUATION NUMBER THAT OUTPUT ANALYSIS RESULT DATA FORMAT BY NEW COMMAND (NEW COMMAND RESULT AND LOGICAL OPERATION RESULT THEREOF) | (10)<br>○ OR △:ADDITION OF NEW PROCESSING FLOW<br>OR<br>× : THIS DESIGNATION IS MADE IMPOSSIBLE |

F I G . 6 8

PROCESSING FLOW CORRESPONDING TO POU_READ COMMAND DEFINITION

| FIRST ARGUMENT \ SECOND ARGUMENT | NON |
|---|---|
| POU NAME | ◎<br><PROCESSING FLOW> FIG. 9<br><EQUATION NUMBER SERVING AS EXAMPLE> S011<br><REMARKS> NON |
| EQUATION NUMBER (VAR_REF RESULT AND LOGICAL OPERATION RESULT THEREOF) THAT OUTPUTS DEVICE CROSS-REFERENCE | ○<br><PROCESSING FLOW> FIG. 58<br><EQUATION NUMBER SERVING AS EXAMPLE> S033<br><REMARKS> NON |
| EQUATION NUMBER (VAR_FWD/BWD RESULT AND LOGICAL OPERATION RESULT THEREOF) THAT OUTPUTS DEVICE DEPENDENCE DIRECTED GRAPH | △<br><PROCESSING FLOW> FIG. 59<br><EQUATION NUMBER SERVING AS EXAMPLE> S039<br><REMARKS> VAR_REF (FIG. 39) IS INTERNALLY PROCESSED TO FIRST ARGUMENT, AND FIG. 58 IS PROCESSED |
| EQUATION NUMBER THAT OUTPUT COLLECTION OF POU (POU_READ RESULT AND LOGICAL OPERATION RESULT THEREOF) | ×<br><PROCESSING FLOW> NON<br><EQUATION NUMBER SERVING AS EXAMPLE> NON<br><REMARKS> THIS DESIGNATION IS MADE IMPOSSIBLE<br>(IF DESIGNATED, RESULT IS MADE EMPTY) |
| EQUATION NUMBER THAT OUTPUT POU CALL DEPENDENCE DIRECTED GRAPH (POU_FWD/BWD RESULT AND LOGICAL OPERATION RESULT THEREOF) | ○<br><PROCESSING FLOW> FIG. 55<br><EQUATION NUMBER SERVING AS EXAMPLE> S028<br><REMARKS> NON |
| EQUATION NUMBER THAT OUTPUT ANALYSIS RESULT DATA FORMAT BY NEW COMMAND (NEW COMMAND RESULT AND LOGICAL OPERATION RESULT THEREOF) | (11)<br>○ OR △: ADDITION OF NEW PROCESSING FLOW<br>OR<br>× : THIS DESIGNATION IS MADE IMPOSSIBLE |

FIG. 69

PROCESSING FLOW CORRESPONDING TO POU_FWD COMMAND DEFINITION

| FIRST ARGUMENT \ SECOND ARGUMENT | POU NAME |
|---|---|
| POU NAME | △<br><PROCESSING FLOW> NOT SHOWN<br><EQUATION NUMBER SERVING AS EXAMPLE> NON<br><REMARKS> POU_READ (FIG. 9) IS INTERNALLY PROCESSED TO FIRST ARGUMENT, AND FIG. 45 IS PROCESSED |
| EQUATION NUMBER (VAR_REF RESULT AND LOGICAL OPERATION RESULT THEREOF) THAT OUTPUTS DEVICE CROSS-REFERENCE | ×<br><PROCESSING FLOW> NON<br><EQUATION NUMBER SERVING AS EXAMPLE> NON<br><REMARKS> THIS DESIGNATION IS MADE IMPOSSIBLE<br>(IF DESIGNATED, RESULT IS MADE EMPTY) |
| EQUATION NUMBER (VAR_FWD/BWD RESULT AND LOGICAL OPERATION RESULT THEREOF) THAT OUTPUTS DEVICE DEPENDENCE DIRECTED GRAPH | ×<br><PROCESSING FLOW> NON<br><EQUATION NUMBER SERVING AS EXAMPLE> NON<br><REMARKS> THIS DESIGNATION IS MADE IMPOSSIBLE<br>(IF DESIGNATED, RESULT IS MADE EMPTY) |
| EQUATION NUMBER THAT OUTPUT COLLECTION OF POU (POU_READ RESULT AND LOGICAL OPERATION RESULT THEREOF) | ◎<br><PROCESSING FLOW> FIG. 45<br><EQUATION NUMBER SERVING AS EXAMPLE> S021<br><REMARKS> NON |
| EQUATION NUMBER THAT OUTPUT POU CALL DEPENDENCE DIRECTED GRAPH (POU_FWD/BWD RESULT AND LOGICAL OPERATION RESULT THEREOF) | ×<br><PROCESSING FLOW> NON<br><EQUATION NUMBER SERVING AS EXAMPLE> NON<br><REMARKS> THIS DESIGNATION IS MADE IMPOSSIBLE<br>(IF DESIGNATED, RESULT IS MADE EMPTY) |
| EQUATION NUMBER THAT OUTPUT ANALYSIS RESULT DATA FORMAT BY NEW COMMAND (NEW COMMAND RESULT AND LOGICAL OPERATION RESULT THEREOF) | (12)<br>○ OR △: ADDITION OF NEW PROCESSING FLOW<br>OR<br>× : THIS DESIGNATION IS MADE IMPOSSIBLE |

FIG. 70

PROCESSING FLOW CORRESPONDING TO AND COMMAND DEFINITION

| FIRST ARGUMENT \ SECOND ARGUMENT | EQUATION NUMBER (VAR_REF RESULT AND LOGICAL OPERATION RESULT THEREOF) THAT OUTPUTS DEVICE CROSS-REFERENCE | EQUATION NUMBER (VAR_FWD/BWD RESULT AND LOGICAL OPERATION RESULT THEREOF) THAT OUTPUTS DEVICE DEPENDENCE DIRECTED GRAPH | EQUATION NUMBER THAT OUTPUT COLLECTION OF POU (POU_READ RESULT AND LOGICAL OPERATION RESULT THEREOF) | EQUATION NUMBER THAT OUTPUT POU CALL DEPENDENCE DIRECTED GRAPH (POU_FWD/BWD RESULT AND LOGICAL OPERATION RESULT THEREOF) | EQUATION NUMBER THAT OUTPUT ANALYSIS RESULT DATA FORMAT BY NEW COMMAND (NEW COMMAND RESULT AND LOGICAL OPERATION RESULT THEREOF) |
|---|---|---|---|---|---|
| EQUATION NUMBER (VAR_REF RESULT AND LOGICAL OPERATION RESULT THEREOF) THAT OUTPUTS DEVICE CROSS-REFERENCE | <PROCESSING FLOW> FIG. 15 <EQUATION NUMBER SERVING AS EXAMPLE> S005 <REMARKS> NON | △ <PROCESSING FLOW> FIG. 60 <EQUATION NUMBER SERVING AS EXAMPLE> S041 <REMARKS> VAR_REF (FIG. 39) IS INTERNALLY PROCESSED TO SECOND ARGUMENT, AND FIG. 15 IS PROCESSED | △ <PROCESSING FLOW> NOT SHOWN <EQUATION NUMBER SERVING AS EXAMPLE> NON <REMARKS> POU_READ (FIG. 58) IS INTERNALLY PROCESSED TO FIRST ARGUMENT, AND FIG. 14 IS PROCESSED | × <PROCESSING FLOW> NON <EQUATION NUMBER SERVING AS EXAMPLE> NON <REMARKS> THIS DESIGNATION IS MADE IMPOSSIBLE (IF DESIGNATED, RESULT IS MADE EMPTY) | (15) ○ OR △: ADDITION OF NEW PROCESSING FLOW OR ×: THIS DESIGNATION IS MADE IMPOSSIBLE |
| EQUATION NUMBER (VAR_FWD/BWD RESULT AND LOGICAL OPERATION RESULT THEREOF) THAT OUTPUTS DEVICE DEPENDENCE DIRECTED GRAPH | <PROCESSING FLOW> FIG. 60 <EQUATION NUMBER SERVING AS EXAMPLE> S042 <REMARKS> VAR_REF (FIG. 39) IS INTERNALLY PROCESSED TO FIRST ARGUMENT, AND FIG. 15 IS PROCESSED | ◎ <PROCESSING FLOW> FIG. 37 <EQUATION NUMBER SERVING AS EXAMPLE> S016 <REMARKS> NON | △ <PROCESSING FLOW> NOT SHOWN <EQUATION NUMBER SERVING AS EXAMPLE> NON <REMARKS> POU_READ (FIG. 59) IS INTERNALLY PROCESSED TO FIRST ARGUMENT, AND FIG. 14 IS PROCESSED | △ <PROCESSING FLOW> NOT SHOWN <EQUATION NUMBER SERVING AS EXAMPLE> NON <REMARKS> POU_READ (FIG. 55) IS INTERNALLY PROCESSED TO SECOND ARGUMENT, AND FIG. 14 IS PROCESSED | |
| EQUATION NUMBER THAT OUTPUT COLLECTION OF POU (POU_READ RESULT AND LOGICAL OPERATION RESULT THEREOF) | △ <PROCESSING FLOW> NOT SHOWN <EQUATION NUMBER SERVING AS EXAMPLE> NON <REMARKS> POU_READ (FIG. 58) IS INTERNALLY PROCESSED TO SECOND ARGUMENT, AND FIG. 14 IS PROCESSED | △ <PROCESSING FLOW> NOT SHOWN <EQUATION NUMBER SERVING AS EXAMPLE> NON <REMARKS> POU_READ (FIG. 59) IS INTERNALLY PROCESSED TO SECOND ARGUMENT, AND FIG. 14 IS PROCESSED | ◎ <PROCESSING FLOW> FIG. 14 <EQUATION NUMBER SERVING AS EXAMPLE> NOT SHOWN <REMARKS> NON | △ <PROCESSING FLOW> NOT SHOWN <EQUATION NUMBER SERVING AS EXAMPLE> NON <REMARKS> POU_READ (FIG. 55) IS INTERNALLY PROCESSED TO SECOND ARGUMENT, AND FIG. 14 IS PROCESSED | |
| EQUATION NUMBER THAT OUTPUT POU CALL DEPENDENCE DIRECTED GRAPH (POU_FWD/BWD RESULT AND LOGICAL OPERATION RESULT THEREOF) | × <PROCESSING FLOW> NON <EQUATION NUMBER SERVING AS EXAMPLE> NON <REMARKS> THIS DESIGNATION IS MADE IMPOSSIBLE (IF DESIGNATED, RESULT IS MADE EMPTY) | △ <PROCESSING FLOW> NOT SHOWN <EQUATION NUMBER SERVING AS EXAMPLE> NON <REMARKS> POU_READ (FIG. 55) IS INTERNALLY PROCESSED TO FIRST ARGUMENT, AND FIG. 14 IS PROCESSED | ◎ <PROCESSING FLOW> FIG. 52 <EQUATION NUMBER SERVING AS EXAMPLE> S026 <REMARKS> NON | | |
| EQUATION NUMBER THAT OUTPUT ANALYSIS RESULT DATA FORMAT BY NEW COMMAND (NEW COMMAND RESULT AND LOGICAL OPERATION RESULT THEREOF) | | (14) ○ OR △: ADDITION OF NEW PROCESSING FLOW OR ×: THIS DESIGNATION IS MADE IMPOSSIBLE | | | (13) ○ OR △: ADDITION OF NEW PROCESSING FLOW OR ×: THIS DESIGNATION IS MADE IMPOSSIBLE |

PROGRAM ANALYSIS SUPPORT DEVICE

TECHNICAL FIELD

The present invention relates to a program analysis support device. More specifically, the present invention relates to various industrial controllers such as a programmable controller (to be referred to as a "PC" hereinafter), a motion controller (to be referred to as an "MC" hereinafter), a numerical control device controller (to be referred to as an "NC" hereinafter), an inspection device controller, or a display (to be referred to as a "GOT" hereinafter) or a device to improve efficiency of an operation of analyzing a measurement control program to develop a new measurement control program or an operation of editing/changing a measurement control program when the program is developed or debugged with reference to a measurement control program executed in a microcomputer.

BACKGROUND ART

In the past, in order to perform measurement control of production equipment, an industrial controller including a programmable controller (to be referred to as a "PC" hereinafter) is used. As a measurement control program executed in an industrial controller, a language being in compliant with IEC61131-3 typified by a ladder program or a controller-specialized language is given. In place of the industrial controller, as a measurement control program in use of a microcomputer, C language or Assembler is given. The following description will be made while using a PC as an example.

A PC executes a ladder program serving as measurement control program to recognize a state of a measurement control subject or to designate a measurement control subject to operate. In creation of a ladder program, a predetermined measurement control program creation support device (ladder creation support device) is used. The measurement control program creation support device is generally provided as a software tool operated in a personal computer and has a function of supporting editing of a ladder serving as a program used when a PC measures or controls a measurement control subject. In addition, the measurement control program creation support device has a function of connecting a personal computer to a PC to transfer the edited ladder to the PC and a function of monitoring a state of a value of a variable (to be referred to as a "device" hereinafter) changed depending on a state of the measurement control subject or execution of the ladder. The program editing function and the monitoring function provided by the measurement control program creation support device) are also mounted on a display (to be referred to as a "GOT" hereinafter). Also on the GOT that is always connected to the PC, editing of the measurement control program or monitoring of the state of the value of the device can be performed.

When the scale of production equipment is very small, the measurement control program is sufficiently configured by one ladder program. However, in general, a program to measurement control production equipment is configured by a plurality of program modules (to be referred to as a "POU" (Program Organization Unit). When a program language of the measurement control program is a ladder language, the POU corresponds to a subroutine or an FB (Function Block). When the program language is an ST (Structured Text) or C language, the POU corresponds to a subroutine or a function.

In this case, a large number of devices that are commonly measured and controlled between different POUs are present. Therefore, in analysis of a range influenced by a change and an upgrade of a program or analysis or the like of a cause of a drawback operation, a POU in which a certain device is used and a position where the certain device is used (position where reading is performed/position where writing is performed) need to be known. In order to improve the efficiency of the operation, there is necessity of rapidly specifying a use place of a device in the program (in the POU). Therefore, as a program analysis support device to specify the place, a cross-reference creating device is known. The cross-reference creating device is a device that reads a plurality of POUs as analysis results to form a list of positions and POUs in which a certain device is used or form a list of all devices used in a certain POU. Creation of such a cross-reference may be realized as one function of a measurement control program creation support device.

In an instruction in Non-patent Document 1, two conventional techniques are disclosed. The conventional techniques will be described below.

In the first conventional technique, a cross-reference function that forms a list of POUs where a certain device is used and positions of the POUs where the certain device is used is realized as one function of a measurement control program creation support device. When the cross-reference function is selected from a menu of the measurement control program creation support device, a dialog serving as a cross-reference screen is displayed on a screen. First, in a device column of the dialog, an operator inputs a device. Then, the operator designates a searching range in a searching range column of the dialog. At this time, the operator may designate all POUs as the searching range, or may designate only a specific POU as a searching range. Thereafter, when operator clicks an execution button displayed on the dialog, a list of POUs where the device is used and positions where the device is used is displayed on the dialog. In a program name column on the dialog, the name of a POU is displayed, and in a sequence step column, a step number in which the device is used in the POU is displayed. Furthermore, in an instruction column on the dialog, a type of an instruction of the step in which the device is used is displayed. For example, the program (POU) is described in a ladder language, a contact, or a coil, or the like is displayed in the instruction column.

In the second conventional technique, a list (device use list) of devices used in a certain POU is formed on a screen. This list forming function, in the second conventional technique, is realized as a function of a measurement control program creation support device. When an operator selects a printing function from a menu of the measurement control program creation support device, a dialog to display a device use list is displayed on a screen. First, the operator selects a program. That is, the operator inputs a name of a POU to be selected in a program selecting column displayed on the dialog. The operator designates a printing condition displayed on the dialog. At this time, when only a device used in the program is printed as a list, the operator inputs a designation for check in the column. When the designation for check is not input, all devices are printed as a list. In this state, when the operator clicks a print button displayed on the dialog, a list of devices used in the POU is printed. The name of the selected POU is printed on the program name column. Under the name, the devices used in the POU are sequentially printed. In a use/nonuse column, a type of an instruction in which the device is used is printed. When the program is described in a ladder language, a contact, a coil, or the like is printed. When the device is used as a contact and a coil in the POU, both the contact and the coil are printed.

PRIOR ART DOCUMENT

Patent Document

Patent Document 1: Japanese Patent Application Laid-Open No. 2006-294011

Patent Document 2: Japanese Patent Application Laid-Open No. 2006-294013

Non-Patent Document

Non-patent Document 1: GX Developer Version 8, Operating Manual, Mitsubishi Electric Corporation, December, 2008

Non-patent Document 2: "Program slicing technique and application" by Shimomura Takao, KYORITSU SHUPPAN CO., LTD, ISBN4-320-02743-4

SUMMARY OF THE INVENTION

Problem to be Solved by the Invention

As described above, the first or second conventional technique described in Non-patent Document 1, only on the basis of the described function mounted on a program creation support device or a program analysis support device in advance, a cross-reference or a device use list representing a POU in which a certain device is used and a position at which a certain device is used in the POU can only be formed.

For this reason, as an example of the problem, in the first and second conventional techniques, with respect to a device used in a certain specific POU and in another specific POU, a list of reference portions in the POUs cannot be formed. As a result, after an operation of visually checking a list (device use list) of devices used in a certain specific POU and a list (device use list) of devices used in the specific POU and another specific POU is executed by an operator herself/himself one by one, the operator only has a method of forming a cross-reference of the extracted devices. In a change of programs, analysis of a drawback operation, or the like, a long time is required to specify a place to be edited.

As an example of another problem, the first and second conventional techniques cannot form a cross-reference of a certain device in a specific POU and a POU called by the specific POU as a subroutine. For this reason, the operator only has a method of manually executing an operation of extracting a list of POUs called as subroutines by the specific POU first, forming a cross-reference of the device with respect to the extracted POUs, and merging the result. As a result, in a change of programs, analysis of a drawback operation, or the like, a long time is disadvantageously required to specify a place to be edited.

Therefore, a conventional technique to solve the first problem is disclosed in each of Patent Document 1 and Non-patent Document 2.

However, each of the conventional techniques proposed in Patent Documents 1 and 2 is anything more than a technique in which a function (This function is temporarily called as a "inter-program overlapping use status list".) of forming a list of devices that are used in a certain specific POU and also used in another specific POU is mounted on a program creation support device or a program analysis support device. Processing of an inter-program overlapping use status list function may be realized by using processing of an existing cross-reference function, or processing of an inter-program overlapping use status list function may be realized independently of processing of an existing cross-reference function. In any case, the conventional techniques can execute only formation of an inter-program overlapping use status list within a condition designation range of the function mounted as described above.

For this reason, the conventional techniques include an issue in which both formation of a cross-reference obtained by freely combining conditions and extraction of a program analysis result obtained by freely combining the conditions cannot be realized.

As an example of a conventional technique that can form a desired list by freely combining searching conditions, PATOLIS (registered trade name) that is one of prior patent document searching programs is known. In searching for a patent document by the PATOLIS (registered trade name), an operator narrows down a searching range by patent classification or narrows down a searching range depending on whether a specific keyword is included in a region such as a summary or a scope of claims. In this case, a population serving as a searching subject is a whole of prior patent documents. A list of hit results is a list of prior patent documents. Therefore, when the operator wants to narrow down a searching range for the hit result under another condition, the operator searches the whole of prior patent documents under another condition first and causes a computer to execute AND processing between the list of prior patent documents serving as the hit result and a previous hit result to make it possible to further narrow down a scope of the prior patent documents.

In contrast to this, an analysis result of a measurement control program changes depending on analysis conditions. For example, in a list of devices used in a specific POU, the result is a list of devices. However, in a list of POUs called as subroutines by a specific POU, the result is a list of POUs. Therefore, with respect to the lists of different results, narrowing performed by AND processing between the results cannot be immediately realized.

In program analysis in a conventional technique proposed in Patent Documents 1 and 2 and Non-patent Document 1, a population serving as an analysis subject is a program, but an analysis result of a measurement control program changes depending on analysis conditions. For this reason, when another analysis condition is executed, a population serving as the analysis result needs to be a program but also an analysis result. More specifically, depending on combinations of the conventional techniques, a program analysis support device that can freely combine program analysis conditions cannot be easily realized.

The present invention has been made in consideration of the technical circumstances, and has as its main object to realize a program analysis support device that can freely combine analysis conditions.

Means for Solving the Problem

A program analysis support device according to a subject of the invention includes, with respect to a program configured by a program module, an analysis condition setting part that inputs and holds a program analysis condition of the program designated by a user, an analysis condition executing part that executes an analysis processing of the program based on the program analysis condition, and an analysis result display part that creates and outputs display data to display an analysis result processed by the analysis condition executing part. The analysis condition executing part includes a variable dependence extraction processing executing part that outputs a signal that gives dependence directed graphs of variables described in the program module and further includes a POU list extraction processing executing part that outputs a signal that gives a collection of the program modules, the variable dependence extraction processing executing part outputs the signal that gives the dependence directed graphs of the variables by using the collection of the program modules as an analysis subject range, and the POU list extraction processing executing part extracts a signal that gives a collection of program modules being present in the dependence directed graphs of the variables.

Effect of the Invention

According to the subject matter of the present invention, program analysis obtained by freely combining program analysis conditions can be performed, and, on the basis of the analysis result, a place to be edited can be rapidly specified. For this reason, a user can improve efficiency of an operation to specify a place to be edited in a change of programs, analysis of a drawback operation, or the like and can shorten time required for the operation.

Various embodiments of the present invention will be described below in detail with reference to the accompanying drawings together with effects and advantages of the present invention. Objects, characteristics, aspects, advantages of the present invention will be apparent from the following detailed description and the accompanying drawings.

BRIEF DESCRIPTION OF THE DRAWINGS

FIG. 1 is a block diagram showing a hardware configuration of a program analysis support device according to the present invention.

FIG. 2 is a functional block diagram showing a software configuration of a program analysis support device according to Embodiment 1.

FIG. 4 is a diagram showing a MAIN ladder IL.
FIG. 6 is a diagram showing a SUB-ladder IL.
FIG. 7 is a diagram showing a program analysis support screen.
FIG. 8 is a diagram showing a program analysis support screen.
FIG. 11 is a diagram showing a VAR_REF result screen.
FIG. 12 is a diagram showing a VAR_REF result screen.
FIG. 13 is a diagram showing a VAR_REF result screen.
FIG. 16 is a diagram showing an AND result VAR_REF screen.
FIG. 19 is a diagram showing an OR result VAR_REF screen.
FIG. 22 is a diagram showing a NOT result VAR_REF screen.
FIG. 24 is a diagram showing a ladder structure.
FIG. 25 is a diagram for explaining Instruction/Operator/Operand.
FIG. 26 is a diagram showing an example of device dependence.
FIG. 27 is a diagram showing an example of device dependence.
FIG. 28 is a diagram showing an example of device dependence.
FIG. 29 is a diagram showing a program analysis support screen.
FIG. 31 is a graph showing a VAR_FWD result directed graph.
FIG. 32 is a graph showing a VAR_FWD result directed graph.
FIG. 33 is a flow chart showing a VAR_BWD processing flow.
FIG. 34 is a graph showing a VAR_BWD result directed graph.
FIG. 36 is a graph showing an OR result VAR directed graph.
FIG. 38 is a graph showing an AND result VAR directed graph.
FIG. 40 is a diagram showing a VAR_REF result screen.
FIG. 41 is a diagram showing a VAR_REF result screen.
FIG. 42 is a functional block diagram showing a software configuration of a program analysis support device according to Embodiment 7.
FIG. 44 is a diagram showing a program analysis support screen.
FIG. 46 is a graph showing a POU_FWD result directed graph.
FIG. 47 is a graph showing a POU_FWD result directed graph.
FIG. 49 is a graph showing a POU_BWD result directed graph.
FIG. 50 is a flow chart showing an OR processing flow.
FIG. 51 is a graph showing an OR result POU directed graph.
FIG. 54 is a diagram showing a program analysis support screen.
FIG. 61 is a diagram showing an AND result VAR_REF screen.

FIG. 65 is a diagram showing a processing flow that needs to be defined in new command definition.

FIG. 66 is a diagram showing a processing flow corresponding to VAR_REF command definition.

FIG. 67 is a diagram showing a processing flow corresponding to VAR_FWD command definition.

FIG. 68 is a diagram showing a processing flow corresponding to POU_READ command definition.

FIG. 69 is a diagram showing a processing flow corresponding to POU_FWD command definition.

FIG. 70 is a diagram showing a processing flow corresponding to AND command definition.

EMBODIMENT FOR CARRYING OUT THE INVENTION

Embodiment 1

Figure 3:
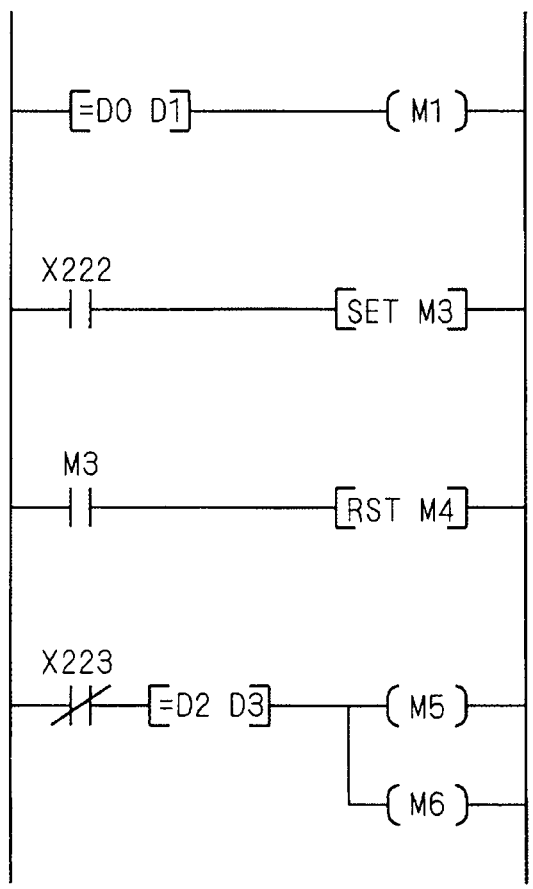
FIG. 3 is a diagram showing a MAIN ladder circuit.

FIG. 1 is a block diagram showing a hardware configuration of a program analysis support device according to the present invention common in embodiments (which will be described later). In FIG. 1, a program analysis support device 1 includes (1) a microprocessor 2 that executes functions of the program analysis support device 1, (2) a data storing memory 3 configured by, for example, a DRAM to temporarily store data, (3) a display part 4 configured by a display part such as a liquid crystal display, (4) an input part 5 configured by an input device such as a mouse and/or a keyboard, and (5) a holding part 6 configured by a memory device such as a hard disk that stores and holds programs such as a measurement control program to be analyzed and a program analysis support program to realize the functions of the program analysis support device or data such as an analysis result. The parts 2 to 6 are connected to each other through a system bus SB.

When program analysis (formation of a cross-reference) to a measurement control program is performed in the analysis support device 1, a user operates the input part 5 to input a program analysis condition and designates a measurement control program to be designated in a plurality of measurement control programs held in the holding part 6. With the input operation, designated contents of a program analysis condition and a measurement control program are held in a register (not shown) in the microprocessor 2. In this state, the microprocessor 2 accesses the holding part 6, reads the measurement control program designated by the user from the holding part 6, and executes analysis processing for the measurement control program according to the program analysis condition input by the user. The microprocessor 2 temporarily stores the analysis processing result in the data storing memory 3 and displays the result on a screen of the display part 4 or stores the result in the holding part 6 as one file.

An analysis support program itself to execute functions or processings of the program analysis support device 1 is provided as a software tool that can operate on a personal computer. In this case, the program analysis support device 1 is configured by the personal computer. Alternatively, the analysis support program may be mounted on a GOT. In this case, the GOT configures the program analysis support device 1.

FIG. 2 is a functional block diagram (corresponding to a software block diagram) showing functional parts in analysis processing executed by the program analysis support device 1, therefore, the microprocessor 2. As shown in FIG. 2, the program analysis support device 1 or the microprocessor 2 roughly include an analysis condition setting part 10, analysis condition executing part 11, and an analysis result display part 20.

Of these parts, the analysis condition executing part 11 has functional parts for program analysis processing. More specifically, in the embodiment, since a cross-reference of a variable (device) is extracted, the analysis condition executing part 11 includes a POU list extraction processing executing part 14 to read a program serving as a subject of cross-reference extraction and a variable use list extraction processing executing part 12 serving as a part that executes cross-reference extraction processing.

The analysis result display part 20 includes a variable use list display part 21 that forms display data having a form to display a cross-reference result on the screen of the display part 4 in FIG. 1.

Furthermore, the analysis condition executing part 11 includes an analysis result logical operation processing executing part 16. The analysis result logical operation processing executing part 16 includes, as parts that perform a logical operation between analysis results obtained by the functions of the program analysis processing, an AND processing executing part 17, an OR processing executing part 18, and a NOT processing executing part 19.

A user inputs a program analysis condition to the analysis condition setting part 10 through the input part 5 in FIG. 1. Depending on the input, the analysis condition executing part 11 executes analysis processing depending on the program analysis condition input by the user. For example, the analysis condition executing part 11 performs a process of reading the measurement control program (corresponding to an analysis subject program file 8) designated by the user or a device comment file 9 related to the analysis subject program from the holding part 6 in FIG. 1, forms a cross-reference, or processes a logical operation (AND/OR/NOT) between analysis results. Thereafter, the analysis result display part 20 performs an operation such as an operation of forming data to perform display depending on the analysis result on the screen of the display part 4 in FIG. 1 or outputs data of the analysis result to the outside as an analysis result file 25. For example, the analysis result display part 20 receives a cross-reference result formed by the analysis condition executing part 11, forms display data to display the received cross-reference result on the screen of the display part 4, outputs the display data to the display part 4 to display the received cross-reference result for a user or to output the received cross-reference result to the outside as a cross-reference result file.

Figure 5:
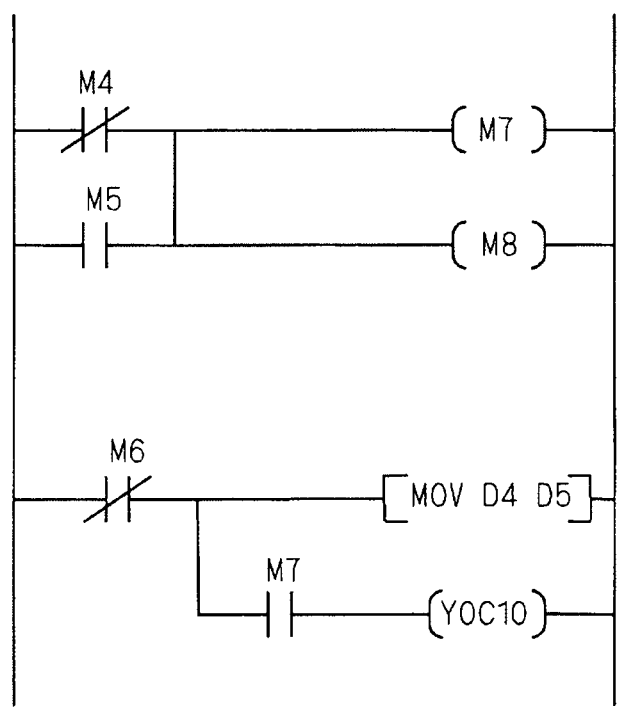
FIG. 5 is a diagram showing a SUB-ladder circuit.

An example in which a ladder program serving as a measurement control program of a PC is used as a subject of program analysis will be described below. In this case, FIG. 3 shows one of POUs constituting the measurement control program of the PC. The name of the POU is a MAIN ladder circuit. FIG. 3 is a ladder circuit diagram expression. When the diagram is expressed in a text format (For example, IL format. IL: Instruction List), FIG. 3 is expressed like FIG. 4. Furthermore, FIG. 5 shows another POU constituting the measurement control program of the PC. The name of the POU is a SUB-ladder circuit. FIG. 5 is expressed as a ladder circuit diagram. However, when the circuit diagram is expressed in a text format, FIG. 5 is expressed by the same manner as in FIG. 6.

Each of FIGS. 7 and 8 is a diagram showing an example of a screen displayed on the display part 4 to cause a user to input a program analysis condition to input to the microprocessor 2 of the device 1 by using the input part 5 in FIG. 1. Such a program analysis support screen is displayed on the screen of the display part 4 by a functional operation of the analysis condition setting part 10 in FIG. 2. The part 10 holds the program analysis condition input by the user through the program analysis support screen without change.

In the program analysis support screen shown in FIG. 7, each row is configured by an equation number cell, an analysis command cell, an analysis subject cell, an analysis condition cell, and a number-of-results cell. A user watches the screen in FIG. 7 and inputs an analysis subject and an analysis condition corresponding to an analysis command to corresponding cells, respectively. More specifically, the user mainly designates a population serving as a subject to which the analysis command performs analysis processing. The user mainly designates a condition under which the analysis command executes analysis processing for the analysis condition cell.

As in the example shown in FIG. 8, a screen configuration to cause a user to input a program analysis condition is not configured by cells depending on types of input data as in FIG. 7, but the user may input an entire equation of the program analysis condition.

After the user completes the process of inputting the analysis condition to the analysis condition cell displayed on the screen in FIG. 7 or 8, input processing that puts • before a column of an equation number of the screen. In this state, an operation of pressing (clicking) an execution button displayed on an upper left side of the screen is performed. When the click processing (input processing) is performed, sequentially from a small equation number to be executed, the analysis condition setting part 10 in FIG. 2 designates the analysis condition executing part 11 to execute processing of an analysis conditional equation. In response to the designation, the analysis condition executing part 11 executes analysis processing to the conditional equations in the order of equation numbers. In the screen configuration example in FIG. 7, program analysis conditions (analysis command, analysis subject, and analysis condition) are input to each of equation number S001 to equation number S010, and each of the equation numbers is designated as an execution subject through display of •. For this reason, when a user presses (clicks) the execution button, thereafter, the analysis condition executing part 11 in FIG. 2 sequentially executes analysis processing on the basis of the input program analysis condition with respect to equation number S001 to equation number S010.

The result of the analysis processing is returned from the analysis condition executing part 11 to the analysis condition setting part 10. As a result, the analysis condition setting part 10 displays the number of results of the analysis processing in the number-of-results cell on the program analysis support screen displayed on display part 4 in FIG. 1. When the user clicks a button BT displayed on the right of the number-of-results cell, accordingly, the analysis result display part 20 displays the result of the analysis processing on a screen of the display part 1 in FIG. 1.

<Processing Contents of Analysis Command (A) to (E)>

Processing contents of an analysis command constituting one program analysis condition will be described below.

Figure 9:
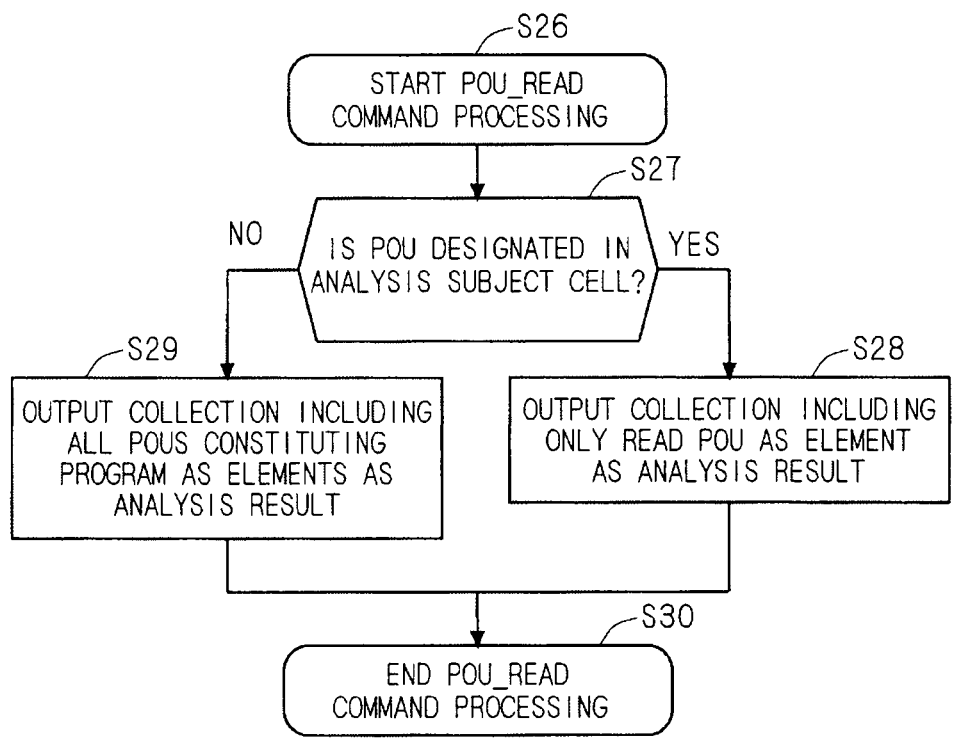
FIG. 9 is a flow chart showing a POU_READ processing flow.

(A) First, an analysis command POU_READ displayed in FIG. 7 is a command to designate or read a program (POU) serving as an analysis subject. A user designates a program name (POU name) to serve as an analysis subject, the program name being designated by an equation number in the following processing in the analysis subject cell. In FIG. 7, an example in which, by execution of a command indicated by equation number S001, a POU having a program name of MAIN is designated to be read is shown. As the analysis result, a collection of POUs each having the program MAIN as an element is output. The "collection" is a software technical term that means a set of data elements. The "collection of POUs" means a set including programs (POUs) as elements. When a POU name to serve as an analysis subject is not designated in the analysis subject cell, a collection including all POUs constituting a program as elements is output as an analysis result. A flow of processing performed when the POU list extraction processing executing part 14 in FIG. 2 executes the analysis command POU_READ is shown in the flow chart in FIG. 9. As shown in FIG. 9, a technique related to the processing of the analysis command POU_READ is the same as a conventional technique that designates a program as a searching range in cross-reference formation.

(B) An analysis command VAR_REF shown in FIG. 7 is a command that extracts a cross-reference of a variable (device) and that is executed by the variable use list extraction processing executing part 12 in FIG. 2. For this reason, a user designates an equation number that designates a program serving as an analysis subject of the analysis command VAR_REF in the analysis subject cell and designates a variable (device) serving as a condition for cross-reference extraction in the analysis condition cell. Equation number S002 in FIG. 7 shows an example in which, in the program MAIN serving as the POU read from the storing part 6 to the microprocessor 2 by execution of analysis command POU_READ given as equation number S001, a cross-reference related to all devices M is designated to be extracted. The variable use list extraction processing executing part 12 in FIG. 2 outputs, as the analysis result, a collection including portions where the variables (devices) M are used in the program MAIN as elements.

Figure 10:
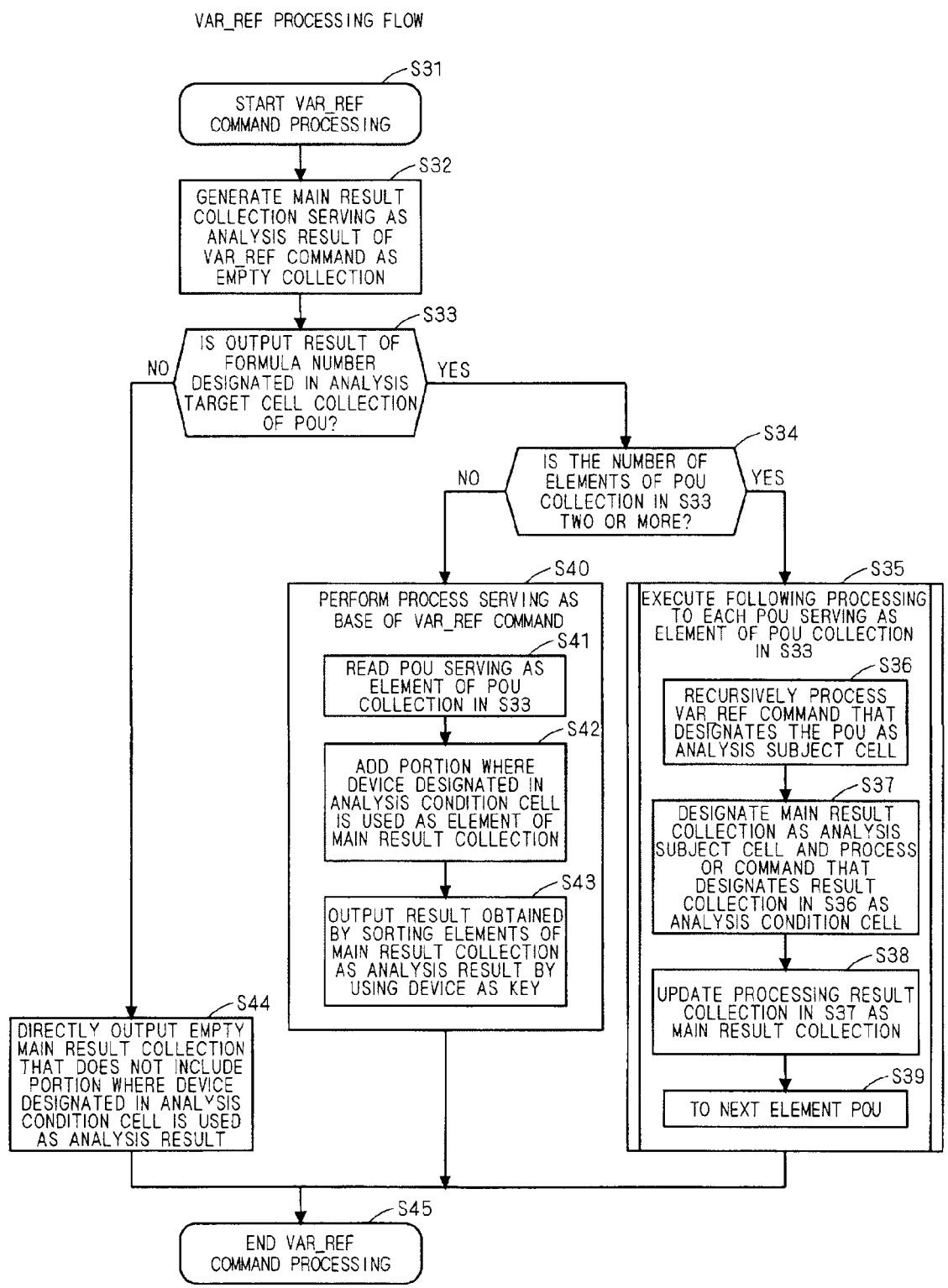
FIG. 10 is a flow chart showing a VAR_REF processing flow.

In this case, a flow of processing of the analysis command VAR_REF executed by the variable use list extraction processing executing part 12 in FIG. 2 is shown in the flow chart in FIG. 10. In the technique related to the processing of the analysis command VAR_REF, processes (steps S40: S41 to S43) performed when an element of a POU collection designated in the analysis subject cell of the analysis command VAR_REF is 1 are base processes of the analysis command VAR_REF, and are the same as those in the conventional technique for forming a cross-reference. More specifically, execution of the analysis command VAR_REF given by equation number S002 can be processed by the conventional technique for forming a cross-reference.

The variable use list extraction processing executing part 12 displays a result collection of the analysis processing of equation number S002 on the screen of the display part 4 in FIG. 1 as a VAR_REF result display screen. An example of the VAR_REF result display screen displayed on the basis of the result collection is shown in FIG. 11. As shown in FIG. 11, in the MAIN ladder program, 6 portions where the variables (devices) M are used (devices M1, M3 to M6) are present, and a cross-reference result thereof is displayed. The device M3 is used as not only an operand of a SET instruction in step number 5 but also an operand of a contact in step number 6. The operands are elements of the cross-reference result. A technique for displaying a processing result of the analysis command VAR_REF is also the same as the conventional technique for forming a cross-reference.

An example of a VAR_REF result display screen obtained when a comment of the variables (devices) M is described in a related device comment file is also shown in FIG. 12.

Similarly, equation number S003 in FIG. 7 shows an example in which a program SUB serving as a POU is designated to be read, and sequentially executed equation number S004 shows an example in which a cross-reference related to all variable (devices) M in the program SUB read by execution of an analysis command in equation number S003. An example of a VAR_REF result display screen in equation number S004 is shown in FIG. 13.

(C) An analysis command AND shown in FIG. 7 is a command to extract a logical product of data sets extracted as a processing result, and is executed by the AND processing executing part 17 in FIG. 2. A user designates two equation numbers serving as subjects of the logical product are designated in an analysis subject (first argument) cell and an analysis condition (second argument) cell, respectively. Equation number S005 in FIG. 7 shows an example in which a logical product of a cross-reference result extracted in equation number S002 and a cross-reference result extracted in equation number S004 is designated to be extracted. More specifically, equation number S005 shows an example in which a cross-reference related to all the variables (devices) M used in the program MAIN and also used in the program SUB is designated to be extracted.

Figure 14:
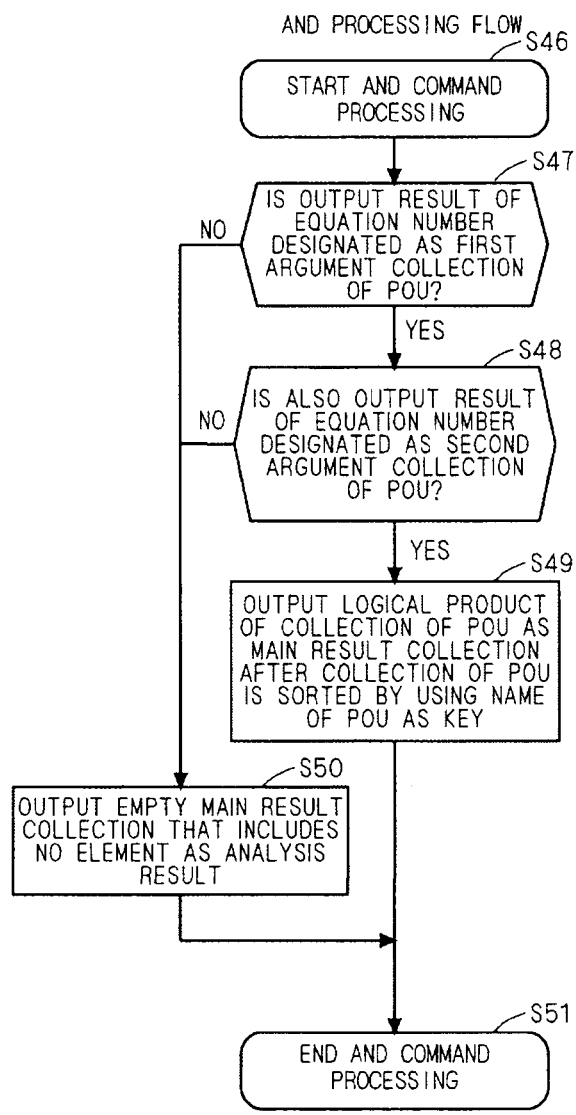
FIG. 14 is a flow chart showing an AND processing flow.
Figure 15:
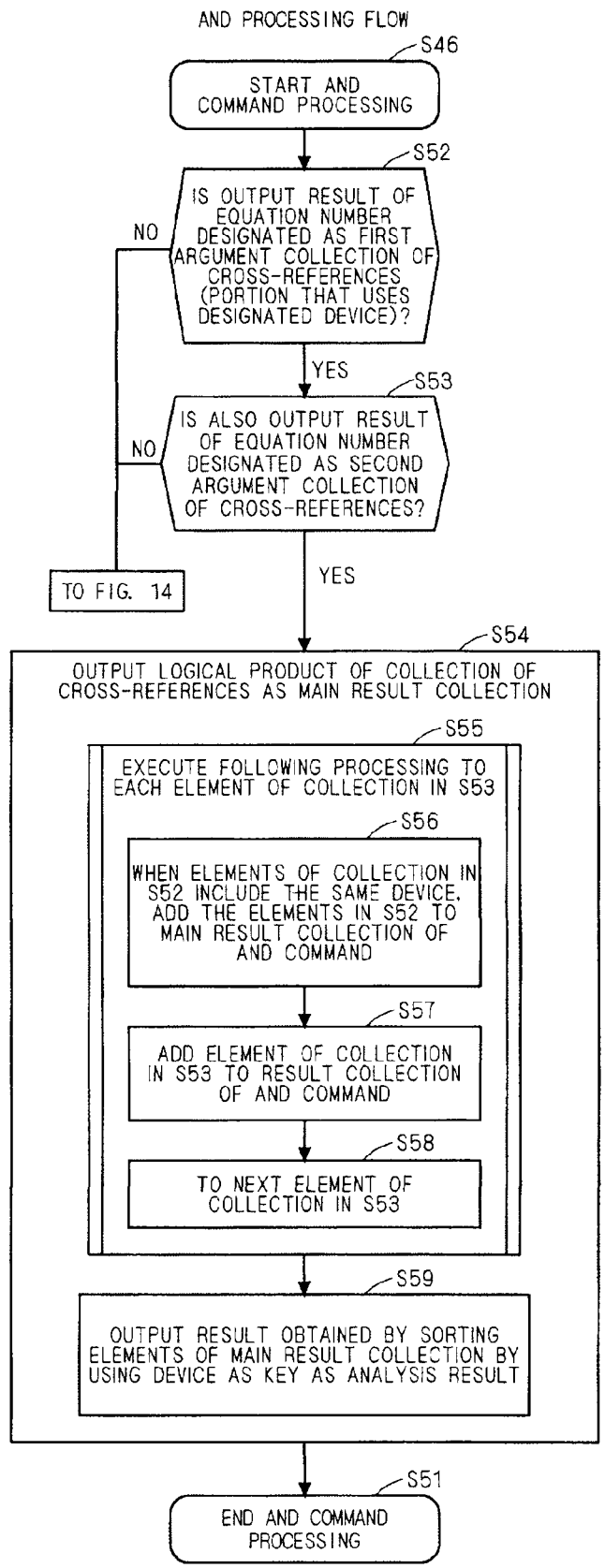
FIG. 15 is a flow chart showing an AND processing flow.

A flow of processing of an analysis command AND executed by the AND processing executing part 17 is shown in the flow charts in FIGS. 14 and 15. AND processing between POU collections shown in FIG. 14 is simple logical product processing. However, when AND processing between collections of cross-references (use portions of designated device) is understood as a simple logical product, an empty result is obtained in any case. This is because, since a position where a variable (device) M4 is used in the program MAIN and a portion where the variable (device) M4 in the program SUB are different from each other except for the variable (device), it is not assumed that both the use portions are identical with each other.

A characteristic point in the embodiment of the present invention is in the AND processing (See FIG. 15.) between collections of cross-references (use portions of designated device). More specifically, the characteristic point is that being identical variable (device) is an operation reference of a logical product. For example, since a portion (See FIG. 11.) where the variable (device) M4 is used in the program MAIN and a portion (See FIG. 13.) where the variable (device) in the program SUB use the identical variable (device), the portions are left as results of logical products. Another characteristic point is that respective elements are left as results. For example, since the portion where the variable (device) M4 is used in the program MAIN and the portion where the variable (device) in the program SUB use the identical variable (device), both the portions are left as elements of a result collection. When the AND processing executing part 17 performs processing as described above, the result in equation number S005 in FIG. 7 is as shown in FIG. 16.

(D) An analysis command OR shown in FIG. 7 is a command to extract a logical sum between sets of different data extracted as processing results, and is executed by the OR processing executing part 18 in FIG. 2. A user designates two equation numbers serving as subjects of the logical sum in an analysis subject (first argument) cell and an analysis condition (second argument) cell, respectively. Equation number S006 in FIG. 7 shows an example in which a logical sum of a cross-reference result extracted in equation number S002 and another cross-reference result extracted in equation number S004 is designated to be extracted. More specifically, equation number S006 shows an example in which a cross-reference related to all the variables (devices) M used in the program MAIN or the program SUB is designated to be extracted.

Figure 17:
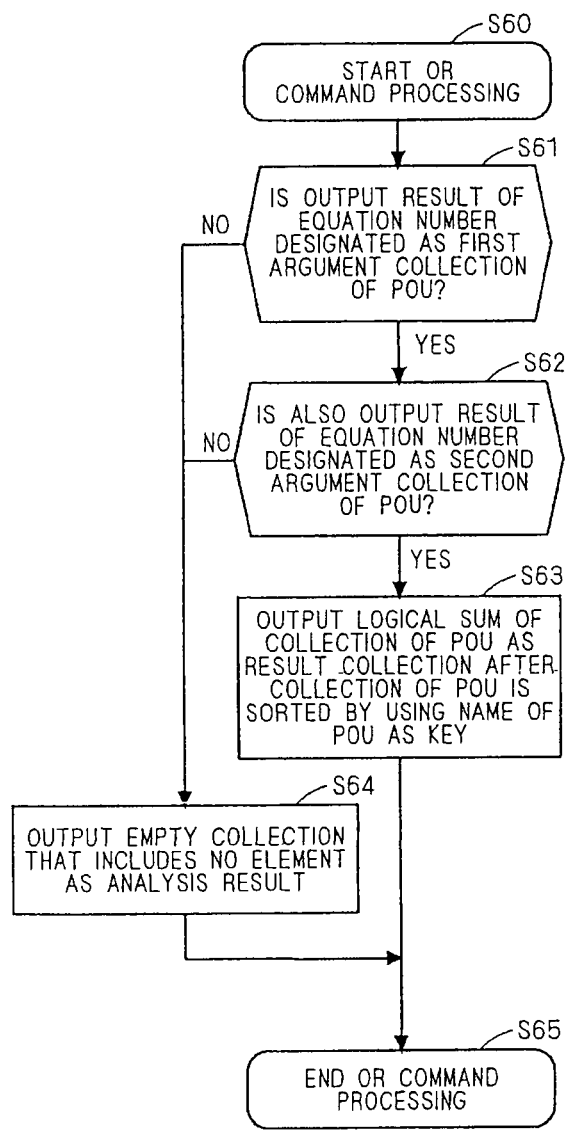
FIG. 17 is a flow chart showing an OR processing flow.
Figure 18:
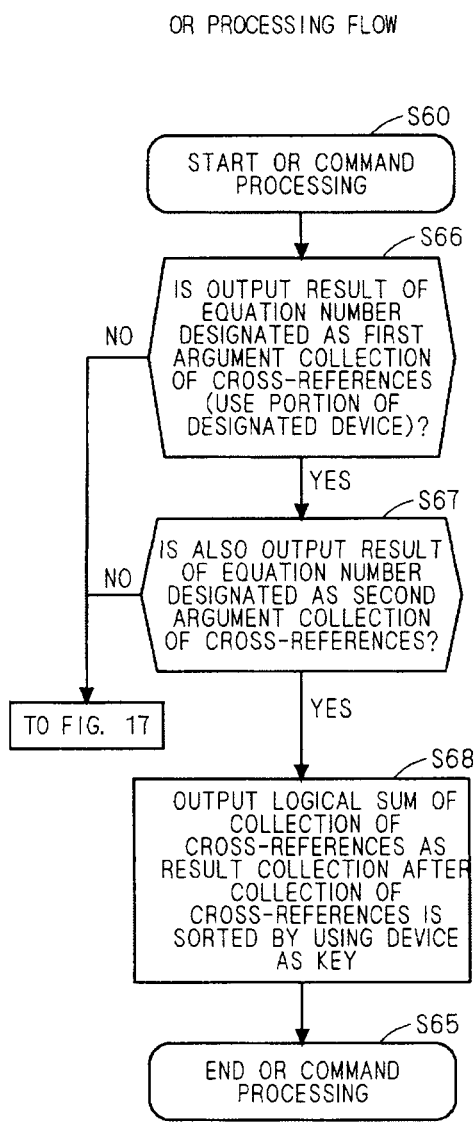
FIG. 18 is a flow chart showing an OR processing flow.

With respect to OR command processing, OR processing between POU collections is simple logical sum processing, and OR processing between collections of cross-references (use portions of designated device) is also simple logical sum processing. A flow of processing of an analysis command OR executed by the OR processing executing part 18 in FIG. 2 is as shown in FIGS. 17 and 18. The processing is performed as described above, a processing result of equation number S006 in FIG. 7 is as shown in FIG. 19.

(E) An analysis command NOT shown in FIG. 7 is a command to extract a data set obtained by excluding elements of another data set from elements of a certain data set extracted as a processing result, and is executed by the NOT processing executing part 19 in FIG. 2. A user designates an equation number serving as a population in an analysis subject cell, and designates an equation number serving as a set of elements excluded from the population in an analysis condition cell. Equation number S007 in FIG. 7 shows an example in which a cross-reference result obtained after a cross-reference result extracted in equation number S004 is excluded from a cross-reference result extracted in equation number S002 is designated to be extracted. More specifically, equation number S007 shows an example in which a cross-reference related to variables (devices) M that are not used in the program SUB in all the variables (devices) M used in the program MAIN is designated to be extracted.

Figure 20:
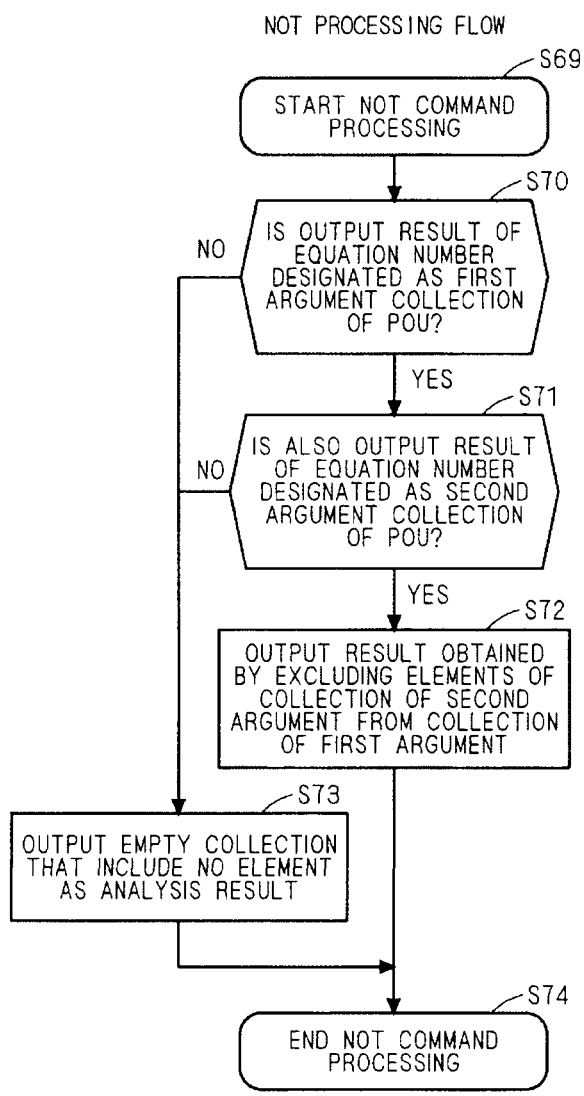
FIG. 20 is a flow chart showing a NOT processing flow.
Figure 21:
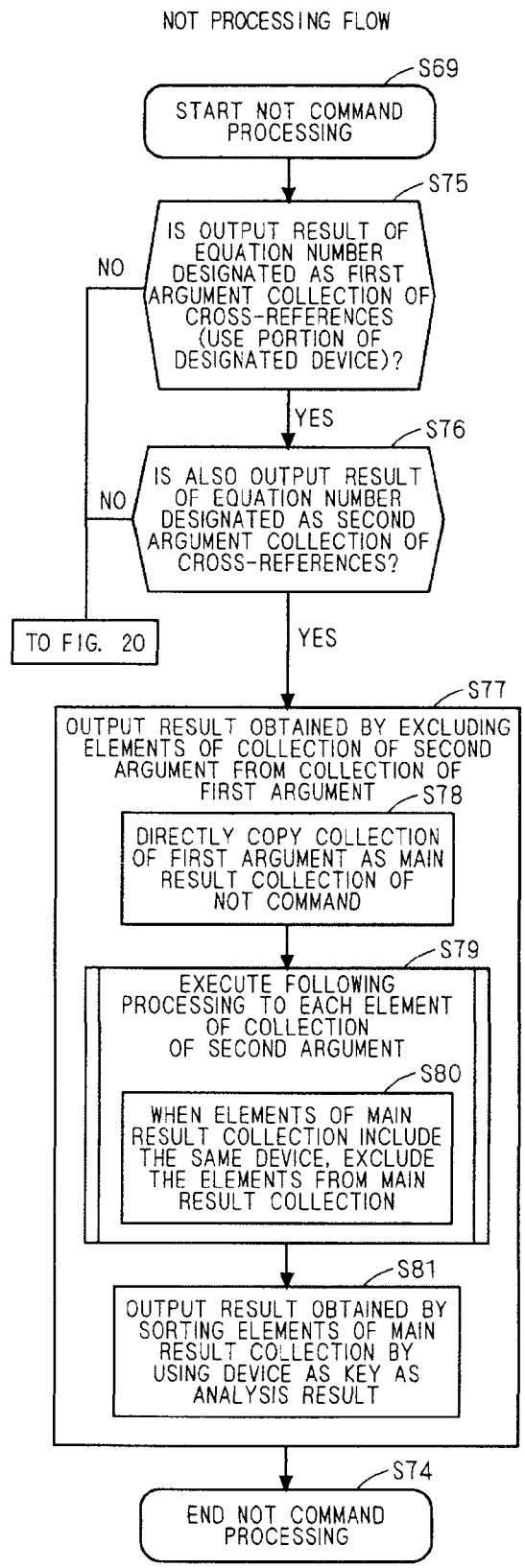
FIG. 21 is a flow chart showing a NOT processing flow.

A flow of processing of an analysis command NOT executed by the NOT processing executing part 19 is shown in FIGS. 20 and 21. NOT processing (See FIG. 20.) between collections of POUs is simple excluding processing. However, when NOT processing between collections of cross-references (use portions of a designated device) is simply performed as excluding processing, nothing is excluded in any case as a result. This is because, since a position where a variable (device) M4 is used in the program MAIN and a portion where the variable (device) M4 in the program SUB are different from each other except for the variable (device), it is not assumed that both the portions are identical with each other.

The embodiment of the present invention has its characteristic point in the NOT processing (See FIG. 21.) between collections of cross-references (use portions of designated device). More specifically, the characteristic point of the present invention is that being identical variable (device) is an operation reference of excluding processing. For example, since the portion where the variable (device) M4 is used in the program MAIN and the portion where the variable (device) M4 in the program SUB use the identical variable (device), the portions are excluded from the collections as subjects of excluding processing. When the NOT processing executing part 19 performs NOT processing as described above, the result in equation number S007 in FIG. 7 is as shown in FIG. 22.

In equation number S008 in FIG. 7, both a first argument and a second argument are POU collections. A result of the OR processing between the collections is a POU collection including the program MAIN and the program SUB as elements.

An analysis command VAR_REF in equation number S009 in FIG. 7 is an example obtained when the number of elements of the POU collection of the first argument is not 1 but 2. A processing flow will be described below with reference to FIG. 10.

In this case, in processing of analysis command VAR_REF, the processing of the analysis command VAR_REF is recursively used to solve a problem. In equation number S009 in FIG. 7, in the variable use list extraction processing executing part 12 in FIG. 2, the program MAIN serving as a first element of a POU collection having two elements processes an analysis command VAR_REF designated in the analysis subject cell (Processing performed when the number of elements of the POU collection designated in the analysis subject cell of the analysis command VAR_REF is base processing of the analysis command VAR_REF, and the processing is as described above in the above described (B).), OR processing between the result collection of the processing and a main result collection in equation number S009 (At this time, the collection is an empty collection including no element.) is performed (OR processing is as described in the above (D).), and a result thereof is updated as the main result collection in equation number S009 (At this time, the contents of the collection are the same as that of the processing result collection of the analysis command VAR_REF designated in the analysis subject cell by the program MAIN.).

In the variable use list extraction processing executing part 12, the program SUB serving as a second element processes an analysis command VAR_REF designated in the analysis subject cell, and OR processing between the result collection of the processing and a main result collection in equation number S009 (At this time, the contents of the main result collection are the same as those of the processing result collection of the analysis command VAR_REF designated in the analysis subject cell by the program MAIN.) is performed, and a result thereof is updated as the main result collection in equation number S009.

When the variable use list extraction processing executing part 12, for all the elements of the POU collection designated in the analysis subject cell, completes the recursive processing of the analysis command VAR_REF and the OR processing between the result collection of the processing and the main result collection in equation number S009, the variable use list extraction processing executing part 12 sorts the main result collection in equation number S009 by using the variable (device) as a key, and outputs the sorted main result collection as a final result collection in equation number S009.

The processing is performed as described above, the result in equation number S009 is the same as the result in equation number S006 as shown in FIG. 19.

The analysis command VAR_REF is an operator that is linear to a POU collection serving as an analysis subject. More specifically, it is assumed that a processing flow is given by FIG. 10 such that the analysis command VAR_REF is linear command definition. For this reason, such recursive processing can be performed.

An analysis subject is expressed as an argument of a VAR_REF function, and an OR operation is expressed as + to describe linearity of the analysis command VAR_REF. In this case, equation number S009 is expressed by an equation given by Numerical 1.

$$\text{VAR\_REF}(S008) = \text{VAR\_REF}(\text{MAIN} + \text{SUB}) = \text{VAR\_REF}(\text{MAIN}) + \text{VAR\_REF}(\text{SUB}) \quad [\text{Numerical 1}]$$

The analysis command VAR_REF is designed as an operator that is also linear to a variable (device) serving as an analysis condition. Equation number S010 is expressed by an equation given by Numerical 2. The analysis command VAR_REF is recursively used to make it possible to perform processing in equation number S010.

$$\text{VAR\_REF}(M[0-9] \cdot M[20-29]) = \quad [\text{Numerical 2}]$$
$$\text{VAR\_REF}(m0 + \ldots + M9 + M20 + \ldots + M29) =$$
$$\text{VAR\_REF}(M0) + \ldots + \text{VAR\_REF}(M9) +$$
$$\text{VAR\_REF}(M20) + \ldots + \text{VAR\_REF}(M29)$$

However, in terms of processing time, without performing the recursive processing, in step S42 of the processing flow in FIG. 10, the variable use list extraction processing executing part 12 may simultaneously process M [0-9] and M [20-29]. In this case, the same result as described above is obtained.

Effect of Embodiment 1

As described above, a logical operation (AND processing/OR processing/NOT processing) between collections of a cross-reference (use portions of a designated device) is made available to make it possible to extract a desired cross-reference.

Formation of a cross-reference obtained when a result collection of a logical operation (AND processing/OR processing/NOT processing) between collections of POUs is designated as an analysis subject is made available to make it possible to extract a desired cross-reference.

The analysis command VAR_REF is defined as an operator that is linear to the POU collection serving as the analysis subject. In addition, the analysis command VAR_REF is defined as an operator which is also linear to the variable (device) serving as the analysis condition. Therefore, a program analysis support function that can secure the same result even though a cross-reference operation and logical operations are combined in any order can be provided.

Embodiment 2

In the embodiment, as a concrete example of a technique for extracting a directed graph of dependence of variables (devices) in a program, a technique for extracting a directed graph of dependence of devices in a ladder program will be described below.

Figure 23:
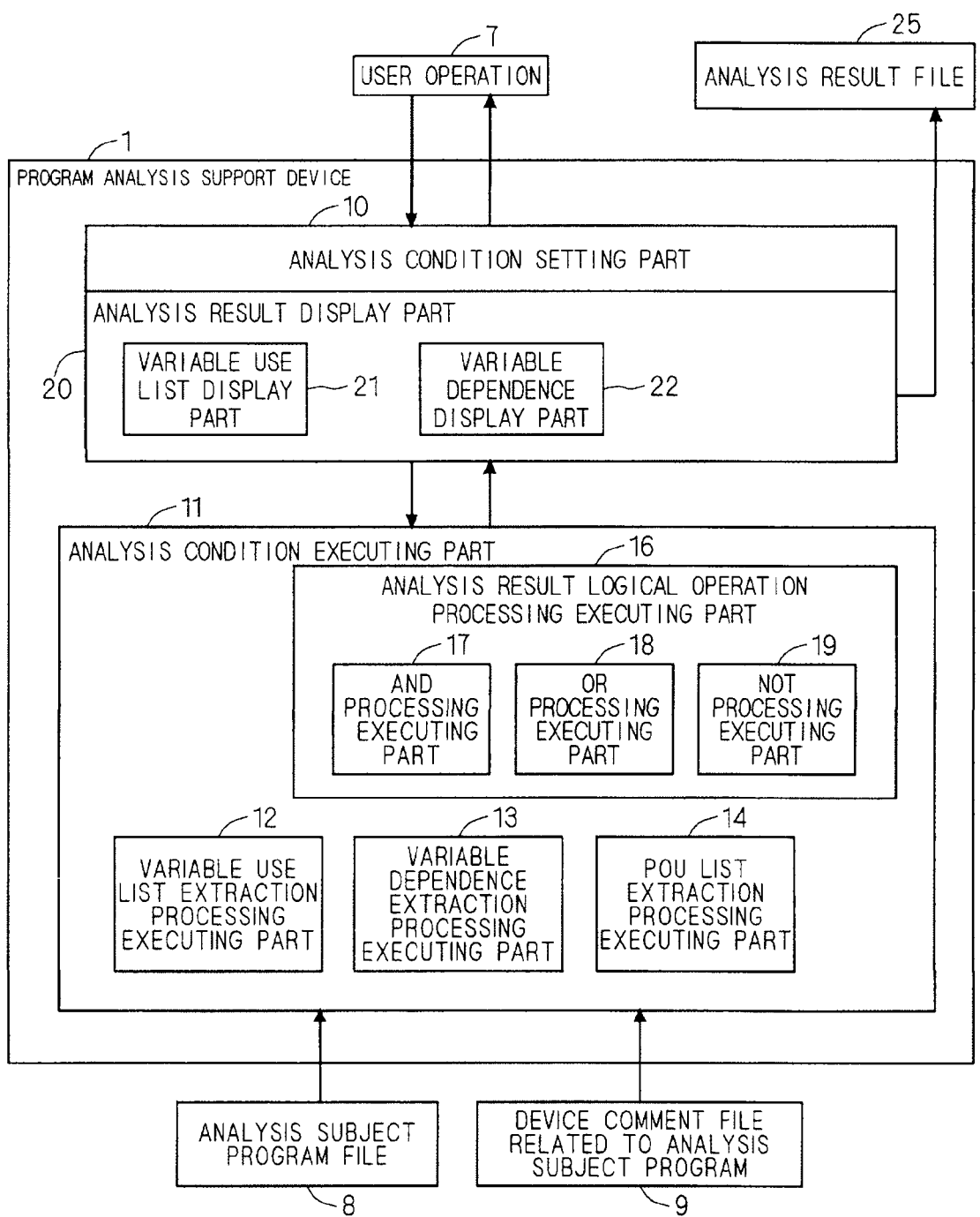
FIG. 23 is a functional block diagram showing a software configuration of a program analysis support device according to Embodiment 2.

As shown in FIG. 23, in comparison with the case in FIG. 2, the analysis condition executing part 11 further includes a variable dependence extraction processing part 13 serving as a functional part to process variable (device) dependence directed graph extraction, and the analysis result display part 20 further includes a variable dependence display part 22 that forms and outputs image data to display a variable (device) dependence directed graph result on the display part 4 in FIG. 1.

A basic explanation about dependence (directed graph of) of variables in a general program is disclosed in Non-patent Document 2.

A directed graph of dependence of variables in a ladder program will be described first with reference to FIGS. 24 to 27.

A basic ladder program is configured by a contact, a coil, and a bus. In particular, a horizontal line (ladder circuit) that is connected to a left bus and a right bus and on which a contact and/or a coil is arranged will be referred to as a Rung (rung) hereinafter. Therefore, the Rung is a constituent element of a ladder program. An element constituting a Rung such as a contact or a coil will be referred to as an Instruction (instruction) hereinafter. A ladder structure in FIG. 24 shows concrete examples of a Rung serving as a constituent element of a ladder program and an Instruction serving as a constituent element of the Rung.

The Instruction is configured by an Operator (instruction) and Operand (operand). The Operand is an argument of the Operator. Some Operator requires one Operand, and some Operator requires two or more Operands. FIG. 25 shows concrete examples of the Operator and the Operand.

In a ladder program, when a value (state) of a contact changes, a value (state) of a coil placed on the same Rung also changes. More specifically, a value of a device serving as a coil depends on a value of a device serving as a contact. When this relationship is generalized and described, an Instruction having an Operator that writes a device is placed on the upstream, i.e., the left side of the same Rung, and depends on an Instruction having an Operator that reads a device.

Also in an Instruction having an Operator that requires two or more Operand, devices have dependence. For example, since a MOV instruction designates a read device as a first operand and designates a write device as a second operand, the value of the second operand depends on the first operand.

When a write device placed on a certain Rung is placed as a read device of another Rung, through the device, dependences of devices are linked in succession.

FIGS. 26 to 28 show concrete examples of dependence of Instructions and dependence of devices in a ladder program.

A technique for extracting a directed graph of dependence of devices in a ladder program will be described below. FIG. 29 is an example of a screen of the display part 4 to cause a user to input a program analysis condition, and corresponds to the rest of the example of the screen in FIG. 7.

An analysis command VAR_FWD in FIG. 29 is a command to extract a variable (device) that a designated variable (device) influences and to obtain a directed graph (directed graph of forward dependence) that shows the variable dependence. For the analysis command VAR_FWD, a user designates an equation number that designates a program serving as an analysis subject in the analysis subject cell and designates a variable (device) serving as a start point of a forward dependence directed graph in the analysis condition cell. Equation number S011 shows an example in which the variable use list extraction processing executing part 12, in a program MAIN and a program SUB serving as elements included in a POU collection output as a processing result in equation number S008, designates extraction of a directed graph of forward dependence from a variable (device) x222. The variable dependence extraction processing executing part 13 outputs, as an analysis result in equation number S011, data required to draw a directed graph to the variable dependence display part 22.

A processing technique used when the variable dependence extraction processing executing part 13 extracts a directed graph of forward dependence from a variable (device) designated by a user from a ladder program designated by the user is not disclosed in Non-patent Document 3 described above. For this reason, a processing flow of the analysis command VAR_FWD executed by the variable dependence extraction processing executing part 13 is shown in the flow chart in FIG. 30.

In the following description, the variable dependence extraction processing executing part 13 executes processing designated by equation number S011 in FIG. 29 along the flow in FIG. 30 to obtain a result in FIG. 31.

Figure 30:
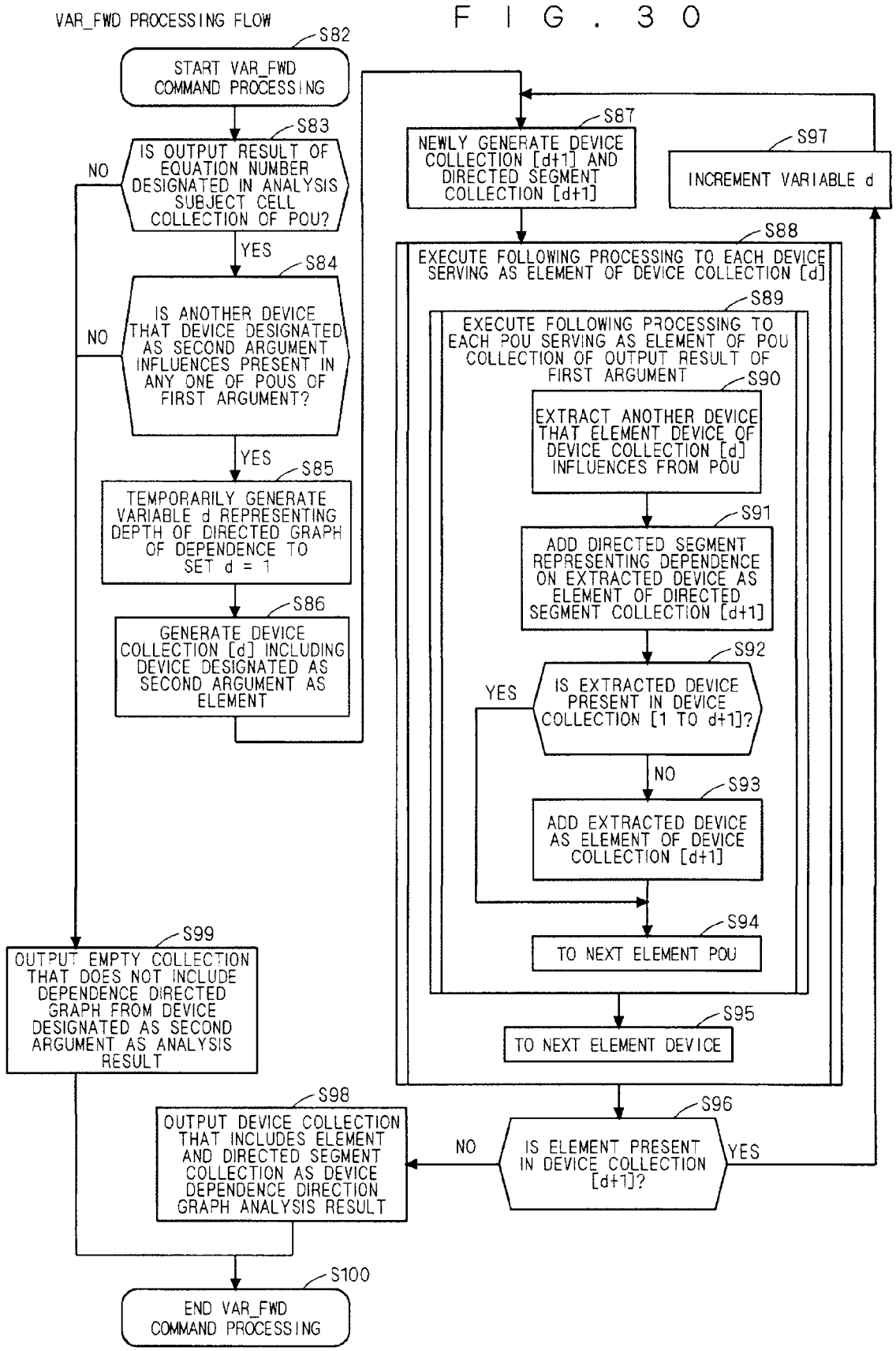
FIG. 30 is a flow chart showing a VAR_FWD processing flow.

In step S86 in FIG. 30, the variable dependence extraction processing executing part 13 generates a device collection [1] including a variable (device) x222 serving as a second argument in equation number S011 as elements.

In step S87, the part 13 generates a device collection [2] and a directed segment collection [2].

In step S90, the part 13, in the program MAIN, extracts another variable (device) M3 that the variable (device) x222 serving as the element of the device collection [1] influences.

In step S91, the part 13 adds a directed segment from the variable (device) x222 to the variable (device) M3 to the directed segment collection [2]. As a data structure of the directed segment obtained at this time, only a dependence source device and a dependence destination device need to be held. In consideration of embodiments (will be described later), a POU name, a step number, and an instruction can also be held in the data structure of the directed segment.

In the next step S92, the part 13 determines whether the extracted variable (device) M3 is present in the device collection [1] or [2]. In this example, since the variable (device) M3 is not present in the device collections [1] and [2], in step S93, the extracted variable (device) M3 is added to the device collection [2].

In the next step S94, the part 13 tries to execute equivalent processing to the program SUB serving as the next POU collection element. However, in the example, the variable (device) x222 is not present in the program SUB.

The part 13, in step S95, executes processing to the next element device. However, in the example, the device collection [1] does not include an element except for the variable (device) x222. For this reason, in step S96, the part 13 determines "NO" to shift to the next step S97.

In step S97, the part 13 increments a variable d of the device collection. As a result, the part 13 sets d=2 and generates a device collection [3] and a directed segment collection [3] in step S87.

In the next step S90, the part 13, in the program MAIN, extracts another variable (device) M4 that the variable (device) M3 serving as the element of the device collection [2] influences.

In this state, in step S91, the part 13 adds a directed segment from the variable (device) M3 to the variable (device) M4 to the directed segment collection [3].

In step S92, the part 13 determines whether the extracted variable (device) M4 is present in the device collections [1] to [3]. In the example, since the variable (device) M4 is not present in the device collections [1] to [3], in step S93, the variable (device) M4 is added into the device collection [3].

In the next step S94, the part 13 tries to start execution of processing to the program SUB serving as the next element POU. However, since the variable (device) M3 is not present in the program SUB, the part 13, in step S95, tries to execute processing to the next element device, but cannot execute the processing because an element except for the variable (device) M3 is not present in the device collection [2]. In step S96, the part 13 determines "YES" to shift to the next step S97.

In step S97, the part 13 further increments a variable d of the device collection. As a result, the part 13 sets d=3 and generates a device collection [4] and a directed segment collection [4] in step S87.

In the program MAIN, another variable (device) that the variable (device) M4 serving as an element of the device collection [3] influences is not present.

The part 13, in the program SUB serving as an element of the next POU collection, extracts other variables (devices) M7 and M8 that the variable (device) M4 serving as an element of the device collection [3] influences (step S90).

In this state, in step S91, the part 13 adds a directed segment from the variable (device) M4 to a variable (device) M7 and a directed segment from the variable (device) M4 to a variable (device) M8 to the directed segment collection [4].

In step S92, the part 13 determines whether the extracted variables (devices) M7 and M8 are present in the device collections [1] to [4]. In the example, since the variables (devices) M7 and M8 are not present in the device collections [1] to [4], in step S93, the part 13 adds the variables (devices) M7 and M8 into the device collection [4].

In step S94, no next element POU is present.

In step S95, the part 13 tries to execute processing to the next element device. However, since an element except for the variable (device) M4 is not present in the device collection [3], the part 13 cannot execute the processing. In step S96, the part 13 determines "YES" to shift to the next step S97.

In step S97, the part 13 further increments a variable d of the device collection. As a result, the part 13 sets d=4 and generates a device collection [5] and a directed segment collection [5] in step S87.

In the program MAIN, another variable (device) that the variable (device) M7 serving as an element of the device collection [4] influences is not present.

The part 13, in the program SUB serving as an element of the next POU collection, extracts another variable (device) YOC10 that the variable (device) M7 serving as an element of the device collection [4] influences (step S90).

In this state, in step S91, the part 13 adds a directed segment from the variable (device) M7 to the variable (device) YOC10 to the directed segment collection [5].

In step S92, the part 13 determines whether the extracted variable (device) YOC10 is present in the device collections [1] to [5]. In the example, since the variable (device) YOC10 is not present in the device collections [1] to [5], in step S93, the part 13 adds the variable (device) YOC10 into the device collection [5].

In step S94, no next element POU is present.

For this reason, the part 13, in step S95, tries to execute processing to the next element device. However, since another variable (device) that the next variable (device) M8 influences is not present in the program MAIN and the program SUB, in step S96, the part 13 determines "YES" to shift to the next step S97.

In step S97, the part 13 further increments a variable d of the device collection. As a result, the part 13 sets d=5 and generates a device collection [6] and a directed segment collection [6] in step S87.

In the program MAIN, another variable (device) that the variable (device) YOC10 serving as an element of the device collection [5] influences is not present. In addition, even in the program SUB serving as an element of the next POU collection, another variable (device) that the variable (device) YOC10 influences is not present.

For this reason, the part 13, in step S96, determines whether the device collection [6] includes an element. However, since the device collection [6] does not include an element, the part 13 shifts to step S98.

In step S98, the part 13 outputs the device collections [1] to [5] and the directed segment collections [2] to [5] to the variable dependence display part 22 as a directed graph analysis result of forward dependence.

Thereafter, the variable dependence display part 22 outputs drawing data representing the directed graph analysis result of the forward dependence given on the basis of the device collections [1] to [5] and the directed segment collections [2] to [5] to the display part 4 in FIG. 1. As a result, the display part 4 draws, on a screen thereof, the directed graph analysis result of the forward dependence given on the basis of the device collections [1] to [5] and the directed segment collections [2] to [5]. The drawing result is as shown in FIG. 31.

An example of a screen obtained when a comment of a variable (device) is described in a related device comment file is also shown in FIG. 31.

A conventional technique may be used in drawing of a directed graph. A description of a procedure of concretely drawing a directed graph on the basis of the device collections [1] to [5] and the directed segment collections [2] to [5] that show the structure of the directed graph is omitted because the description departs from the spirit and scope of the present invention.

The processing designated by equation number S012 in FIG. 29 may be similarly performed by the variable dependence extraction processing executing part 13 according to the flow shown in FIG. 30. As a result, a result shown in FIG. 32 is obtained.

Effect of Embodiment 2

Extraction of a directed graph of forward dependence of a device using a ladder program as an analysis subject is made possible, or extraction of a directed graph of forward dependence of a device using POU collections in the ladder program and a result of a logical operation (AND processing/OR processing/NOT processing) between the POU collections as analysis subjects is made possible to make it possible to save power of an operation related to program analysis.

Embodiment 3

The embodiment describes a technique for extracting a directed graph of backward dependence of a variable (device) in a ladder program.

An analysis command VAR_BWD used in this case is a command to extract a variable (device) that a variable (device) designated by a user influences and to obtain a directed graph (directed graph of backward dependence) that shows the dependence. With respect to an input of a program analysis condition, for the analysis command VAR_BWD, the user designates an equation number that designates a program serving as an analysis subject in analysis condition cell, and designates a variable (device) serving as a start point of a backward dependence directed graph in the analysis condition cell. Equation number S015 in FIG. 29 shows an example in which extraction processing of a directed graph of backward dependence from a variable (device) YC10 in a program MAIN and a program SUB serving as elements (element POUs) included in a POU collection output as a logical processing result of equation number S008 is designated. The variable dependence extraction processing executing part 13 in FIG. 23 outputs, as an analysis result thereof, data required to draw a directed graph of the backward dependence to the variable dependence display part 22.

FIG. 33 is a flow chart showing a processing flow of the analysis command VAR_BWD executed by the variable dependence extraction processing executing part 13. The processing flow is almost the same as the processing flow of the analysis command VAR_FWD in FIG. 30 described in Embodiment 2, and is different from the processing flow in the following three points.

More specifically, in step S109 in FIG. 33, unlike in step S90 in FIG. 30, the variable dependence extraction processing executing part 13 extracts another variable (device) that influences a designated variable (device).

Furthermore, in step S110 in FIG. 33, unlike in step S91 in FIG. 30, the variable dependence extraction processing executing part 13 performs additional processing to a directed segment representing dependence from a variable (device) extracted in step S109.

Furthermore, in step S117 in FIG. 33, the variable dependence extraction processing executing part 13 performs processing in step S98 in FIG. 30 and processing to invert depth numbers of a device collection and a directed segment collection, and outputs a result obtained after the inverting processing as a device dependence directed graph analysis result.

For example, when it is assumed that device collections [1] to [n] are obtained, the variable dependence extraction processing executing part 13 outputs the device collection [1] as the device collection [n], outputs the device collection [2] as a device collection [n−1], . . . , generally outputs a device collection [k] as a device collection [n−k+1], . . . , and outputs the device collection [n] as the device collection [1].

When it is assumed that directed segment collections [2] to [n] are obtained, the variable dependence extraction processing executing part 13 outputs the directed segment collection [2] as the directed segment collection [n], outputs the directed segment collection [3] as a directed segment collection [n−1], . . . , generally outputs a directed segment collection [k] as a directed segment collection [n−k+2], . . . , and outputs the directed segment collection [n] as the directed segment collection [2].

The directed segment belongs to a depth of a directed segment collection set with reference to a depth of a dependence source device thereof in principle. When numbers of directed segment collections are inverted to each other, the variable dependence extraction processing executing part 13 moves the elements of all the directed segments to depths to the elements should belong.

When a directed graph is drawn on the basis of the device collection and the directed segment collection obtained as described above, a drawing result is as shown in FIG. 34.

A point to which special attention should be paid is that, when the numbers of all the directed segment collections are inverted, the elements of all the directed segments are moved to depths to which the elements should belong.

In FIG. 34, before the numbers of the directed segment collections are inverted, a directed segment collection [d=3] includes five element directed segments [X223→M6], [D2→M6], [D3→M6], [M4→M7], and [M5→M7], and a directed segment collection [d=4] includes four element directed segments [M3→M4], [X223→M5], [D2→M5], and [D3→M5].

In this state, when the variable dependence extraction processing executing part 13 performs processing to invert only depth numbers of the directed segment collections, a directed segment collection [d=4] includes five element directed segments [X223→M6], [D2→M6], [D3→M6], [M4→M7], and [M5→M7], and, on the other hand, a directed segment collection [d=3] includes four element directed segments [M3→M4], [X223→M5], [D2→M5], and [D3→M5].

For this reason, the variable dependence extraction processing executing part 13 performs processing to move the directed segments such that the directed segments belong to depths of directed segment collection having a depth of a dependence source device of the directed segments. As a result, three element directed segments [X223→M5], [D2→M5], and [D3→M5] of element directed segments of the directed segment collection [d=3] should belong to a depth d=4 because a depth of the dependence source device after the depth numbers inverted is d=3, and are moved to the directed segment collection [d=4].

In this manner, as a result, the directed segment collection [d=4] includes eight element directed segments [X223→M6], [D2→M6], [D3→M6], [M4→M7], [M5→M7], [M223→M5], [D2→M5], and [D3→M5], and the directed segment collection [d=3] includes one element directed segment constituted by [M3→M4].

Effect of Embodiment 3

Since extraction of a directed graph of backward dependence of a variable (device) using a ladder program as an analysis subject is made possible, or extraction of a directed graph of backward dependence of a variable (device) using POU collections in the ladder program and a result of a logical operation (AND processing/OR processing/NOT processing) between the POU collections as analysis subjects is made possible, power of an operation related to program analysis can be saved.

Embodiment 4

In the embodiment, a technique that makes a logical operation (logical sum OR processing) between directed graphs of dependence of devices in the ladder program possible is described.

An analysis command OR is a command to extract a logical sum between different sets of data extracted as a processing result. By using the input part 5, a user designates two equation numbers serving as subjects of the logical sum in an analysis subject (first argument) cell and an analysis condition (second argument) cell, respectively. Equation number S013 in FIG. 29 shows an example in which a logical sum between a device dependence directed graph extraction result extracted by processing in equation number S011 and another device dependence directed graph extraction result extracted by processing in equation number S012 is designated to be extracted.

Therefore, the present invention proposes an example in which an analysis command to execute a logical sum between cross-references and an analysis command to execute a logical sum between device dependence directed graphs are designated by the same analysis command OR.

Figure 35:
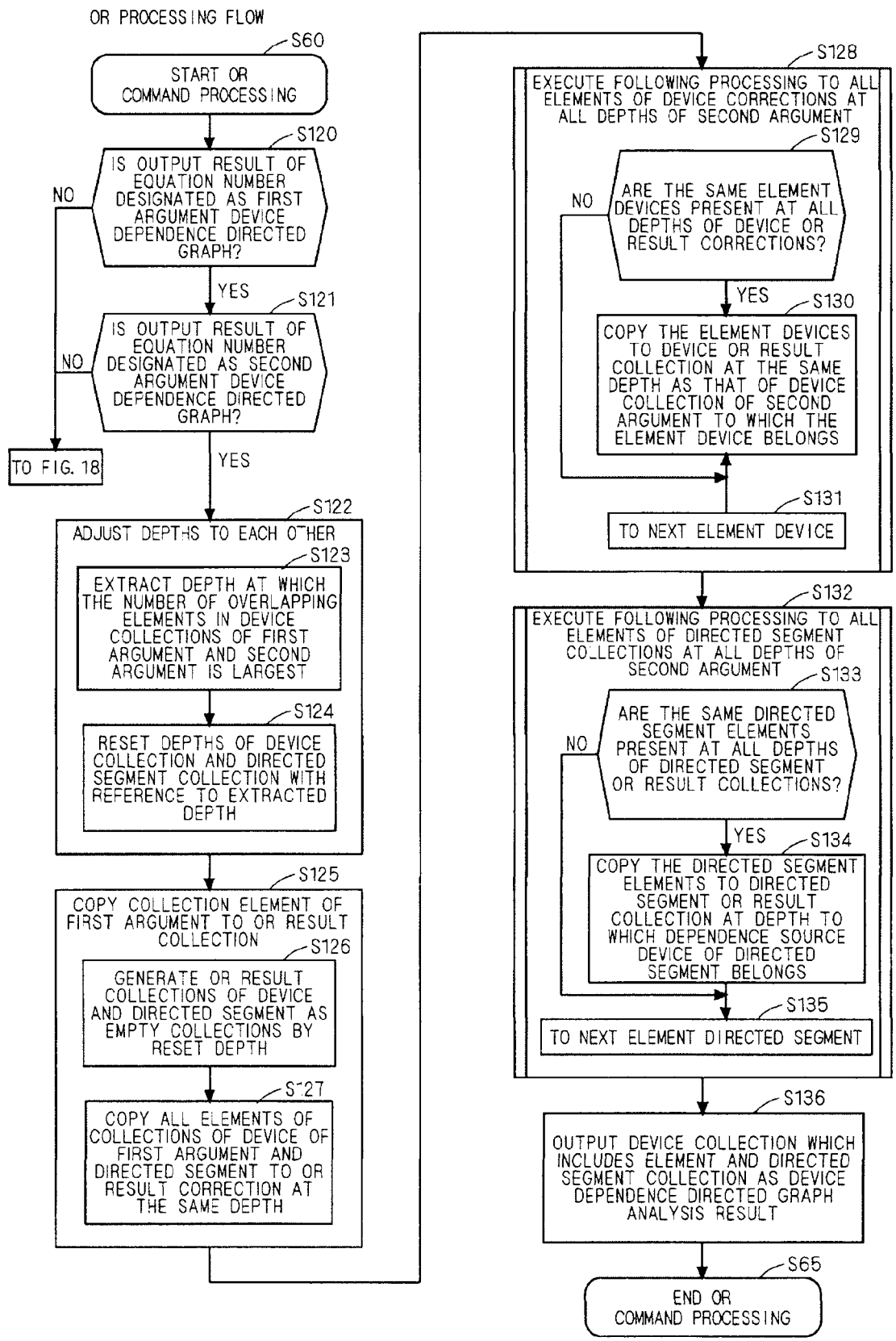
FIG. 35 is a flow chart showing an OR processing flow.

FIG. 35 is a flow chart showing a processing flow of an analysis command OR executed by the OR processing executing part 18 in FIG. 23.

First, the part 18 confirms, in steps S120 and S121 in FIG. 35, whether a data type serving as a subject of a logical sum is a device dependence directed graph. When the data type is not a device dependence directed graph, the part 18 executes the processing flow in FIG. 18 described above.

In the other hand, when the analysis command OR is an operation of a logical sum between device dependence directed graphs, the part 18 performs, as a preparation for coupling the first argument and the second argument to each other, processing to adjust depth levels of both the arguments (step S122), and all the elements of the first argument are used as bases of the above coupling (step S125).

The part 18 sequentially couples collections to each other while confirming the element of the second argument overlapping the elements of the first argument. In the coupling between the collections, the part 18 processes coupling (logical sum) between device collections (step S128) and then processes coupling (logical sum) between directed segment collections (step S132).

When the OR processing executing part 18 sequentially performs processing to equation number S013 in FIG. 29 according to the flows shown in FIG. 35, as processing results of logical sums in FIGS. 31 and 32, a result shown in FIG. 36 is obtained. This point will be described below in detail.

In step S123 in FIG. 35, the part 18 extracts, as a depth at which the number of overlapping elements is maximum, a combination of d=4 of a first argument and d=3 of a second argument that are depths at which variables (devices) M7 and M8 overlap.

In the next step S124, the part 18 keeps the depth of the first argument without change and resets the depths of the collections such that d=3 of the second argument is adjust to d=4 of the first argument. As a criterion for determining an argument the depth of which is kept without change in both the arguments, the depth of the argument having the large value of combinations extracted in step S123 is kept without change. When the values of the depths of the extracted combinations are equal to each other, the depths of both the arguments need not be reset. In the processing in equation number S013, collections (device collections [2] to [4] and directed segment collections [3] to [5]) of values of depths after only +1 is added to the value of the depth of the collection of the second argument are handled in the following steps.

In the next step S126, the part 18 generates a collection of a depth corresponding to a value of large one of the depths of first argument and the second argument after the depths are reset. In the processing in equation number S013, the part 18 generates device OR result collections [1] to [5] and directed segment OR result collections [2] to [5] as empty collections.

In this state, in step S127, the part 18 copies all the collection elements of the first argument to the OR result collection. In the copying, the part 18, with attention to that the depth of the first argument is kept without change in step S124, keeps a depth of a copy source (first argument) and a depth of a copy destination (OR result collection) and executes copy processing. If, in step S124, the depth of the first argument is reset, the depth of the copy source (first argument) and the depth of the copy destination (OR result collection are set in consideration of the above resetting.

Details of the next step S128 will be described below.

In step S129, the part 18 determines that a variable (device) x223 serving as an element of a device collection [device collection of depth=2 after resetting] of the second argument is not present all the depths of the device OR result collection (YES), in the next step S130, the part 18 copies the variable (device) x223 to a device OR result collection [2]. The part 18 shifts to step S131.

Since a variable (device) M5 serving as an element of a device collection [device collection of depth=3 after resetting] of the second argument is not present at all the depths of the device OR result collection (YES is determined in step S129), the part 18 copies the variable (device) M5 to a device OR result collection [3] (step S130).

Since a variable (device) M6 serving as an element of the device collection [device collection of depth=3 after resetting] of the second argument is not present at all the depths of the device OR result collection (YES is determined in step S129), the part 18 copies the variable (device) M6 to the device OR result collection [3] (step S130).

Since a variable (device) M7 serving as an element of the device collection [device collection of depth=4 after resetting] of the second argument is present at the depth of the device OR result collection [4] (NO is determined in step S129), the part 18 does not perform copy processing of the variable (device) M7.

Since a variable (device) M8 serving as an element of the device collection [device collection of depth=4 after resetting] of the second argument is present at the depth of the device OR result collection [4] (NO is determined in step S129), the part 18 does not perform copy processing of the variable (device) M8.

Since a variable (device) D5 serving as an element of the device collection [device collection of depth=4 after resetting] of the second argument is not present at all the depths of the device OR result collection (YES is determined in step S129), the part 18 copies the variable (device) D5 to the device OR result collection [4] (step S130).

Since a variable (device) YC10 serving as an element of the device collection [device collection of depth=4 after resetting] of the second argument is present at the depth of the device OR result collection [5] (NO is determined in step S129), the part 18 does not perform copy processing of the variable (device) YC10.

Details of the next step S132 will be described below.

In step S133, the part 18 determines that a directed segment [X223→M5] serving as an element of the directed segment collection [directed segment collection of depth=3 after resetting] of the second argument is not present all the depths of the directed segment OR result collection (YES), in the next step S134, the part 18 copies the directed segment to a directed segment OR result collection [3]. In the copying, the part 18 notes that, on the basis of a depth of a device OR result collection in which a dependence source device of a directed segment to be copied is present, the part 18 copies the directed segment to a depth (that is, device OR result collection +1). In this case, since a dependence source device X223 of the directed segment [X223→M5] to be copied is present in the device OR result collection [2], the part 18 copies the directed segment [X223→M5] to a directed segment OR result collection [3]. The part 18 shifts to the next step S135.

As a result, since a directed segment [M5→M7] serving as an element of the directed segment collection [directed segment collection of depth=4 after resetting] of the second argument is not present at all the depths of the directed segment OR result collection (YES is determined in step S133), the part 18 copies the directed segment [M5→M7] to the directed segment OR result collection [4] (step S134).

Since a directed segment [M5→M8] serving as an element of the directed segment collection [directed segment collection of depth=4 after resetting] of the second argument is not present at all the depths of the directed segment OR result collection (YES is determined in step S133), the part 18 copies the directed segment [M5→M8] to the directed segment OR result collection [4] (step S134).

Since a directed segment [M6→D5] serving as an element of the directed segment collection [directed segment collection of depth=4 after resetting] of the second argument is not present at all the depths of the directed segment OR result collection (YES is determined in step S133), the part 18 copies the directed segment [M6→M5] to the directed segment OR result collection [4] (step S134).

Since a directed segment [M6→YC10] serving as an element of the directed segment collection [directed segment collection of depth=4 after resetting] of the second argument is not present at all the depths of the directed segment OR result collection (YES is determined in step S133), the part 18 copies the directed segment [M6→YC10] to the directed segment OR result collection [4] (step S134). In this case, although a dependence source device YC10 of the directed segment [M6→YC10] to be copied is present in the device OR result collection [5], since the dependence source device M6 is present in the device OR result collection [3], the part 18 copies the directed segment [M6→YC10] to the directed segment to a directed segment OR result collection [4].

Since a directed segment [M7→YC10] serving as an element of the directed segment collection [directed segment collection of depth=5 after resetting] of the second argument is present as an element of the directed segment OR result collection [5], the part 18 does not copy the directed segment [M7→YC10].

A directed graph drawn on the basis of the device collections [1] to [5] and the directed segment collections [2] to [5] obtained by the above processing is as shown in FIG. 36.

A directed segment represents dependence of a certain device on another device, and a variable (device) and the directed segment are closely related to each other and are processed by the OR processing executing part 18 in FIG. 23 as described above. That is, coupling (logical sum) between device collections is processed, and, on the basis of a result thereof, coupling (logical sum) between directed segment collections is processed to make it possible to perform a logical sum (OR) operation between directed graphs without contradiction.

The logical sum (OR) operation between the directed graphs is processing performed regardless of whether one or both of the directed graphs have forward dependence or backward dependence.

Equation number S013 in FIG. 29 shows an example in which a command to cause the OR processing executing part 18 in FIG. 23 to execute processing of a logical sum between device dependence directed graphs by an analysis command OR that is the same as that of a command (designation of equation number S006 in FIG. 7) to cause the OR processing executing part 18 in FIG. 2 to execute processing of a logical sum between cross-references. Alternatively, even in an embodiment in which the commands are defined as different commands (For example, the former is defined as VAR_FWD_BWD_OR, and the latter is defined as VAR_REF_OR.), a technique used here is the same as the technique described in the above embodiment.

By using the embodiment, the analysis command VAR_FWD is an operator that is linear to a variable (device) serving as an analysis condition (start point of a device dependence directed graph). In other words, a processing flow of a logical sum of the device dependence directed graphs is set as shown in FIG. 35 such that the analysis command VAR_FWD serves as linear command definition.

An analysis condition is expressed as an argument of a VAR_FWD function, and an analysis command OR is expressed as + to describe linearity of the analysis command VAR_FWD. In this case, an analysis command defined by equation number S014 in FIG. 29 is an equation given by the following Numerical 3.

$$\text{VAR\_FWD}(X222 \cdot X223) = \text{VAR\_FWD}(X222 + X223) = \text{VAR\_FWD}(X222) + \text{VAR\_FWD}(X223) \quad \text{[Numerical 3]}$$

Therefore, as indicated by equation number S014, when variables (devices) serving as an analysis condition (start point of a device dependence directed graph) of the analysis command. VAR_FWD are enumerated and designated by a user, recursive processing can be performed such that a result obtained after logical sum (OR) processing of a result of the analysis command VAR_FWD using the variables (devices) as analysis conditions is performed is used as a result of equation number S014. This point is the same as that in the analysis command VAR_BWD.

This fact means that, even though a user does not input three conditional equations such as equation numbers S011, S012, and S013 one by one, the same processing result as the processing result in equation number S013 is obtained by inputting one equation number S014 and executing the equation number.

A method of enumerating and designating a plurality of variables (devices) in the analysis condition cell by a user is also common in the analysis command VAR_REF shown in equation number S010 in FIG. 7 and analysis command VAR_FWD shown in equation number S014 in FIG. 29, and analysis condition designating methods between different analysis commands are matched with each other and do not conflict with each other at all. This point is the same as that in the analysis command VAR_BWD.

Effect of Embodiment 4

1) Since a logical operation (logical sum OR processing) between directed graphs of dependence of variables (devices) in a ladder program is made possible, a desired device dependence directed graph can be extracted, and power of an operation related to program analysis can be saved.

2) A user can designate a command to execute a logical sum between cross-references and a command to execute a logical sum between device dependence directed graphs by using the same analysis command OR. Although an embodiment in which the commands are defined and selectively used as different commands (For example, the former is defined as an analysis command VAR_REF_OR, and the latter is defined as an analysis command VAR_FWD_BWD_OR.) may be virtually used, commands to be used are changed depending on data types that are subjects of the analysis command OR. When an analysis command that executes a logical sum is defined as OR regardless of a data type, the usability becomes better. When analysis commands to be used are changed, a user needs to examine a logical sum command corresponding to each data type with a help, an instruction, or the like. However, when all the analysis commands can be executed by an analysis command OR, such a user need not to refer to the help or the like, and power of an operation related to program analysis can be saved.

Embodiment 5

In the embodiment, a technique that makes a logical operation (logical product AND processing) between directed graphs of dependence of devices in the ladder program possible is described.

An analysis command AND is a command to extract a logical product between sets of different data extracted as a processing result. A user designates two equation numbers serving as subjects of a logical product in an analysis subject (first argument) cell and an analysis condition (second argument) cell, respectively. Equation number S016 in FIG. 29 shows an example in which a logical product between a device dependence directed graph extraction result extracted by processing in equation number S014 and another device dependence directed graph extraction result extracted by processing in equation number S015 is designated to be extracted.

That is, the present invention shows an example in which an analysis command to execute a logical product between the above-mentioned cross-references and an analysis command to execute a logical product between device dependence directed graphs are designated by the same or common analysis command AND.

Figure 37:
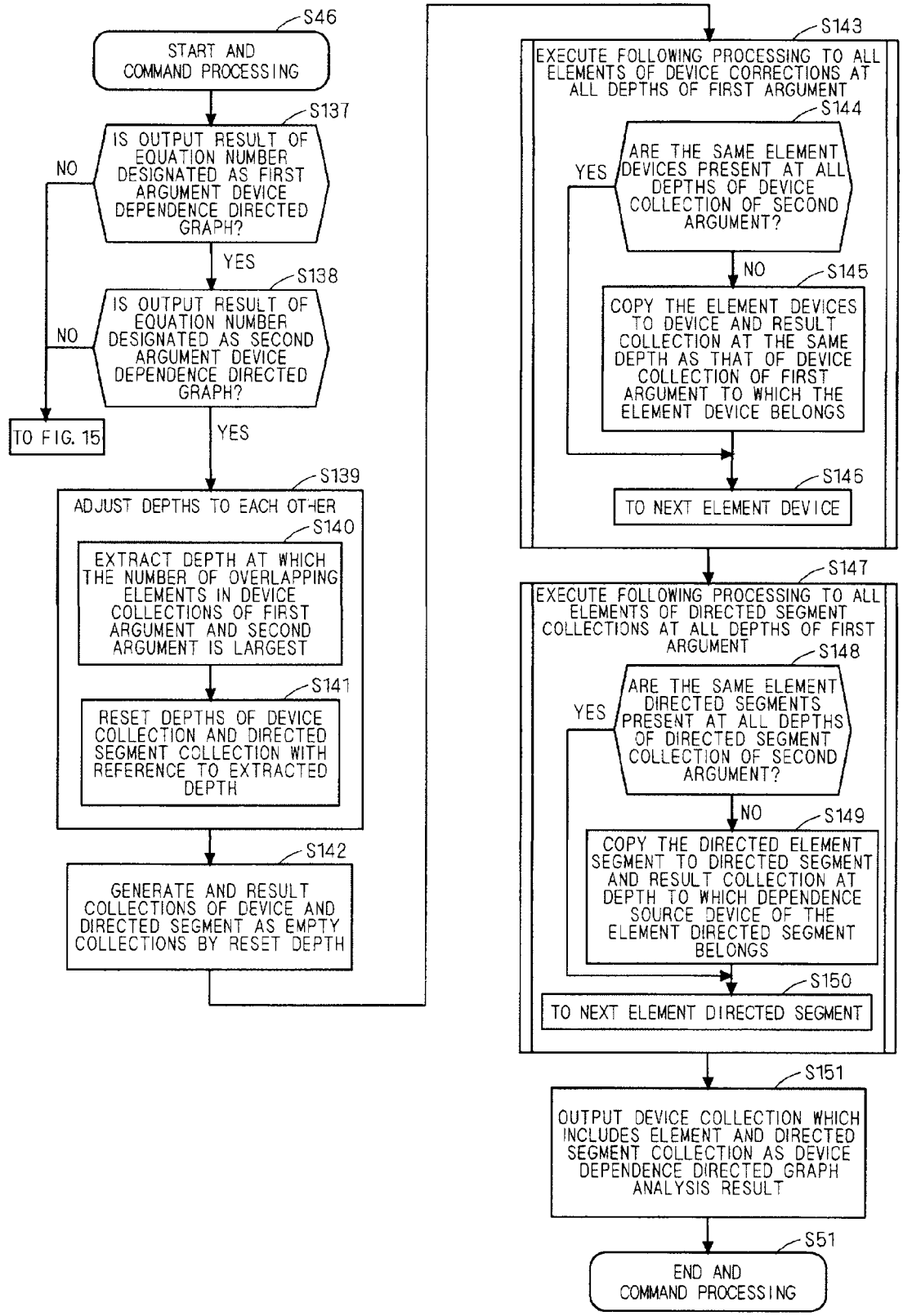
FIG. 37 is a flow chart showing an AND processing flow.

FIG. 37 is a flow chart showing a processing flow of an analysis command AND executed by the AND processing executing part 17 in FIG. 23. With reference to the processing flow shown in FIG. 37, AND processing of device dependence directed graphs according to the embodiment will be described below.

First, the AND processing executing part 17 confirms, in steps S137 and S138, whether a data type serving as a subject of a logical product is a device dependence directed graph. When it is confirmed in the confirming processing that the data type is the device dependence directed graph, the part 17 simply performs the processing flow in FIG. 15 described above.

On the other hand, when the analysis command designated by the equation number designates a logical product between the device dependence directed graphs to be executed, as a preparation for extracting only common elements of collections of a first argument and a second argument, processing that adjusts depth levels of the collections of both the arguments (step S139). Furthermore, empty AND result collections are generated for variables (devices) and directed segments, respectively, and the AND result collections are used as basis to extract only common elements (step S142).

The part 17 performs processing to extract common elements while confirming the element of the first argument overlapping the elements of the second argument. In the extraction of the common elements, the part 17 extracts (logical product) only the common elements of the device collections (step S143), and, thereafter, extracts (logical product) only the common elements of the directed segment collections (step S147).

When the AND processing executing part 17 performs AND processing to equation number S016 in FIG. 29 on the basis of the following processing flow shown in FIG. 37, as a logical product between the result in FIG. 36 and the result in FIG. 34, a result shown in FIG. 38 is obtained. This point will be described in detail.

In step S140, the part 17 extracts a depth at which the number of overlapping elements is maximum in the device collection of the equation number S014 serving as the first argument and the device collection of equation number S015 serving as the second argument. As a result, the part 17 extracts, as the depth at which the number of overlapping elements is maximum, a combination of d=3 of the first argument and d=3 of the second argument that is a depth at which a variable (device) M4 and a variable (device) M5 overlap.

In the next step S141, the part 17, as an application of a criterion for determining one of the depth of the first argument and the depth of the second argument that is kept without change, the depth of the argument having the large value of combinations extracted in step S140 is kept without change, and the other depth is reset. In this manner, the reset depth is handled in the following steps. In the processing in equation number S016 in FIG. 29, the values of the depths of the combinations extracted in step S140 are equal to each other (d=3), and the depths of both the arguments need not be reset.

In the next step S141, the part 17 generates an AND result collection of a depth corresponding to the value of large one of the depths of first argument and the second argument after the depths are reset. In the processing of the equation number S016 in FIG. 29, the depths of both the collections of the first argument and the second argument are equal to each other (d=5), and device AND result collections [1] to [5] and directed segment AND result collections [2] to [5] are generated as AND result collections having empty contents.

In the next step S144, since the part 17 determines that a variable (device) x222 serving as an element of a device collection [1] of the first argument is present in the device collection [1] of the second argument, in the next step S145, the part 17 copies the variable (device) x222 to the device AND result collection [1].

Since a variable (device) M3 serving as an element of the device collection [2] of the first argument is present in the device collection [2] of the second argument, in step S145, the part 17 copies the variable (device) M3 to the device AND result collection [2].

Since a variable (device) X233 serving as an element of the device collection [2] of the first argument is present in the device collection [3] of the second argument, in step S145, the part 17 copies the variable (device) X223 to the device AND result collection [2].

Since a variable (device) M4 serving as an element of the device collection [3] of the first argument is present in the device collection [3] of the second argument, in step S145, the part 17 copies the variable (device) M4 to the device AND result collection [3].

Since a variable (device) M5 serving as an element of the device collection [3] of the first argument is present in the device collection [3] of the second argument, in step S145, the part 17 copies the variable (device) M5 to the device AND result collection [3].

Since a variable (device) M6 serving as an element of the device collection [3] of the first argument is present in the device collection [4] of the second argument, in step S145, the part 17 copies the variable (device) M6 to the device AND result collection [3].

Since a variable (device) M7 serving as an element of the device collection [4] of the first argument is present in the device collection [4] of the second argument, in step S145, the part 17 copies the variable (device) M7 to the device AND result collection [4].

Since a variable (device) M8 serving as an element of the device collection [4] of the first argument is not present at all the depth of the device collections of the second argument, the part 17 does not perform copy processing.

Since a variable (device) D5 serving as an element of the device collection [4] of the first argument is not present at all the depth of the device collections of the second argument, the part 17 does not perform copy processing.

Since a variable (device) YC10 serving as an element of the device collection [5] of the first argument is present in the device collection [5] of the second argument, in step S145, the part 17 copies the variable (device) YC10 to the device AND result collection [5].

In the next step S148, since a directed segment [X222→M3] serving as an element of the directed segment collection [2] of the first argument is present in the directed segment collection [2] of the second argument, the part 17, in step S149, copies the directed segment [X222→M3] to the directed segment AND result collection [2]. In the copying, the part 17, on the basis of a depth of a device AND result collection in which a dependence source device of a directed segment to be copied is present, copies the directed segment to a depth of a directed segment AND result collection, i.e., a depth of (depth of device AND result collection+1). In this case, since a dependence source device X222 of the directed segment [X222→M3] to be copied is present in the device AND result collection [1], the part 17 copies the directed segment [X222→M3] to the directed segment AND result collection [2].

Since a directed segment [M3→M4] serving as an element of the directed segment collection [3] of the first argument is present in the directed segment collection [3] of the second argument, the part 17, in step S149, copies the directed segment [M3→M4] to the directed segment AND result collection [3].

Since a directed segment [X223→M5] serving as an element of the directed segment collection [3] of the first argument is present in the directed segment collection [4] of the second argument, the part 17, in step S149, copies the directed segment [X223→M5] to the directed segment AND result collection [3].

Since a directed segment [X223→M6] serving as an element of the directed segment collection [3] of the first argument is present in the directed segment collection [4] of the second argument, the part 17, in step S149, copies the directed segment [X223→M6] to the directed segment AND result collection [3].

Since a directed segment [M4→M7] serving as an element of the directed segment collection [4] of the first argument is present in the directed segment collection [4] of the second argument, the part 17, in step S149, copies the directed segment [M4→M7] to the directed segment AND result collection [4].

Since a directed segment [M4→M8] serving as an element of the directed segment collection [4] of the first argument is not present at all the depths of the directed segment collection of the second argument, the part 17 does not perform copying processing.

Since a directed segment [M5→M7] serving as an element of the directed segment collection [4] of the first argument is present in the directed segment collection [4] of the second argument, the part 17, in step S149, copies the directed segment [M5→M7] to the directed segment AND result collection [4].

Since a directed segment [M5→M8] serving as an element of the directed segment collection [4] of the first argument is not present at all the depths of the directed segment collection of the second argument, the part 17 does not perform copying processing.

Since a directed segment [M6→D5] serving as an element of the directed segment collection [4] of the first argument is not present at all the depths of the directed segment collection of the second argument, the part 17 does not perform copying processing.

Since a directed segment [M6→YC10] serving as an element of the directed segment collection [4] of the first argument is present in the directed segment collection [5] of the second argument, the part 17, in step S149, copies the directed segment [M6→YC10] to the directed segment AND result collection [4].

Since a directed segment [M7→YC10] serving as an element of the directed segment collection [5] of the first argument is present in the directed segment collection [5] of the second argument, the part 17, in step S149, copies the directed segment [M7→YC10] to the directed segment AND result collection [5].

A directed graph drawn on the basis of the device collections [1] to [5] and the directed segment collections [2] to [5] obtained by the above processing is as shown in FIG. 38.

A directed segment represents dependence of a certain device on another device, and a device and the directed segment are closely related to each other. In this manner, the AND processing executing part 17 processes extraction (logical product) of common elements of the device collections and, on the basis thereof, processes extraction (logical product) of common elements of the directed segment collections to make it possible to perform a logical product AND operation between the directed graphs without contradiction.

The logical product AND operation between the directed graphs is performed regardless of whether one or both of the directed graphs have forward dependence or backward dependence.

Equation number S016 in FIG. 29 shows an example in which a command to cause the AND processing executing part 17 in FIG. 23 to execute processing of a logical product between device dependence directed graphs by an analysis command AND that is the same as that of a command to cause the AND processing executing part 17 in FIG. 2 to execute processing of a logical product between cross-references. Alternatively, even in an embodiment in which the commands are defined as different commands (For example, the former is defined as VAR_FWD_BWD_AND, and the latter is defined as VAR_REF_AND.), a technique used here is the same as the technique described in the above embodiment.

When Equation number S017 in FIG. 29 is to be processed by using the processing method according to the embodiment, a result is as shown in a lower part in FIG. 38. Since a depth of a directed graph designated by the first argument is reflected on a result, when the result in equation number S016 is compared with the result in equation number S017, it is found that, although collections to which an element device and an element directed segment belong are different in depth, device dependence directed graphs have the same structures.

Processing to make not only the structures of the device dependence directed graphs equal to each other but the depths of the collections to which the element device and the element directed segment belong equal to each other can be further additionally performed to an output result of the embodiment. However, since this departs from the spirit and scope of the present invention, a description thereof will be omitted.

Effect of Embodiment 5

1) Since a logical operation (logical product AND processing) between directed graphs of dependence of devices in a ladder program is made possible, a desired device dependence directed graph can be extracted, and power of an operation related to program analysis can be saved.

2) A command to execute a logical product between cross-references and a command to execute a logical product between device dependence directed graphs can be designated by using the same analysis command AND. Although an embodiment in which the commands are defined and selectively used as different commands (for example, the former is defined as VAR_REF_AND, and the latter is defined as VAR_FWD_BWD_AND) may be virtually used, commands to be used are changed depending on data types that are subjects of the analysis command AND. When a command that executes a logical product is defined as an analysis command AND regardless of a data type, the usability becomes better. When commands to be used are changed, a user needs to examine a logical product command corresponding to each data type with a help, an instruction, or the like. However, when all the commands can be executed by an analysis command AND, the need is eliminated, and power of an operation related to program analysis can be saved.

Embodiment 6

In the embodiment, a technique that makes extraction of a cross-reference related to a device being present in a device dependence directed graph extracted from the ladder program possible is described.

Although the analysis command VAR_REF, as described above, is a command to extract a cross-reference of a variable (device), equation number S018 in FIG. 29 shows an example in which an equation number that designates a device dependence directed graph serving as an analysis subject is designated in an analysis subject cell, and a variable (device) serving as a condition of cross-reference extraction is designated in an analysis condition cell. Equation number S018 shows an example in which, although a variable (device) is not designated in an analysis condition cell, this designates all the devices.

Figure 39:
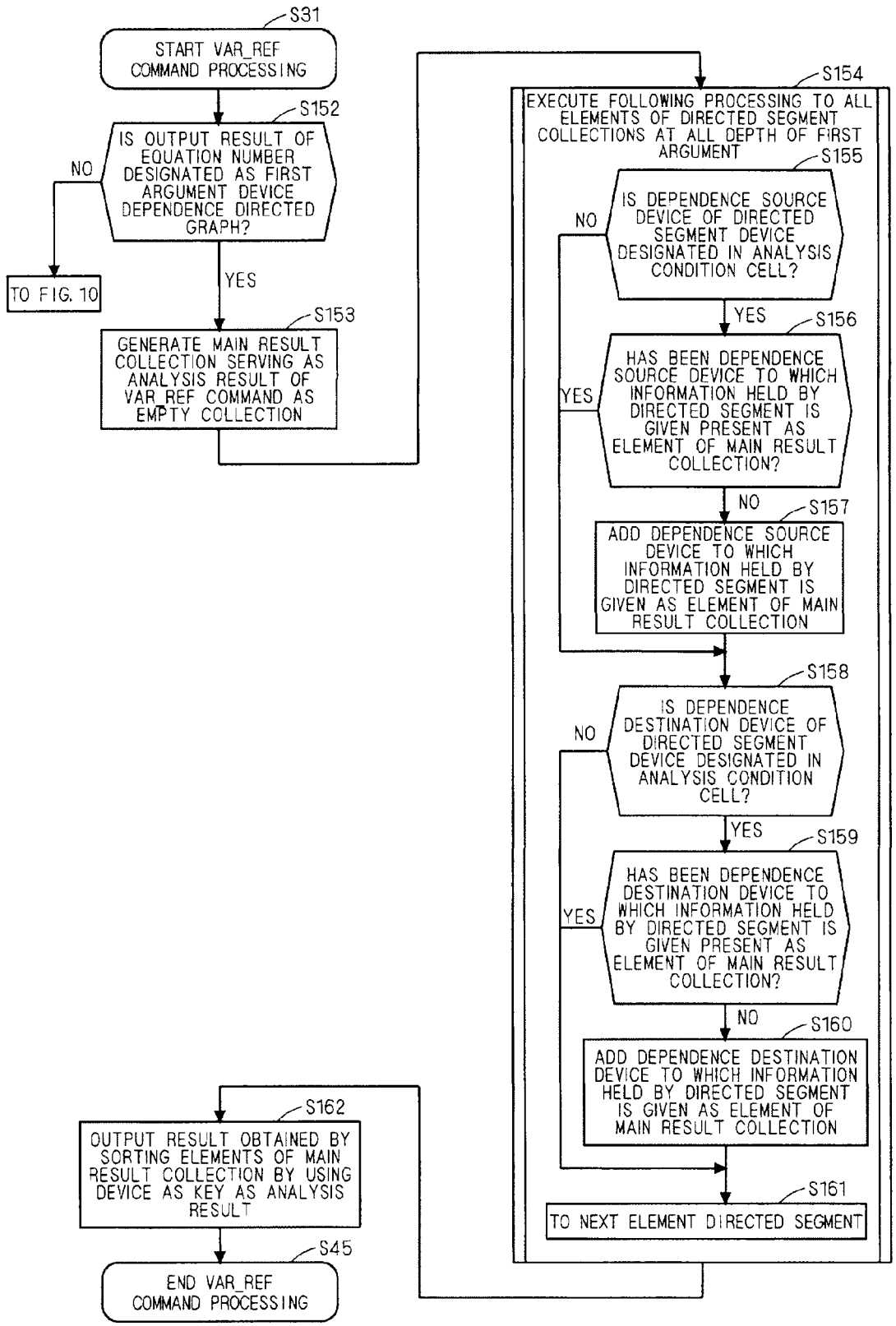
FIG. 39 is a flow chart showing a VAR_REF processing flow.

FIG. 39 is a flow chart showing a processing flow of the analysis command VAR_REF executed by the variable use list extraction processing executing part 12 in FIG. 23.

First, the variable use list extraction processing executing part 12 confirms, in step S152, whether a data type serving as an analysis subject is a device dependence directed graph. When the data type is not a device dependence directed graph, the part 12 executes the processing flow in FIG. 10 described above.

On the other hand, when an equation number designated in an analysis handling cell designates extraction of a cross-reference from a device dependence directed graph, the part 12 generates, as preparation, an empty main result collection (step S153).

The variable use list extraction processing executing part 12 performs processing that extracts cross-reference information from each element of the directed segment collection of the device dependence directed graph (step S154). In order to perform the processing, when the variable dependence extraction processing executing part 13 in FIG. 23 executes processing that extracts the device dependence directed graph on the basis of analysis command VAR_FWD or VAR_BWD, data shown in FIG. 31 needs to be held as a data structure of a directed segment.

The variable use list extraction processing executing part 12 performs the processing to equation number S018 in FIG. 29 on the basis of the processing flow shown in FIG. 39 to obtain a result in FIG. 40 from the device dependence directed graph in equation number S011 shown in FIG. 31. Processing of this point will be described below.

In equation number S018, a column for an analysis condition is empty, and all the devices serve as extraction subjects. For this reason, the variable use list extraction processing executing part 12 naturally determines "YES" in step S155, and also determines, in step S156, that the dependence source device x222 of the element directed segment of the directed segment collection [2] is not present in the main result collection (empty at this time), and, in step S157, adds information "POU name=MAIN, step number=4, instruction=LD" and the dependence source device x 222 to the main result collection.

In the next step S158, "YES" is naturally determined, and, in step S159, the dependence destination device M3 of the element directed segment of the directed segment collection [2] is not present in the main result collection. For this reason, in step S160, the part 12 adds information "POU name=MAIN, step number=5, instruction=SET" and the dependence destination device M3 to the main result collection.

In step S156, the dependence source device M3 of the element directed segment of the next directed segment collection [3] is not present in the main result collection (Although the same variable (device) M3 has been present, variables (devices) M3 having the same POU names, the same step numbers, and the same instructions are not present.), in step S157, the part 12 adds information "POU=MAIN, step number=6, instruction=LD" and the dependence destination device M3 to the main result collection.

In the next step S159, since the dependence destination device M4 of the element directed segment of the directed segment collection [3] is not present in the main result collection, in step S160, the part 12 adds information "POU name=MAIN, step number=7, instruction=RST" and the dependence destination device M4 to the main result collection.

In step S156, the dependence source device M4 of the first element directed segment of the next directed segment collection [4] is not present in the main result collection (Although the same variable (device) M4 has been present, variables (devices) M4 having the same POU names, the same step numbers, and the same instructions are not present.), in step S157, the part 12 adds information "POU=SUB, step number=0, instruction=LD" and the dependence source device M4 to the main result collection.

In the next step S159, since the dependence destination device M7 of the first element directed segment of the directed segment collection [4] is not present in the main result collection, in step S160, the part 12 adds information "POU=SUB, step number=2, instruction=OUT" and the dependence destination device M7 to the main result collection.

In step S156, the dependence source device M4 of the second element directed segment of the directed segment collection [4] is present in the main result collection (Variables (devices) M4 having the same POU names, the same step numbers, and the same instructions are present.), the part 12 does not perform adding processing to the main result collection.

In the next step S159, since the dependence destination device M8 of the second element directed segment of the directed segment collection [4] is not present in the main result collection, in step S160, the part 12 adds information "POU=SUB, step number=3, instruction=OUT" and the dependence destination device M8 to the main result collection.

In step S156, the dependence source device M7 of the element directed segment of the next directed segment collection [5] is not present in the main result collection (Although the same variable (device) M7 is surely present, variables (devices) M7 having the same POU names, the same step numbers, and the same instructions are not present.), in step S157, the part 12 adds information "POU=SUB, step number=8, instruction=AND" and the dependence source device M7 to the main result collection.

In the next step S159, since the dependence destination device YC10 of the element directed segment of the directed segment collection [5] is not present in the main result collection, in step S160, the part 12 adds information "POU name=SUB, step number=9, instruction=OUT" and the dependence destination device YC10 to the main result collection.

Finally, in step S162, the part 12 sorts the main result collection by using a variable (device) as a key and outputs a result obtained by the sorting as an analysis result. In response to a signal that gives the analysis result, the variable use list display part 21 in FIG. 23 outputs a display signal to display the analysis result on the screen of the display part 4 in FIG. 1.

The part 12 processes the next equation number S019 in FIG. 29 (In step S155 and step S158 in FIG. 39, only a variable (device) M is extracted as a subject.). As a result, a result shown in FIG. 41 is obtained.

Effect of Embodiment 6

1) A cross-reference of designated variables (devices) that dependent to each other can be extracted, and a desired cross-reference can be extracted.

2) As in the above description, even though a ladder program designated when directed graphs having device dependence are extracted and devices being present on the directed graphs having the device dependence extracted from the ladder program are manually input to a command equation of another cross-reference by a user one by one to execute designation in the same manner as that of the analysis command VAR_REF (S008, X222, M3, M4, M7, M8, YC10), the same result can be obtained. According to the embodiment, a trouble of inputting can be omitted.

Embodiment 7

The embodiment relates a technique that extracts a directed graph of dependence (to be referred to as "POU call dependence" hereinafter) of a subroutine call (Another POU is called from a certain POU.) in a ladder program.

FIG. 42 is a software configuration diagram showing a functional part according to the embodiment in the microprocessor 2 in the program analysis support device in FIG. 1. When FIG. 42 and FIG. 23 are compared with each other, in the functional part configuration in FIG. 42, the analysis condition executing part 11 further includes a POU dependence extraction processing executing part 15 to execute an extracting processing for directed graphs having POU call dependence, and the analysis result display part 20 further includes a POU list display part 23 and a POU dependence display part 24 to display a POU call dependence directed graph result.

Figure 43:
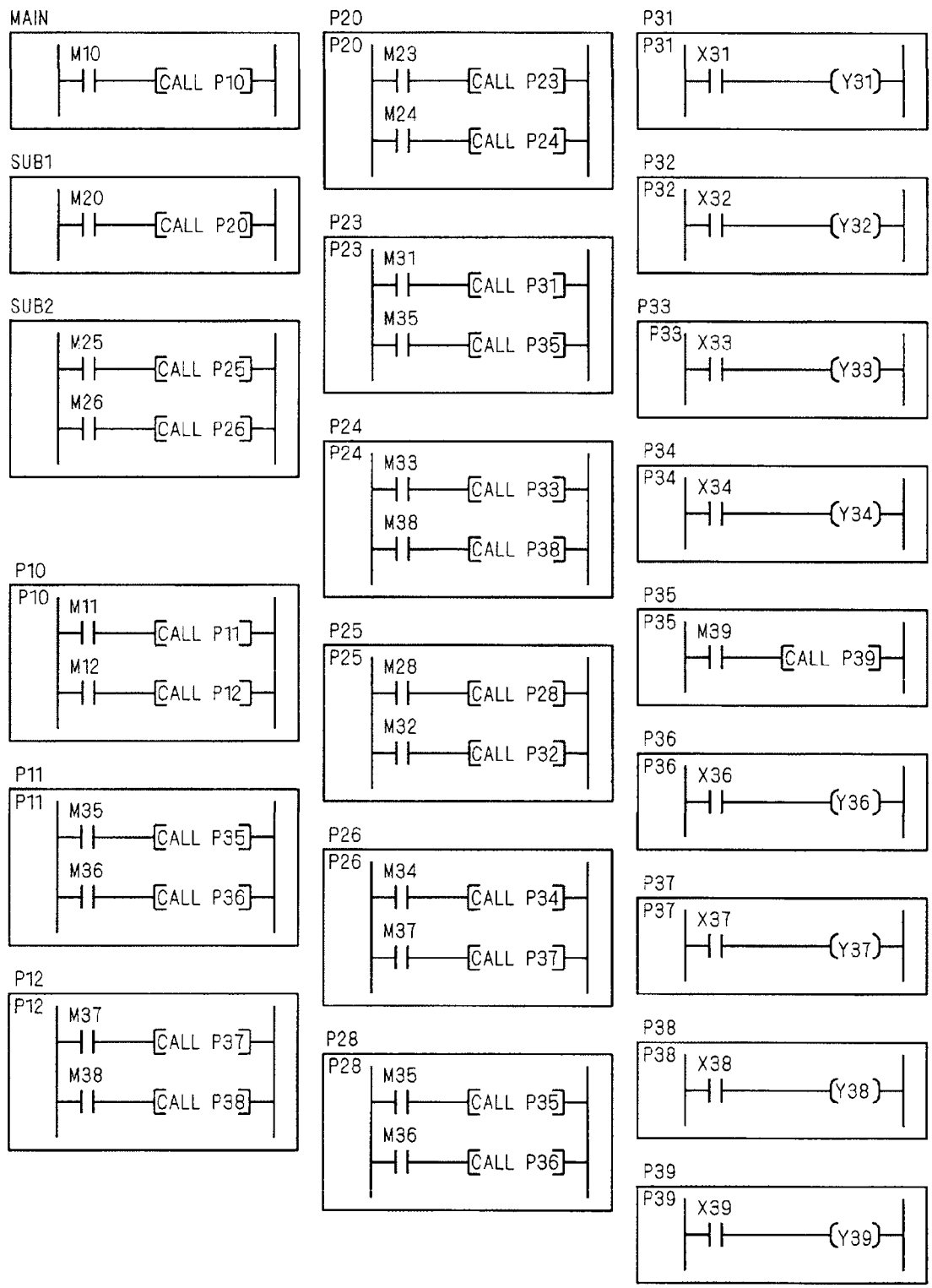
FIG. 43 is a diagram of all POUs constituting a program.

POU call dependence in the ladder program will be described below with reference to FIG. 43.

POU call uses a CALL instruction, and a program pointer described at the start of a program of a POU to be called is designated by an argument of the CALL instruction. For example, a description that calls a program pointer P10 is made in the program MAIN, and a POU in which the program pointer P10 is described at the start of the program and the POU name of which is P10 is called. In this manner, FIG. 43 shows an example in which the same POU name as that of the program point is given to a program other than the program MAIN and programs SUB1 and SUB2 and an example in which the program MAIN sets scan execution, the programs SUB1 and SUB2 set scan execution, periodical execution, or initial execution, and the other program to which the same POU name as that of the program pointer is given sets waiting execution. FIG. 43 shows an extracted part related to a call in the program description of each POU, and a ladder of a part that is not related to a call is omitted.

A technique for extracting a directed graph of POU call dependence in a ladder program will be described below.

FIG. 44 is a diagram showing an example displayed on the screen of the display part 4 to cause a user to input a program analysis condition by using the input part 5 in FIG. 1, and shows the rests of FIGS. 7 and 29 described above.

The analysis command POU_FWD is a command to extract a POU called by a designated POU (furthermore, POU . . . called by the POU is recursively) and to obtain a directed graph (directed graph of POU call forward dependence) representing the dependence. A user designates, for the analysis command POU_FWD, an equation number that designates a program range serving as an analysis subject in an analysis subject cell and designates a POU serving as a start point of the POU call forward dependence directed graph in an analysis condition cell.

In equation number S020 in FIG. 44, a program (POU) is not designated as an analysis subject cell of the analysis command POU_READ. This shows an example in which all POUs constituting the program are designated to be read. All the programs shown in FIG. 43 are read here. As a result, FIG. 44 shows an example in which the number of read programs, i.e., 21 is displayed in a number-of-cases cell.

Equation number S021 in FIG. 44 shows an example in which, in an element POU included in a collection output from parts 14 and 23 as execution results of equation number S020, i.e., all the POUs constituting the program, a directed graph of the POU call forward dependence is designated to be extracted from the program MAIN. The POU dependence extraction processing executing part 15 in FIG. 42 outputs data of the directed graph of the POU call forward dependence as an analysis result in the equation number S021, and the part 24 outputs display data required to draw the directed graph to the display part 4 in FIG. 1.

Figure 45:
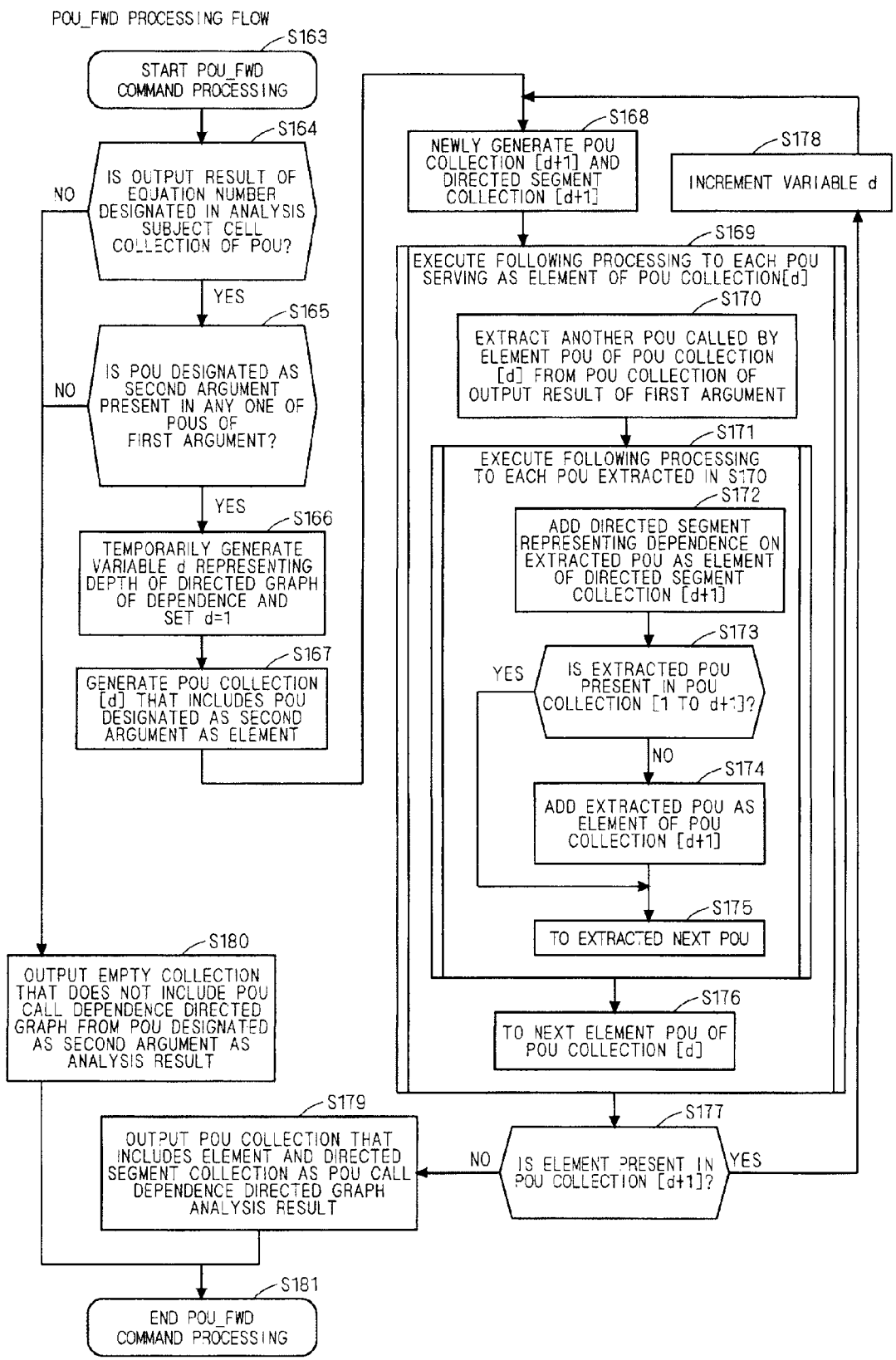
FIG. 45 is a flow chart showing a POU_FWD processing flow.

With respect to a technique for extracting the directed graph of the POU call forward dependence from the designated POU from a designated ladder program, a processing flow of the analysis command POU_FWD executed by the POU dependence extraction processing executing part 15 in FIG. 42 is shown in FIG. 45. A flow of processing in FIG. 45 and a data structure in FIG. 46 are similar to those obtained in the analysis command VAR_FWD to extract a device dependence directed graph.

When the POU dependence extraction processing executing part 15 processes equation number S021 in FIG. 44 according to the processing flow shown in FIG. 45, a result shown in FIG. 46 can be obtained. This point will be described below in detail.

In step S170, since a POU having the same name as that of the program pointer P10 called in the program MAIN serving as an element POU of a POU collection [1] is present in a POU collection of the first argument, the POU dependence extraction processing executing part 15 extracts the program pointer P10 serving as another POU called by the MAIN from the POU collection.

In step S172, the part 15 adds a directed segment from the program MAIN to the P10 serving as another POU to the directed segment collection [2]. As a data structure of the directed segment obtained at this time, only a dependence source POU and a dependence destination POU need to be held. In consideration of other embodiments (will be described later), a step number can also be held in the data structure of the directed segment.

In step S173, the P10 is not present in POU collections [1] and [2], the part 15 determines "NO". In step S174, the part 15 adds the P10 to the POU collection [2].

In the example, since a POU called and extracted from the program MAIN is only the program P10, step S175 is not executed.

In the next step S176, although the part 15 tries to execute processing to the next element POU device of the POU collection [1], in the example, since the POU collection [1] does not include an element except for the program MAIN, the part 15 shifts to step S177 to determine "YES". As a result, in the next step S178, the part 15 increments the variable d by 1.

In the next step S170 after the increment processing, since programs P11 and P12 called in the program P10 serving as an element POU of the POU collection [2] are present in the POU collection of the first argument, the part 15 extracts the programs P11 and P12 from the POU collection of the first argument.

In step S172, the part 15 adds a directed segment from the program P10 to a program P11 to the directed segment collection [2].

In step S173, since the program P11 is not present in POU collections [1] to [3], the part 15 adds the program P11 to the POU collection [3] in step S174.

The part 15 processes a program P12 serving as the next extracted POU (step S176).

In step S172, the part 15 adds a directed segment from the program P10 to a program P12 to the directed segment collection [2].

In step S173, since the program P12 is not present in the POU collections [1] to [3], the part 15 adds the program P12 to the POU collection [3] in step S174.

In the next step S176, although the part 15 tries to execute processing to the next element POU of the POU collection [2], since the POU collection [2] does not include an element POU except for the program P10, the part 15 shifts to step S177 to determine "YES". As a result, in the next step S178, the part 15 increments the variable d by 1.

In step S170 subsequent to the increment processing, since programs P35 and P36 called in the program P11 serving as an element POU of the POU collection [3] are present in the POU collection of the first argument, the part 15 extracts the programs P35 and P36 from the POU collection of the first argument.

In step S172, the part 15 adds a directed segment from the program P11 to a program P35 to the directed segment collection [4].

In step S173, since the program P35 is not present in the POU collections [1] to [4], the part 15 adds the program P35 to the POU collection [4] in step S174.

The part 15 processes a program P36 serving as the next extracted POU (step S175).

In step S172, the part 15 adds a directed segment from the program P11 to the program P36 to the directed segment collection [4].

In step S173, since the program P36 is not present in the POU collections [1] to [4], the part 15 adds the program P36 to the POU collection [4] in step S174.

In step S176, the part 15 processes the program P12 serving as the next element POU device of the POU collection [3].

In step S170, since programs P37 and P38 called in the program P12 are present in the POU collection of the first argument, the part 15 extracts the programs P37 and P38.

In step S172, the part 15 adds a directed segment from the program P12 to the program P37 to the directed segment collection [4].

In step S173, since the program P37 is not present in the POU collections [1] to [4], the part 15 adds the program P37 to the POU collection [4] in step S174.

The part 15 processes the program P38 serving as the next extracted POU (step S175).

In step S172, the part 15 adds a directed segment from the program P12 to the program P38 to the directed segment collection [4].

In step S173, since the program P38 is not present in the POU collections [1] to [4], the part 15 adds the program P38 to the POU collection [4] in step S174.

Through the next steps S175 to S178, in step S170, since a program P39 called in the program P35 serving as an element POU of the POU collection [4] is present in the POU collection of the first argument, the part 15 extracts the program P39.

In step S172, the part 15 adds a directed segment from the program P35 to the program P39 to the directed segment collection [5].

In step S173, since the program P39 is not present in the POU collections [1] to [5], the part 15 adds the program P39 to the POU collection [5] in step S174.

In step S175, an extracted POU is only the program P39. The part 15 shifts to step S176.

In step S170, although the part 15 tries to process the program P36 serving as the next element POU of the POU collection [4], another POU is not called in the program P36.

In step S170, the part 15 tries to process the program P37 serving as the next element POU of the POU collection [4], another POU is not called in the program P37.

In step S170, although the part 15 tries to process the program P38 serving as the next element POU of the POU collection [4], another POU is not called in the program P38.

Through the next steps S177 and S178, although the part 15 tries to process the program P39 serving as an element POU of the POU collection [5] in step S170, since another POU in the program P39 is not called, the part 15 determines "NO" in step S177 to shift to step S179 to output a POU call dependence directed graph analysis result.

Similarly, the POU dependence extraction processing executing part 15 processes equation number S022 in FIG. 44, a result shown in FIG. 47 is obtained as a forward dependence directed graph having a program SUB1 as a start point.

Effect of Embodiment 7

Extraction of a forward dependence directed graph of a POU call using a ladder program as an analysis subject is made possible to make it possible to save power of an operation related to program analysis.

Embodiment 8

The analysis command POU_BWD is a command to extract a POU that calls a POU designated by a user (furthermore, POU ... called by the POU is recursively) and to obtain a directed graph (directed graph of POU call backward dependence) representing the dependence. A user designates, for the analysis command POU_BWD, an equation number that designates a program range serving as an analysis subject in an analysis subject cell and designates a POU serving as a start point of the POU call backward dependence directed graph in an analysis condition cell.

Equation number S025 in FIG. 44 shows an example in which extraction of a directed graph of POU call backward dependence from the program P39 in an element POU included in a POU collection output as a result of equation number S020, i.e., all the POUs constituting the program is designated. As an analysis result, data required to draw the directed graph is output.

Figure 48:
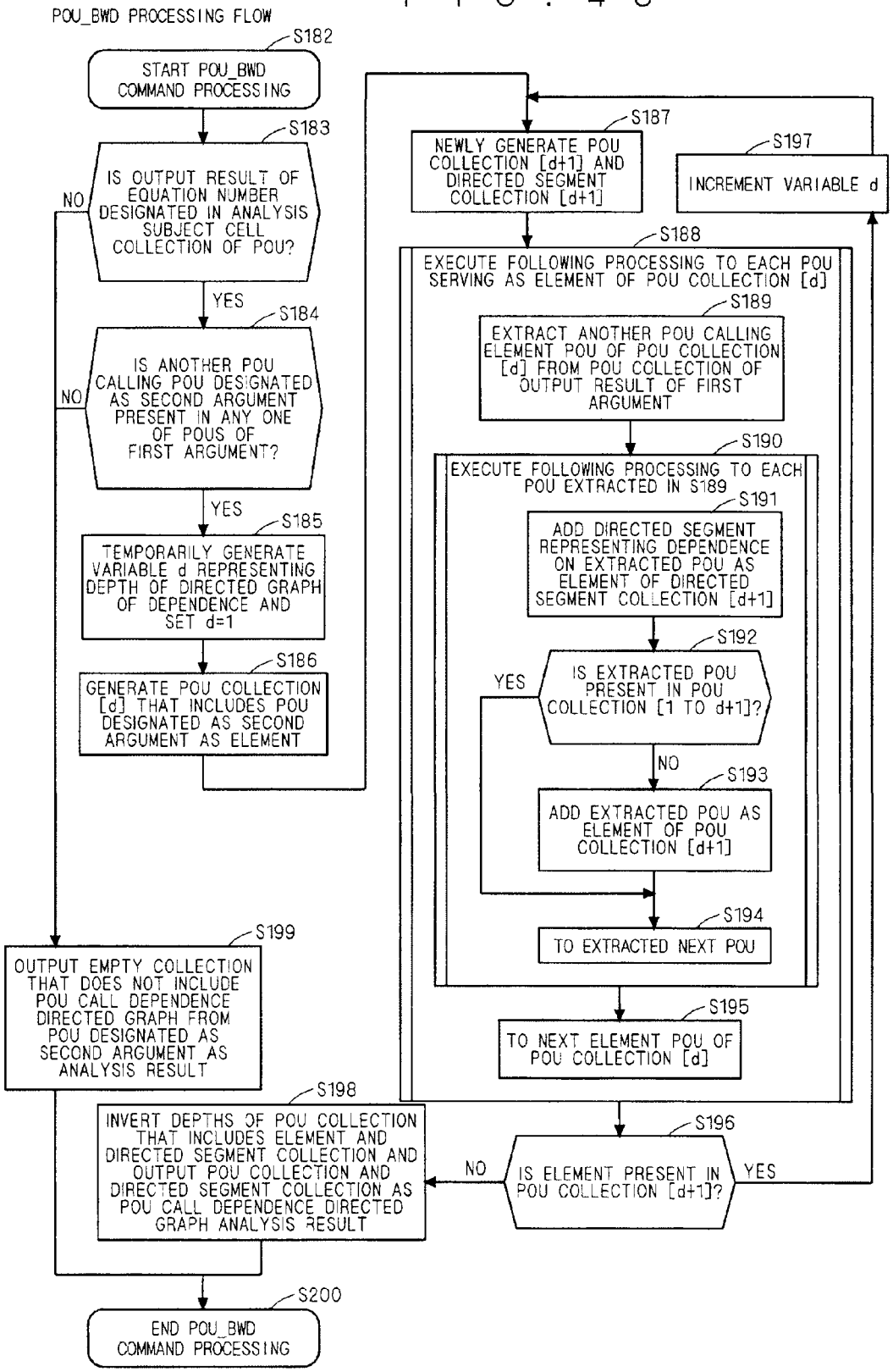
FIG. 48 is a flow chart showing a POU_BWD processing flow.

FIG. 48 is a flow chart showing a processing flow of an analysis command POU_BWD. A flow of processing and a data structure in FIG. 48 are similar to those in the analysis command VAR_BWD that extracts the device dependence directed graph.

When the POU dependence extraction processing executing part 15 in FIG. 42 processes equation number S025 in FIG. 44 according to the flow shown in FIG. 48, a result shown in FIG. 49 can be obtained. This point will be described below in detail.

In step S189, the POU dependence extraction processing executing part 15 determines, on the basis of the programs of the POU collection of the first argument, whether the program P39 serving as an element POU of the POU collection [1] is called. As a result, the programs P11, P23, and P28 of the element POU are extracted from the POU collection of the first argument.

In step S191, the part 15 adds a directed segment from the program P11 to the program P39 to the directed segment collection [2]. As a data structure of the directed segment obtained at this time, only a dependence source POU and a dependence destination POU need to be held. In consideration of embodiments (will be described later), a step number can also be held in the data structure of the directed segment.

In step S192, since the program P11 is not present in POU collections [1] to [2], the part 15 adds the program P11 to the POU collection [2] in step S193.

In step S194, the part 15 processes the program P23 serving as the next extracted POU.

In step S191, the part 15 adds a directed segment from the program P23 to the program P39 to the directed segment collection [2].

In step S192, since the program P23 is not present in POU collections [1] to [2], the part 15 adds the program P23 to the POU collection [2] in step S193.

In step S194, the part 15 processes the program P28 serving as the next extracted POU.

In step S191, the part 15 adds a directed segment from the program P28 to the program P39 to the directed segment collection [2].

In step S192, since the program P28 is not present in POU collections [1] to [2], the part 15 adds the program P28 to the POU collection [2] in step S193.

In the next step S195, although the part 15 tries to execute processing to the next element POU of the POU collection [1], since the POU collection [1] does not include an element POU except for the program P39, the part 15 passes through steps S196 and S197.

In step S189, the POU dependence extraction processing executing part 15 determines, on the basis of the programs of the POU collection of the first argument, whether the program P11 serving as an element POU of the POU collection [2] is called. As a result, the program P10 of the element POU is extracted from the POU collection of the first argument.

In step S191, the part 15 adds a directed segment from the program P10 to a program P11 to the directed segment collection [3].

In step S192, since the program P10 is not present in POU collections [1] to [3], the part 15 adds the program P10 to the POU collection [3] in step S193.

In the next step S194, the extracted POU is only the program P10, and the part 15 shifts to step S189 to process the program P23 serving as the next element POU of the POU collection [2].

In step S189, the POU dependence extraction processing executing part 15 determines, on the basis of the programs of the POU collection of the first argument, whether the program P23 serving as an element POU of the POU collection [2] is called. As a result, the program P20 of the element POU is extracted from the POU collection of the first argument.

In step S191, the part 15 adds a directed segment from the program P20 to a program P23 to the directed segment collection [3].

In step S192, since the program P20 is not present in POU collections [1] to [3], the part 15 adds the program P20 to the POU collection [3] in step S193.

In the next step S194, the extracted POU is only the program P20, and the part 15 shifts to step S189 to process the program P28 serving as the remaining element POU of the POU collection [2].

In step S189, the POU dependence extraction processing executing part 15 determines, on the basis of the programs of the POU collection of the first argument, whether the program P28 serving as an element POU of the POU collection [2] is called. As a result, the element POU P25 is extracted from the POU collection of the first argument.

In step S191, the part 15 adds a directed segment from the program P25 to the program P28 to the directed segment collection [3].

In step S192, since the program P25 is not present in POU collections [1] to [3], the part 15 adds the program P25 to the POU collection [3] in step S193.

In the next step S194, the extracted POU is only the program P25, and the part 15 completes processing to all the element POUs in the POU collection [2]. For this reason, the part 15 determines "YES" in step S195 and shifts to step S189 through steps S197 and S187.

In step S189, the POU dependence extraction processing executing part 15 determines, on the basis of the programs of the POU collection of the first argument, whether the program P10 serving as an element POU of the POU collection [3] is called. As a result, the element POU MAIN is extracted from the POU collection of the first argument.

In step S191, the part 15 adds a directed segment from the program MAIN to the program P10 to the directed segment collection [4].

In step S192, since the program MAIN is not present in POU collections [1] to [4], the part 15 adds the program MAIN to the POU collection [4] in step S193.

In the next step S194, the extracted POU is only the program MAIN, and the part 15 shifts to step S189 to process the program P20 serving as the next element POU of the POU collection [3] (step S195).

In step S189, the POU dependence extraction processing executing part 15 determines, on the basis of the programs of the POU collection of the first argument, whether the program P20 serving as an element POU of the POU collection [3] is called. As a result, the element POU SUB1 is extracted from the POU collection of the first argument.

In step S191, the part 15 adds a directed segment from the program SUB1 to the program P20 to the directed segment collection [4].

In step S192, since the program SUB1 is not present in POU collections [1] to [4], the part 15 adds the program SUB1 to the POU collection [4] in step S193.

In the next step S194, the extracted POU is only the program SUB1, and the part 15 shifts to step S189 to process the program P25 serving as the final element POU of the POU collection [3] (step S195).

In step S189, the POU dependence extraction processing executing part 15 determines, on the basis of the programs of the POU collection of the first argument, whether the program P25 serving as an element POU of the POU collection [3] is called. As a result, an element POU SUB2 is extracted from the POU collection of the first argument.

In step S191, the part 15 adds a directed segment from the program SUB2 to the program P25 to the directed segment collection [4].

In step S192, since the program SUB2 is not present in POU collections [1] to [4], the part 15 adds the program SUB2 to the POU collection [4] in step S193.

In the next step S194, the extracted POU is only the program SUB2, and the part 15 completes processing to all the element POUs in the POU collection [3]. For this reason, the part 15 determines "YES" in step S195 and shifts to step S189 through steps S197 and S187.

In step S189, the POU dependence extraction processing executing part 15 determines, on the basis of the programs of the POU collection of the first argument, whether the program MAIN, SUB1, or SU2 serving as an element POU of the POU collection [4] is called. However, since the program MAIN, SUB1, or SU2 is not called by any other program, shift to step S196 is performed, "NO" is determined in step S196. As a result, shift to step S198 is performed.

In step S198, the part 15 performs processing to inverting depths of the POU collection and the directed segment collection that include element POUs. A point to which special attention should be paid is that, when the numbers of all the directed segment collections are inverted, the elements of all the directed segments are moved to depths to which the elements should belong (In this example, nothing corresponds to the elements.).

Effect of Embodiment 8

Extraction of a backward dependence directed graph of a POU call using a ladder program as an analysis subject is made possible to make it possible to save power of an operation related to program analysis.

Embodiment 9

In the embodiment, a technique that makes a logical operation (logical sum OR processing or logical product AND processing) between directed graphs of POU call dependence in the ladder program possible is described.

Equation number S023 in FIG. 44 shows an example in which a logical sum between a POU call dependence directed graph extraction result extracted in equation number S021 and another POU call dependence directed graph extraction result extracted in equation number S022 is designated to be extracted.

More specifically, in the present invention, all 1) an analysis command to execute a logical sum between cross-references, 2) an analysis command to execute a logical sum between device dependence directed graphs, and 3) an analysis command to execute a logical sum between POU call dependence directed graphs are commonly designated by the same analysis command OR.

FIG. 50 is a flow chart showing a processing flow of an analysis command OR executed by the OR processing executing part 18 in FIG. 42. The processing contents in FIG. 50 are the same as those of processing that execute a logical sum between device dependence directed graphs shown in FIG. 35.

When the OR processing executing part 18 performs processing to equation number S023 in FIG. 44 according to the processing flow shown in FIG. 50, as a result of a logical sum between a result in FIG. 46 and a result in FIG. 47, a result shown in FIG. 51 is obtained.

Equation number S023 shows an example in which an analysis command to execute a logical sum between cross-references, a command to execute a logical sum between device dependence directed graphs, and a command to execute a logical sum between POU call dependence directed graphs are designated by the same analysis command OR. In an embodiment in which the commands are defined as different commands (For example, the former is defined as VAR_REF_OR and VAR_FWD_BWD_OR, and the latter is defined as POU_FWD_BWD_OR.), respectively, the same technique is used.

By using the embodiment, the analysis command POU_FWD is an operator that is linear to a POU serving as an analysis subject (start point of a POU call dependence directed graph). In other words, a processing flow of a logical sum OR of the POU call dependence directed graphs is set as shown in FIG. 50 such that the analysis command POU_FWD is defined as a linear analysis command.

An analysis subject is expressed as an argument of a POU_FWD function, and an OR operation is expressed as + to describe linearity of the analysis command POU_FWD. In this case, equation number S024 is expressed by an equation given by the following Numerical 4.

POU_FWD(MAIN·SUB1)=POU_FWD(MAIN+SUB1)=POU_FWD(MAIN)+POU_FWD(SUB1) [Numerical 4]

Therefore, as indicated by equation number S024 in FIG. 44, when POUs serving as an analysis subjects (start point of a POU call dependence directed graph) of the analysis command POU_FWD are enumerated and designated, recursive processing can be performed such that a result obtained by performing OR processing a result of the analysis command POU_FWD using the POUs as analysis subjects is used as a result of equation number S024. With respect to the analysis command POU_BWD, similarly, recursive processing can be performed.

Even though a user does not input three conditional equations such as equation numbers S021, S022, and S023 one by one, the same result as the result in equation number S023 is obtained by one equation number S024.

A method of enumerating and designating a variable (device) is also common in the analysis command VAR_REF shown in equation number S010, the analysis command VAR_FWD shown in equation number S014, and the analysis command POU_FWD shown in equation number S024, and analysis condition designating methods between different analysis commands are matched with each other without any contradiction. This point is the same as that in the analysis command POU_BWD.

Figure 52:
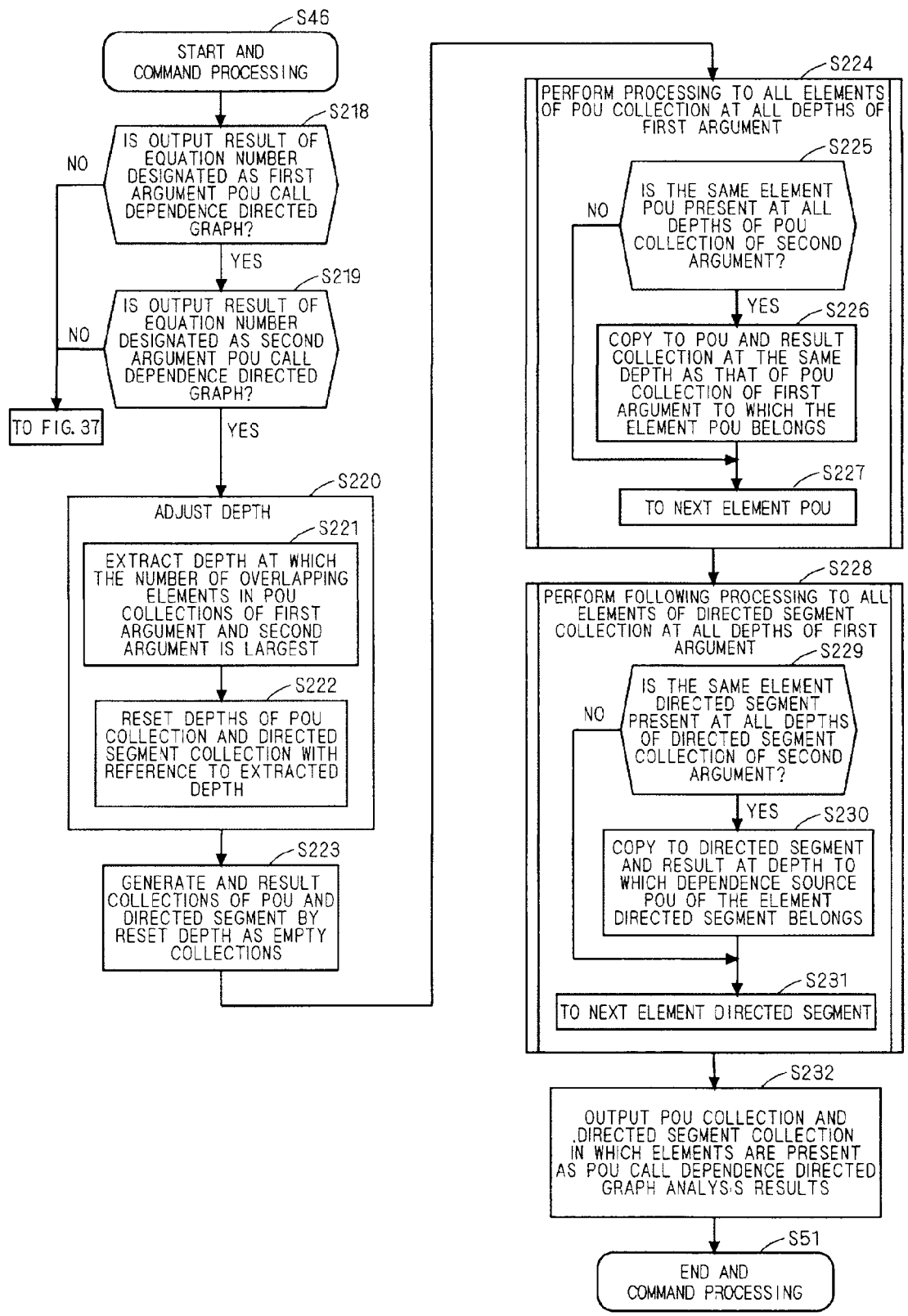
FIG. 52 is a flow chart showing an AND processing flow.

Similarly, a processing flow of the analysis command AND executed by the AND processing executing part 17 in FIG. 42 is shown in FIG. 52. The processing contents are the same as those of processing performed in a logical product between the device dependence directed graphs shown in FIG. 37.

Figure 53:
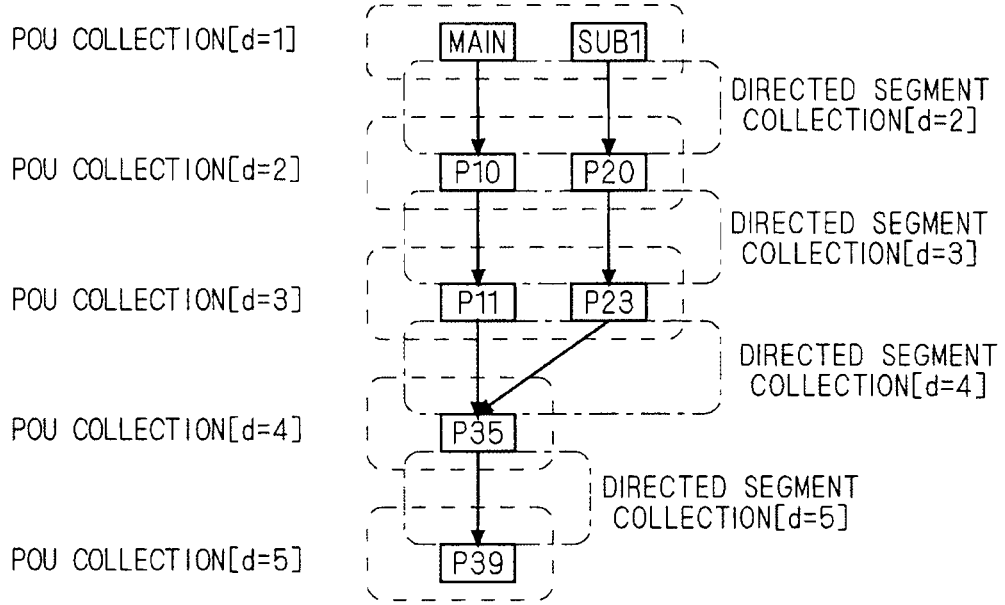
FIG. 53 is a graph showing an AND result POU directed graph.
Figure 59:
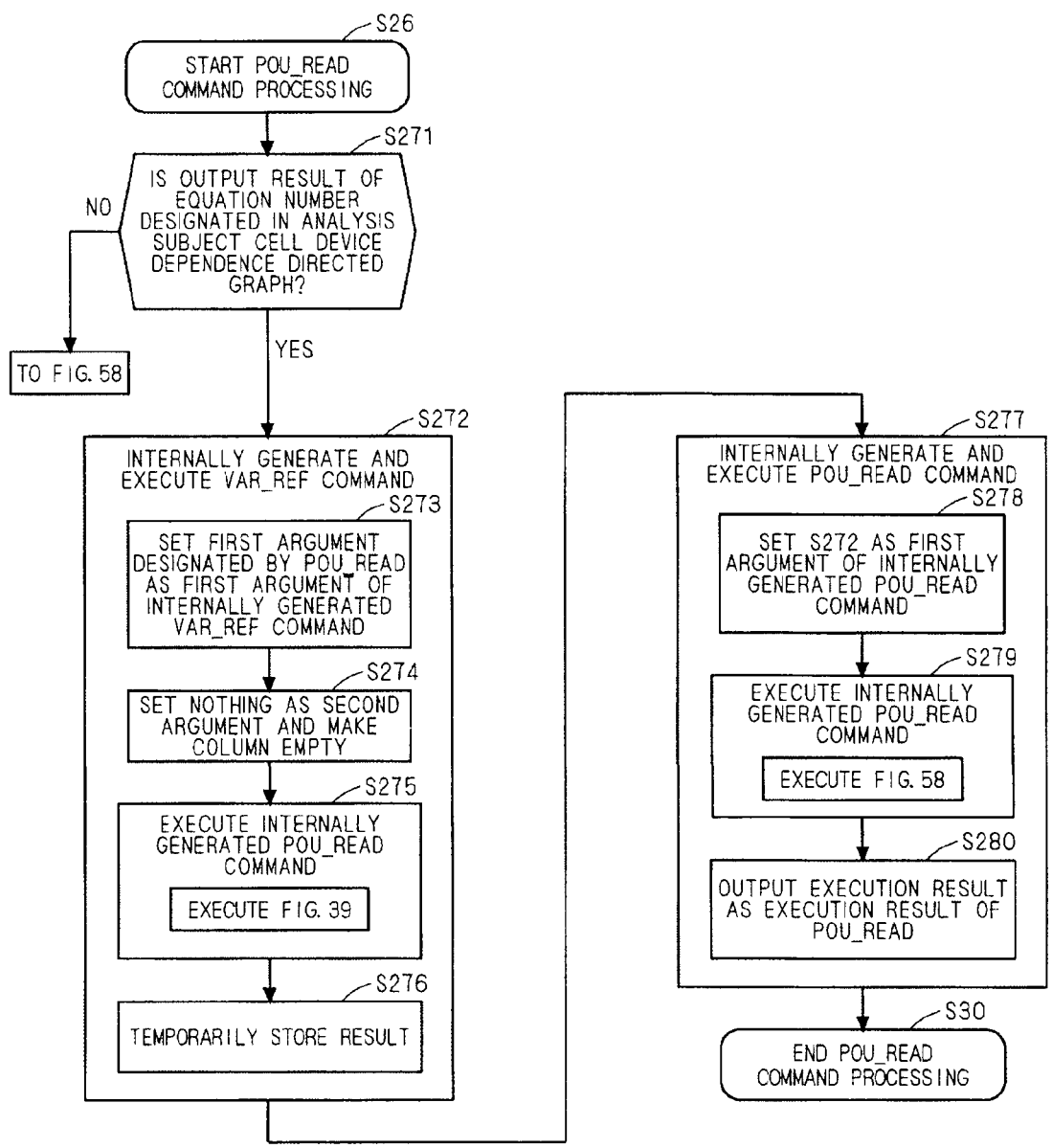
FIG. 59 is a flow chart showing a POU_READ processing flow.

When the AND processing executing part 17 performs processing to equation number S026 in FIG. 44 according to the processing flow shown in FIG. 59, as a result of a logical product between a result in FIG. 49 and a result in FIG. 51, a result shown in FIG. 53 is obtained. With respect to processing in the next equation number S027, the same result as described above can be obtained.

Effect of Embodiment 9

Since a logical operation (logical sum OR processing) between directed graphs of dependence of POU calls in a ladder program is made possible, a desired POU call dependence directed graph can be extracted, and power of an operation related to program analysis can be saved.

A command to execute a logical sum between cross-references, a command to execute a logical sum between device dependence directed graphs, and a command to execute a logical sum between POU call dependence directed graphs can be designated by the same analysis command OR. Although an embodiment in which the commands are defined and selectively used as different commands (for example, the former is defined as VAR_REF_OR and VAR_FWD_BWD_OR, and the latter is defined as POU_FWD_BWD_OR) may be virtually used, commands to be used are changed depending on data types that are subjects of the analysis command OR. When an analysis command that executes a logical sum is defined as OR regardless of a data type, the usability becomes better. When analysis commands to be used are changed, a user needs to examine a logical sum command corresponding to each data type with a help, an instruction, or the like. However, when all the analysis commands can be executed by an analysis command OR, the user does not have the need, and power of an operation related to program analysis can be saved.

As a matter of course, logical product AND processing also has the same effect as described above.

Embodiment 10

The embodiment is related to a technique that makes it possible to extract a device cross-reference or a device dependence directed graph by using a POU being present in a POU call dependence directed graph as a subject.

Equation number S028 in FIG. 54 shows an example in which a collection of POUs being present in a POU call dependence directed graph extracted in equation number S021 in FIG. 44 is designated to be extracted.

More specifically, in the present invention, 1) a command to designate an arbitrary POU to be read to output a collection of the POU, 2) a command to designate all POUs constituting a program to be read to output a collection of the POUs, and 3) a command to extract a collection of a POU being present in a POU call dependence directed graph are designated by the same analysis command POU_READ.

A technique that extracts a collection of a POU being present in a POU call dependence directed graph by the analysis command POU_READ will be described next.

FIG. 54 is a diagram showing an example of a screen of the display part 4 to cause a user to input a program analysis condition in the microprocessor 2 by using the input part 5 in FIG. 1, and corresponds to the rests of FIGS. 7, 29, and 44 described above.

Figure 55:
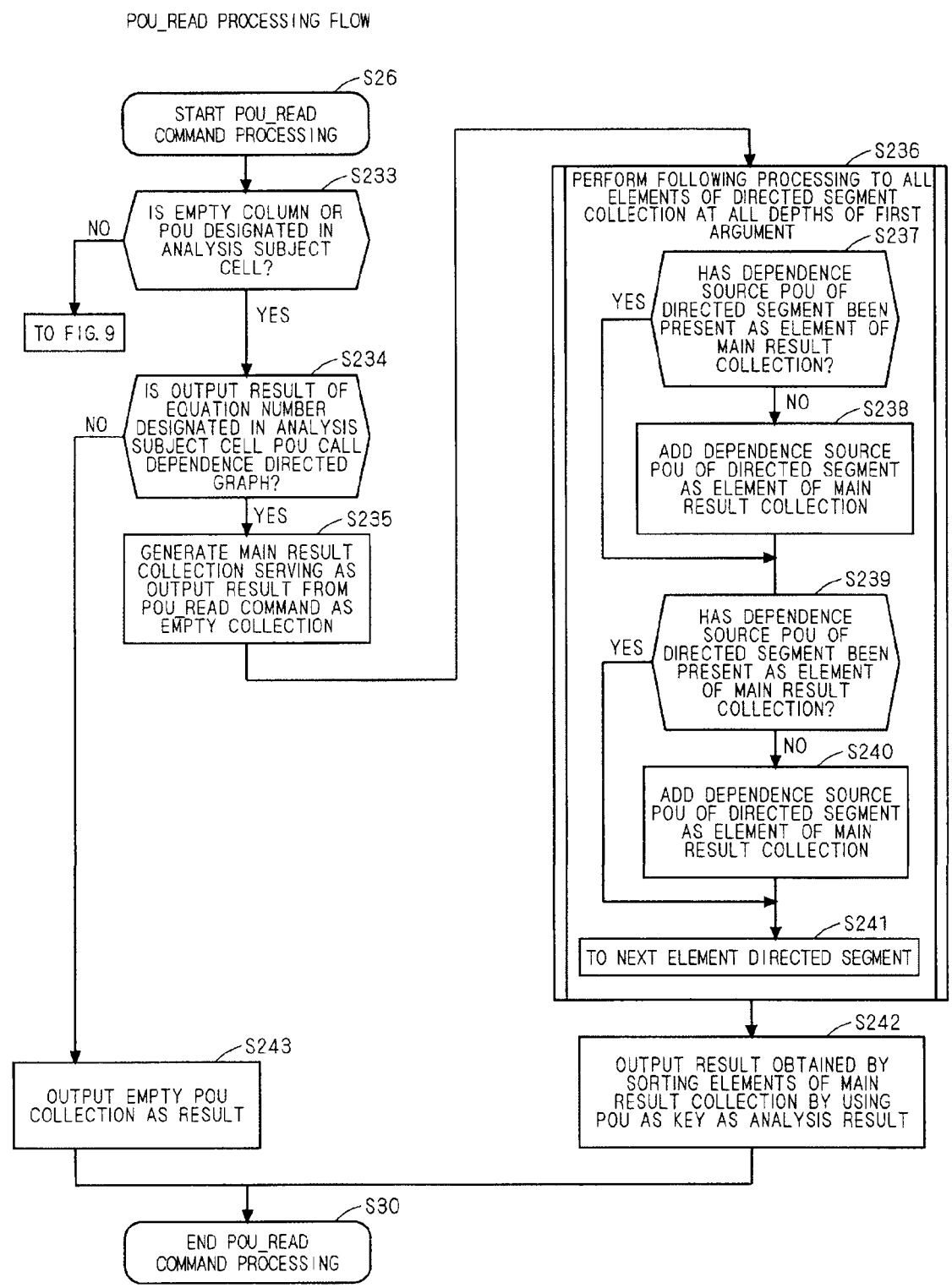
FIG. 55 is a flow chart showing a POU_READ processing flow.

FIG. 55 is a flow chart showing a processing flow of the analysis command POU_READ executed by the POU list extraction processing executing part 14 in FIG. 42.

The processing contents in FIG. 55 are similar to those of processing (See FIG. 39.) of an analysis command VAR_REF performed when a device cross-reference is extracted from the device dependence directed graph. A device and a POU are different from each other in that a device element to which information of a directed segment is given is handled, but the information of the directed segment is not given to the POU.

When the POU list extraction processing executing part 14 in FIG. 42 processes equation number S028 according to the processing flow shown in FIG. 55, from the POU call dependence directed graph in FIG. 46, a POU collection including MAIN, P10, P11, P12, P35, P36, P37, P38, and P39 are POU elements is obtained.

Equation number S029 in FIG. 54 shows an example in which a POU element extracted in equation number S028 is designated to extract a device cross-reference. A technique related to processing in equation number S029 has been described in Embodiment 1.

In this manner, not only extraction of a device cross-reference for a POU being present in a POU call dependence directed graph becomes possible, but also user's trouble of inputting MAIN, P10, P11, P12, P35, P36, P37, P38, and P39 serving as the POU elements extracted from the POU call dependence directed graph to the first argument of the analysis command VAR_REF one by one is saved.

Equation number S030 in FIG. 54 shows an example in which a POU element extracted in equation number S028 is designated to extract a device dependence directed graph. A technique related to processing in equation number S030 has been described in Embodiments 2 and 3.

In this manner, not only extraction of a device dependence directed graph for a POU element being present in a POU call dependence directed graph becomes possible, but also user's trouble of inputting MAIN, P10, P11, P12, P35, P36, P37, P38, and P39 serving as the POU elements extracted from the POU call dependence directed graph to the first argument of the analysis command VAR_FWD one by one is saved. This point is also established in the analysis command VAR_BWD.

An analysis command VAR_REF in equation number S031 in FIG. 54 shows an example in which a POU call dependence directed graph extracted in equation number S021 is designated to extract a device cross-reference. More specifically, the analysis command VAR_REF in equation number S031 is to extract a device cross-reference in a POU being present in the POU call dependence directed graph.

Figure 56:
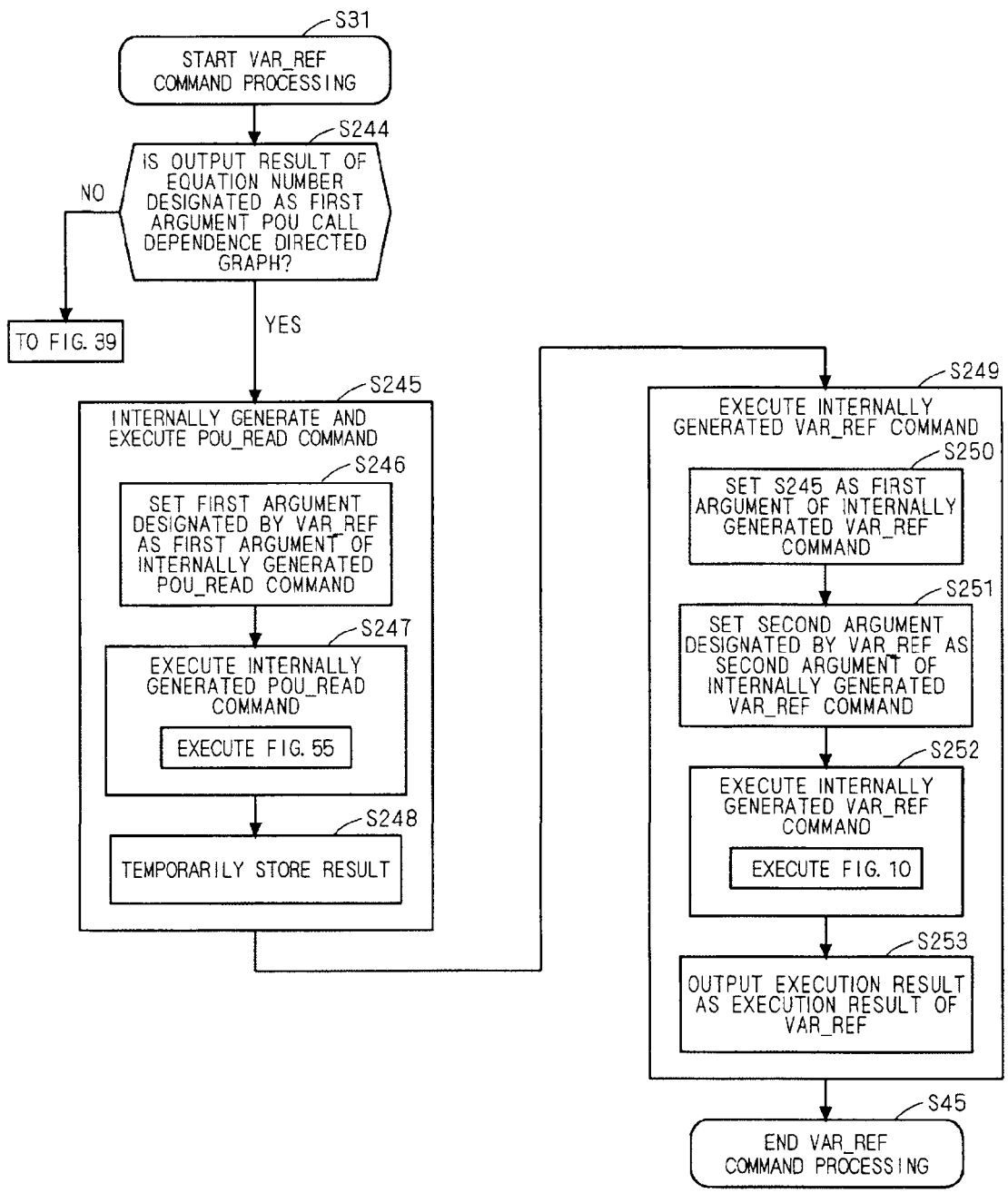
FIG. 56 is a flow chart showing a VAR_REF processing flow.

A processing flow of the analysis command VAR_REF executed by the variable use list extraction processing executing part 12 in FIG. 42 is shown in FIG. 56. Processing contents in FIG. 56 are realized by a combination between the technique shown in FIG. 10 and the technique shown in FIG. 55 that have been described in the present invention.

Even though a user does not input two conditional equations such as equation numbers S028 and S029 to equation number S021 one by one, the same result is obtained by inputting one conditional equation called equation number S031.

An analysis command VAR_FWD in equation number S032 in FIG. 54 shows an example in which a POU call dependence directed graph extracted in equation number S021 is designated to extract a device dependence directed graph. More specifically, the analysis command VAR_FWD in equation number S032 is to extract a device dependence directed graph in a POU being present in the POU call dependence directed graph.

Figure 57:
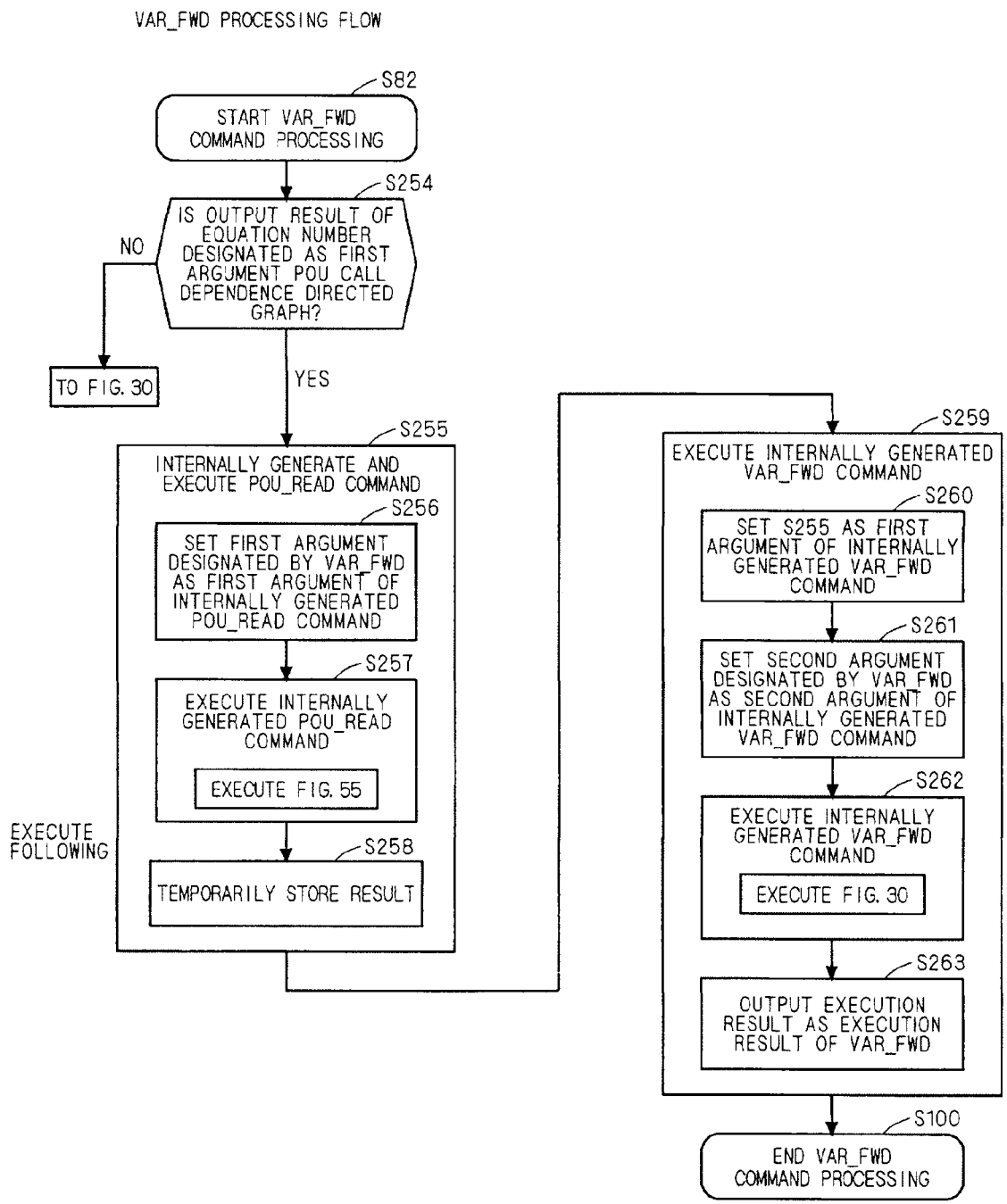
FIG. 57 is a flow chart showing a VAR_FWD processing flow.

A processing flow of the analysis command VAR_FWD executed by the variable dependence extraction processing executing part 13 in FIG. 42 is shown in FIG. 57. Processing contents in FIG. 57 are realized by a combination between the technique shown in FIG. 30 and the technique shown in FIG. 55 that have been described in the present invention.

Even though a user does not input two conditional equations such as equation numbers S028 and S030 to equation number S021 one by one, the same result is obtained by inputting one conditional equation called equation number S032.

This point is also established in the analysis command VAR_BWD.

Effect of Embodiment 10

A device cross-reference or a device dependence directed graph can be extracted to a POU call dependence directed graph in a ladder program. User' trouble of inputting POU elements extracted from the POU call dependence directed graph one by one can be saved. Furthermore, even though a user does not input two conditional equations one by one, a desired device cross-reference or a desired device dependence directed graph can be obtained by inputting one conditional equation.

According to these advantages, power of an operation related to program analysis can be saved.

Embodiment 11

Figure 71:
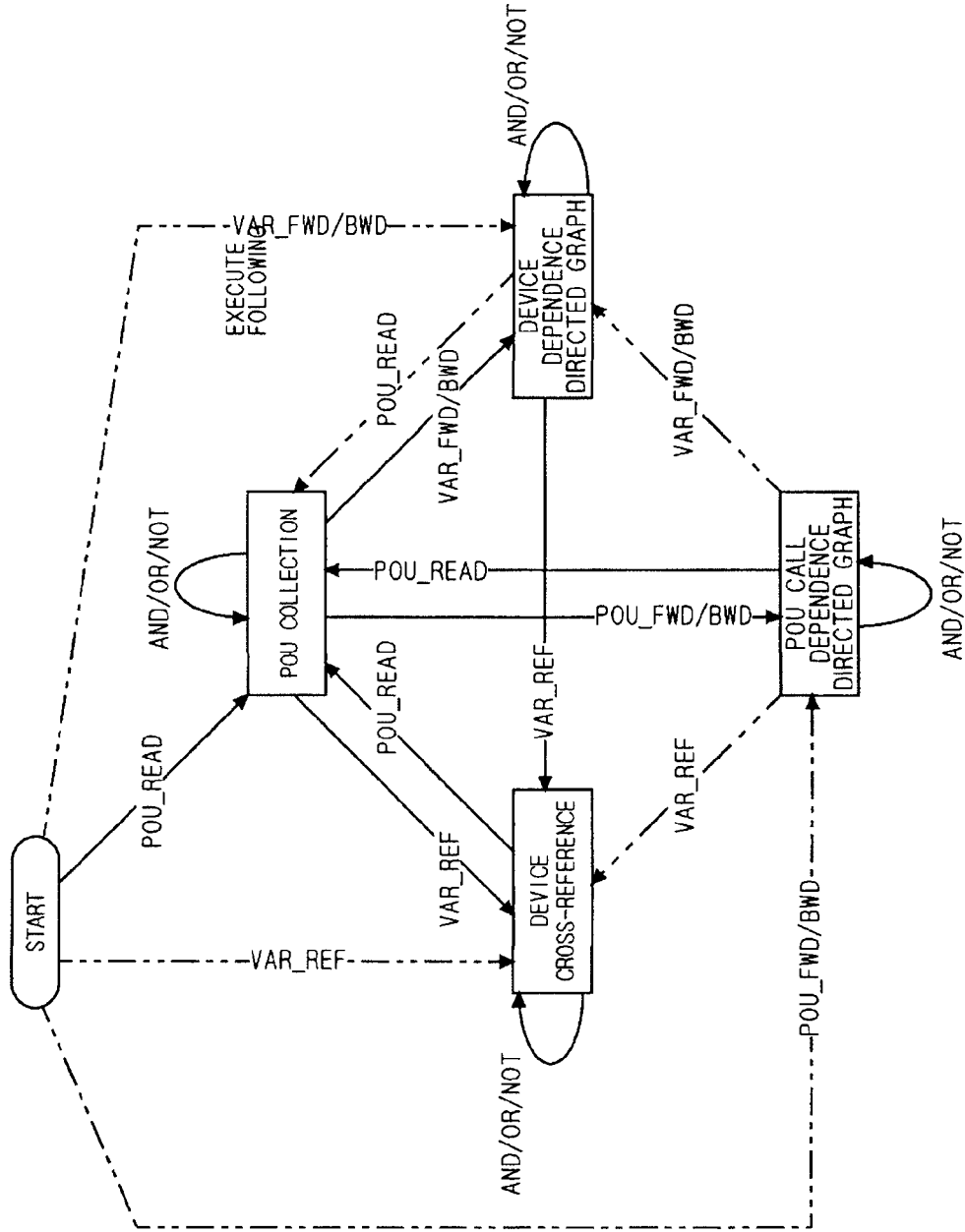
FIG. 71 is a graph showing a relationship between an analysis command and analysis result data thereof.

The embodiment is related to a technique that makes it possible to extract a device cross-reference or a POU being present in a device dependence directed graph. More specifically, as shown in FIG. 71, for example, a user designates a device cross-reference obtained by execution of an analysis command POU_READ and an analysis command VAR_REF subsequent thereto as a second argument, designates the analysis command POU_READ as a first argument, and executes the equation number to make it possible to obtain a collection of POUs again. The number of POU elements constituting the collection of POUs obtained again can be limited more than that of POU elements of a POU collection obtained by execution of a conventional analysis command POU_READ. Similarly, a user designates the device dependence directed graph as the second argument and designates the analysis command POU_READ as the first argument to execute the equation number to make it possible to obtain a collection of POUs again. Also in this case, the number of POU elements constituting the collection of the POUs obtained again can be more limited.

In this state, a further advanced technique will be developed as described below.

A) In extraction of a POU from a device cross-reference, a user designates a POU serving as an analysis subject as a first argument and designates a variable (device) serving as an analysis condition as a second argument. All POUs designated as the first argument do not always include a variable (device) designated as the second argument. For this reason, when the user designates all the POUs constituting the program in the first argument to obtain a cross-reference of the variable (device) designated as the second argument, when the user wants to extract a list of POUs using these variables (devices), the technique described below is used in the embodiment.

B) In extraction of a POU from a device dependence directed graph, a user designates a POU serving as an analysis subject as a first argument and designates a variable (device) serving as a start point of dependence analysis as a second argument. However, all the POUs designated as the first argument are not always related to the device dependence directed graph serving as an extraction result. For this reason, when the user designates all the POUs constituting the program in the first argument to obtain a device dependence directed graph having the variable (device) designated as the second argument as a start point, when the user wants to extract a list of POUs related to the device dependence directed graph, the technique described below is used in the embodiment.

Equation number S034 in FIG. 54 shows an example in which extraction of a device cross-reference of variables (devices) M [0 to 9] and M [20-29] in a collection of POUs read in equation number S020 in FIG. 44, therefore, in all the POUs constituting the program is designated. Equation number S035 in FIG. 54 shows an example in which a list of POUs being present in the result in equation number S034 is extracted.

More specifically, in the present invention, 1) a command to designate an arbitrary POU to be read to output a collection of the POU, 2) a command to designate all POUs constituting a program to be read to output a collection of the POUs, 3) a command to extract a collection of a POU being present in a POU call dependence directed graph, and 4) a command to extract a collection of a POU being present in a device cross-reference are designated by the same analysis command POU_READ.

Figure 58:
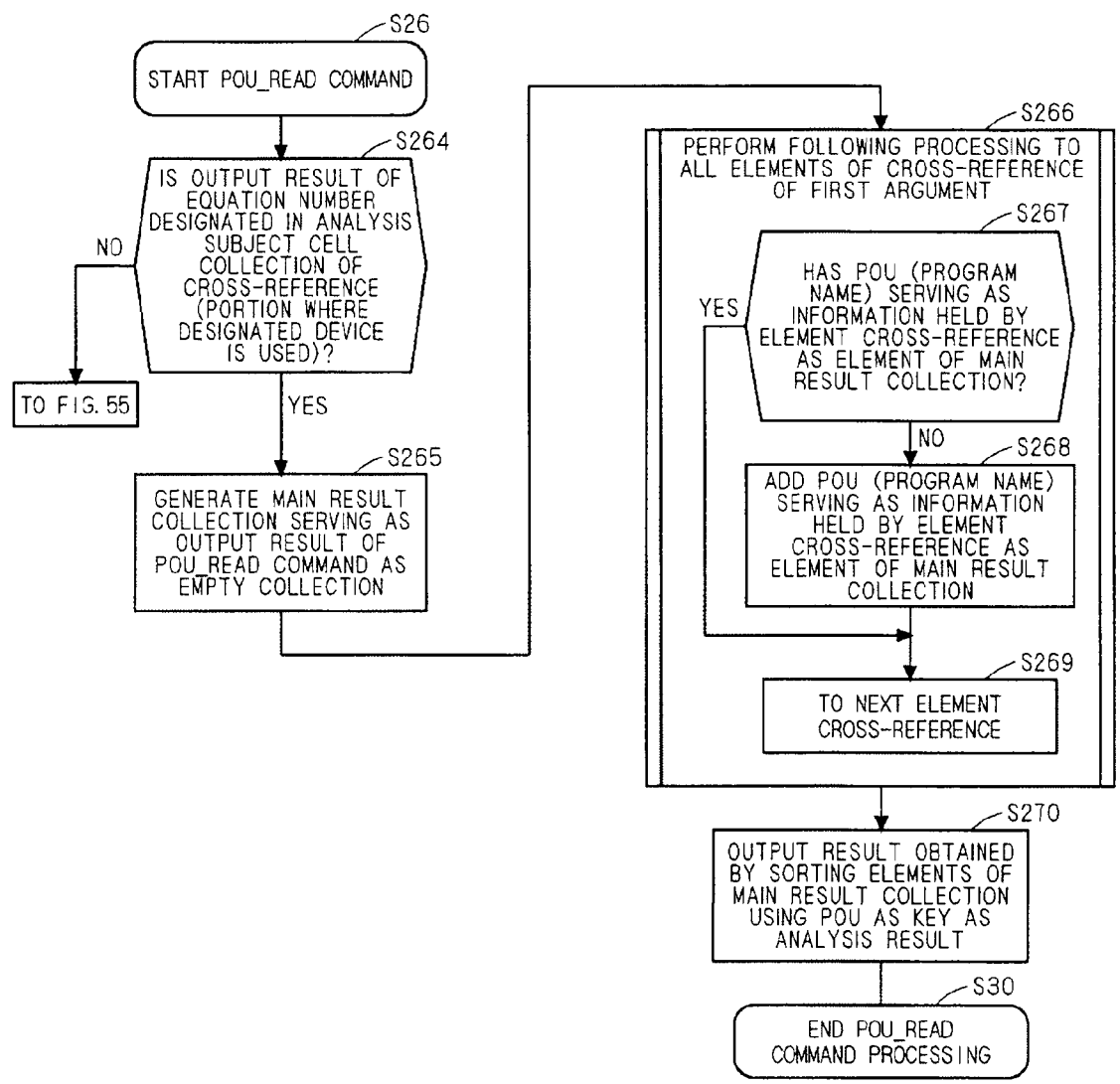
FIG. 58 is a flow chart showing a POU_READ processing flow.

A processing flow of the analysis command POU_READ executed by the POU list extraction processing executing part 14 in FIG. 42 is shown in FIG. 58. First, the part 14 confirms whether a data type serving as a subject is a device cross-reference. When the data type is not a device cross-reference, the part 14 executes the processing flow in FIG. 55. On the other hand, a data type serving as a subject is a device cross-reference, the part 14 performs processing of extracting and outputting a collection of a POU being present in the device cross-reference.

For simplicity, a case with equation number S033 in FIG. 54 will be described. Referring to program names of cross-references being present on a screen in FIG. 19 showing a device cross-reference in equation number S006 of the first argument, POUs being present in the device cross-references are only MAIN and SUB. For this reason, when the part 14 processes equation number S033 on the basis of the processing flow in FIG. 58, a collection of POUs each including MAIN and SUB as elements is obtained.

Equation number S036 in FIG. 54 shows an example in which a device dependence directed graph having a variable (device) M4095 as a start point in a collection of POUs read in equation number S020, therefore, all POUs constituting the program is designated to be extracted, the next equation number S037 shows an example in which a cross-reference related to a device being present in the extraction result in equation number S036 is designated to be extracted, and the next equation number S038 shows an example in which a list of POUs being present in the extraction result in equation number S037. The processing of each of the equation numbers has been described above.

Equation number S039 in FIG. 54 shows an example in which a list of POUs related to the extraction result in equation number S036 is extracted. More specifically, in the present invention, 1) a command to designate an arbitrary POU to be read to output a collection of the POU, 2) a command to designate all POUs constituting a program to be read to output a collection of the POUs, 3) a command to extract a collection of a POU being present in a POU call dependence directed graph, 4) a command to extract a collection of a POU being present in a device cross-reference, and 5) a command to extract a collection of a POU related to the device dependence directed graph are designated by the same analysis command POU_READ.

A processing flow of the analysis command POU_READ executed by the POU list extraction processing executing part 14 in FIG. 42 is shown in FIG. 59. First, the part 14 confirms whether a data type serving as a subject is a device dependence directed graph. When the data type is not a device dependence directed graph, the part 14 executes the processing flow in FIG. 58 described above. On the other hand, a data type serving as a subject is a device dependence directed graph, the part 14 applies analysis command VAR_REF shown in FIG. 56 to the device dependence directed graph to extract a device cross-reference, and applies the processing flow of the analysis command POU_READ shown in FIG. 58 to the extracted device cross-reference to perform processing to extract and output a collection of POUs.

Even though a user does not input two conditional equations such as equation numbers S037 and S038 to equation number S036 one by one, the same result can be obtained by inputting one conditional equation of equation number S039.

Effect of Embodiment 11

A POU being in the extracted device cross-reference or the extracted device dependence directed graph can be extracted.

Furthermore, even though a user does not input two conditional equations one by one to extract a POU being present in the device dependence directed graph, a result can be obtained by inputting one conditional equation.

According to these advantages, power of an operation related to program analysis can be saved.

Embodiment 12

The embodiment is related to a technique that makes it possible to designate logical operations of different data. For example, when a logical product AND between the device cross-reference and the device dependence directed graph is designated, the device dependence directed graph is converted into the device cross-reference, and the microprocessor 2 in FIG. 1 may automatically interpret a designated equation number to perform processing according to internal processing of the microprocessor such that processing of a logical product operation is executed.

In the logical product AND in equation number S041 in FIG. 54, an output from a first argument S005 is the device cross-reference, and an output from a second argument S011 is the device dependence directed graph. In this manner, when a logical operation between different data is designated, the microprocessor 2 extracts contents of the same data format as that of the first argument from output contents of the second argument first, and the specification of the program analysis support device is determined such that a logical operation of an analysis command designated thereafter is executed.

After a user inputs equation number S018 that extracts an analysis command VAR_REF to equation number S011, even though a conditional equation of a logical product AND between equation number S005 and equation number S018 is not input like equation number S040 in FIG. 54, the same result can be obtained by inputting one conditional equation of equation number S041.

Equation number S042 in FIG. 54 is designated such that the first argument and the second argument in equation number S042 have an inverse function of the function in equation number S041. Also in this case, since the analysis command AND is a logical product AND between a device cross-reference and a device dependence directed graph, the device dependence directed graph is converted into the device cross-reference first, and processing may be performed by automatic interpretation performed by internal processing such that a logical product operation is executed. More specifically, in equation number S041 and equation number S042, the same results are obtained.

Figure 60:
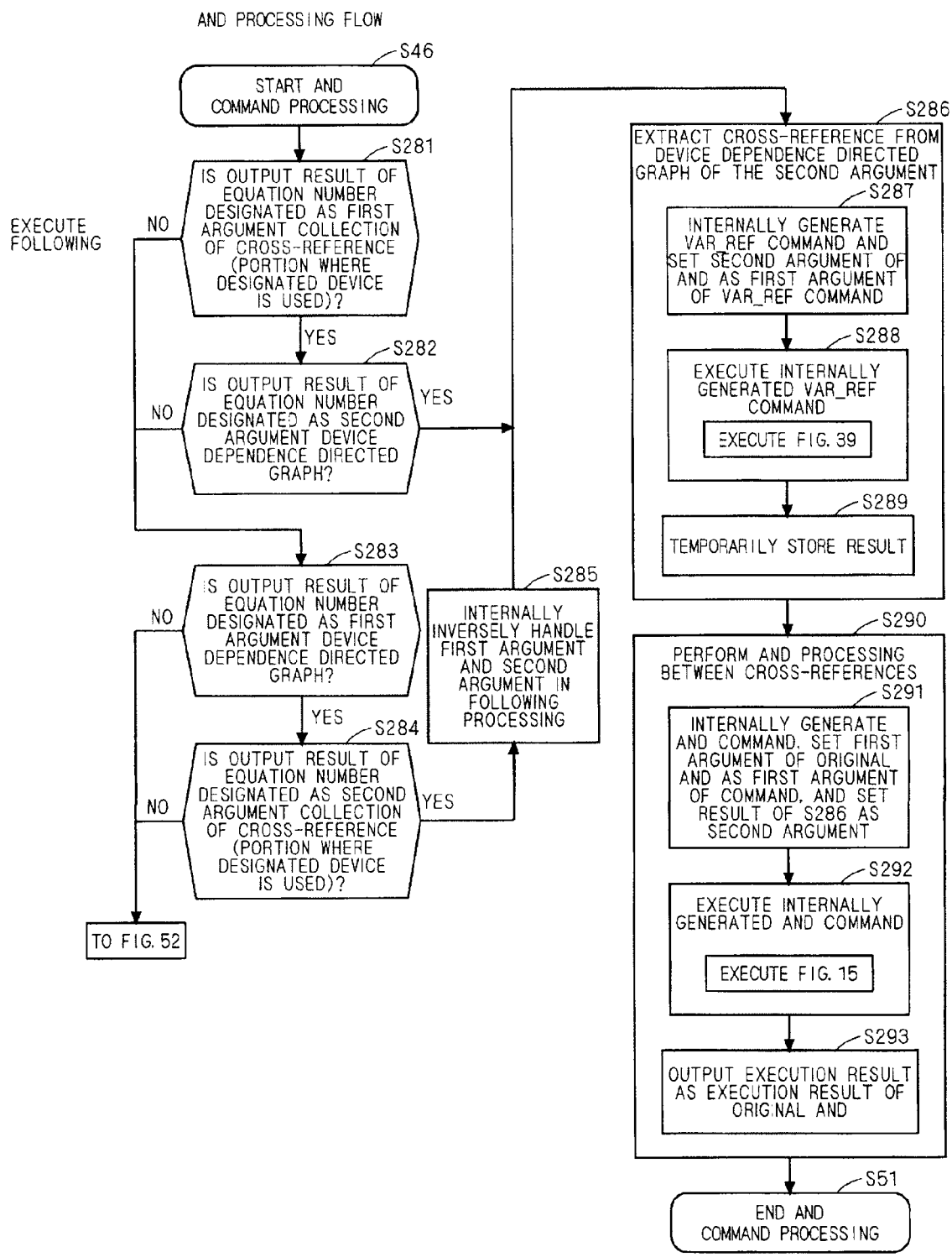
FIG. 60 is a flow chart showing an AND processing flow.

FIG. 60 is a flow chart showing a processing flow of an analysis command AND executed by the AND processing executing part 17 in FIG. 42. When the AND processing executing part 17 processes equation number S041 on the basis of the processing flow in FIG. 60, as shown in FIG. 61, a cross-reference representing an analysis result in which the variable (device) M4 is used in each of the programs MAIN and SUB is obtained.

Effect of Embodiment 12

Designation of a logical operation between different data becomes possible. In this manner, even though a user does not inputs conditional equations to convert data formats into the same data format one by one before a conditional equation of a logical operation is designated, only one conditional equation needs to be input, and power of an operation related to program analysis can be saved.

Embodiment 13

Up to now, as an example of a screen of a display part to cause a user to input a program analysis condition by using an input part, FIG. 7 is shown, and a technique that makes it possible to form a cross-reference obtained by freely combining program analysis conditions has been described above. In this case, since a combination between program analysis conditions is not specially limited, a user can freely combine the program analysis conditions to each other. In contrast to this, when the user tries to obtain a desired program analysis result, the user needs to consider the combination between the program analysis conditions by herself/himself.

Although a conventional program analysis support device can form only a cross-reference within a prepared condition designating function range. However, in contrast to this, when a prepared cross-reference is to be formed, a user does not need to consider a combination between program analysis conditions by herself/himself.

However, when a user tries to obtain a desired program analysis result according to the same policy as that of the conventional program analysis support device, various cross-reference forming functions need to be prepared. More specifically, according to the same policy as the conventional policy, when an attempt to realize a program analysis support device by the configuration described in the column of the background art is made, a developer of a program analysis support device requires a large amount of labor. More specifically, a problem of complexity of the internal structure of an analysis condition executing part is posed.

In the embodiment, when program analysis functions such as various cross-reference forming functions are prepared according to the same policy as that of a conventional program analysis support device, a technique that makes it possible to considerably reduce a labor of a developer of a program analysis support device by using the configuration of the present invention described up to now will be described below.

As a concrete example, a case in which, according to the same policy as that of a conventional program analysis support device, a ladder program static slicing function is prepared as an only-purpose program analyzing function on the program analysis support device according to the embodiment or mounted as a program is described.

Figure 62:
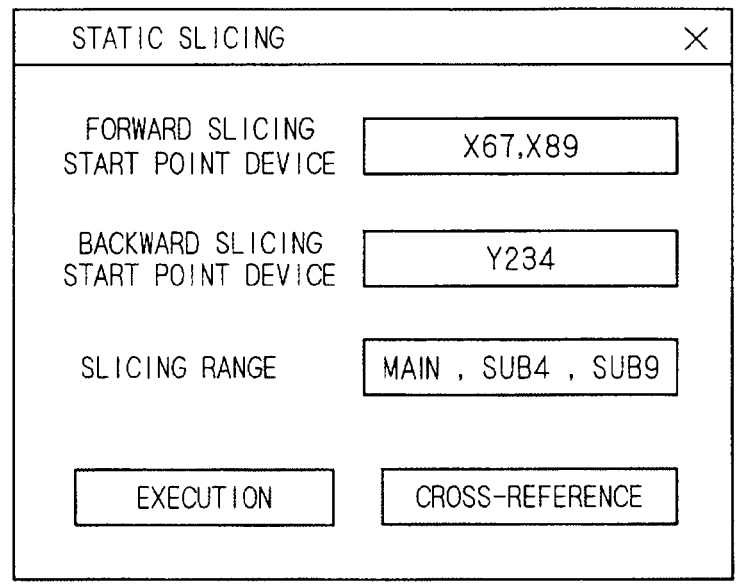
FIG. 62 is a diagram showing a ladder program static slicing screen.

In this case, FIG. 62 is a diagram showing one example (dialog box) of a screen of a display part for ladder program static slicing.

The ladder program static slicing function is a function of dedicatedly or expertly providing extraction of a device dependence directed graph in an analysis subject range POU designated by a user and extraction of a list (cross-reference) of a variable (device) being present in the directed graph.

In a slicing range in FIG. 62, a user inputs a POU name serving as an analysis subject range of a device dependence directed graph desired to be extracted by the user. In the specification, it is assumed that POUs are enumerated and delimited with commas (,) in a slicing range when a user wants to designate at least one POU as an analysis subject range, and the user inputs nothing in the slicing range when the user wants to designate all POUs constituting a program to be read.

In the specification, when a user designates different variables (devices) to both a forward slicing start point device and a backward slicing start point device, respectively, on the screen in FIG. 62, a device dependence directed graph obtained by processing a logical product AND between the forward device dependence directed graph and the backward device dependence directed graph is extracted.

In the column of the forward slicing start point device on the screen, a user inputs a variable (device) serving as a start point of a device dependence directed graph that the user wants to extract. In the specification, when the user wants to extract a device dependence directed graph obtained by processing a logical sum OR of at least one forward device dependence directed graph, the user enumerates variables (devices) delimited with commas (,).

In the column of the backward slicing start point device on the screen, a user inputs a variable (device) serving as a start point of a device dependence directed graph that the user wants to extract. In the specification, when the user wants to extract a device dependence directed graph obtained by processing a logical sum OR of at least one backward device dependence directed graph, the user enumerates variables (devices) delimited with commas (,).

More specifically, in the specification, when a user designates a plurality of different variables (devices) to each of both a forward slicing start point device and a backward slicing start point device, a device dependence directed graph obtained by executing AND processing to a device dependence directed graph obtained by OR processing of at least one forward device dependence directed graph and a device dependence directed graph obtained by OR processing of at least one backward device dependence directed graph is extracted.

When a user designates a variable (device) to only the column of the backward slicing start point device without designating a variable (device) to the column of the forward slicing start point device on the screen in FIG. 62, a backward device dependence directed graph is extracted as a result. In contrast to this, in the specification, the user designates the variable (device) only to the column of the forward slicing start point device without designating the variable (device) to the column of the backward slicing start point device, a forward device dependence directed graph is extracted as a result.

Figure 63:
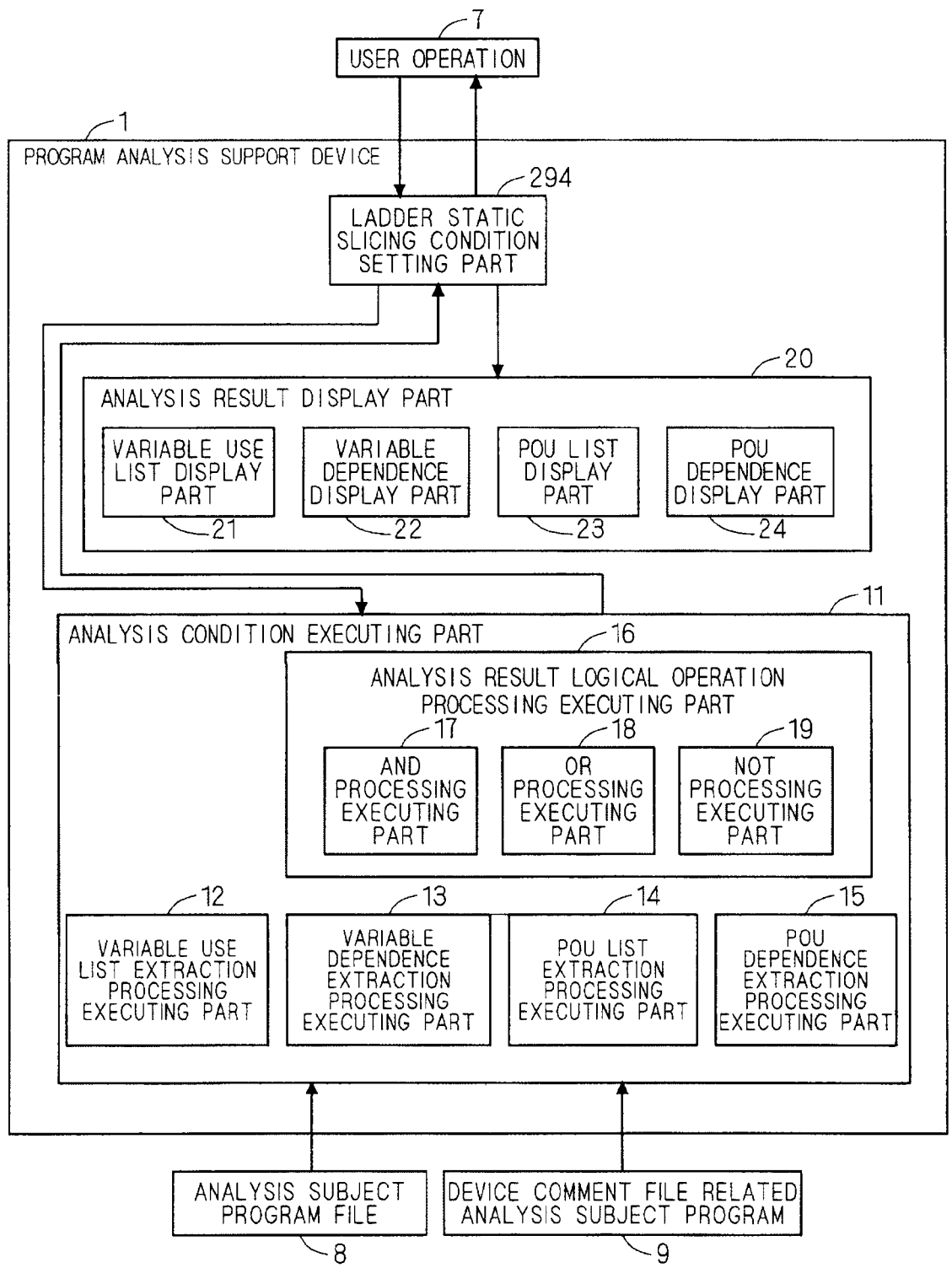
FIG. 63 is a functional block diagram showing a software configuration of a program analysis support device according to Embodiment 13.

FIG. 63 is a functional block diagram (software block configuration diagram) showing a configuration of a functional part to realize ladder program static slicing in the microprocessor 2 in FIG. 1.

Processing related to ladder program static slicing is realized by a configuration in which, in response to a screen input by a user and an operation of an execution button start on a screen, a command internally generated by a ladder static slicing condition setting part 294 is processed by the analysis condition executing part 11, and a processing result thereof is displayed by the analysis result display part 20 on the screen of display part 4 in FIG. 1.

Figure 64:
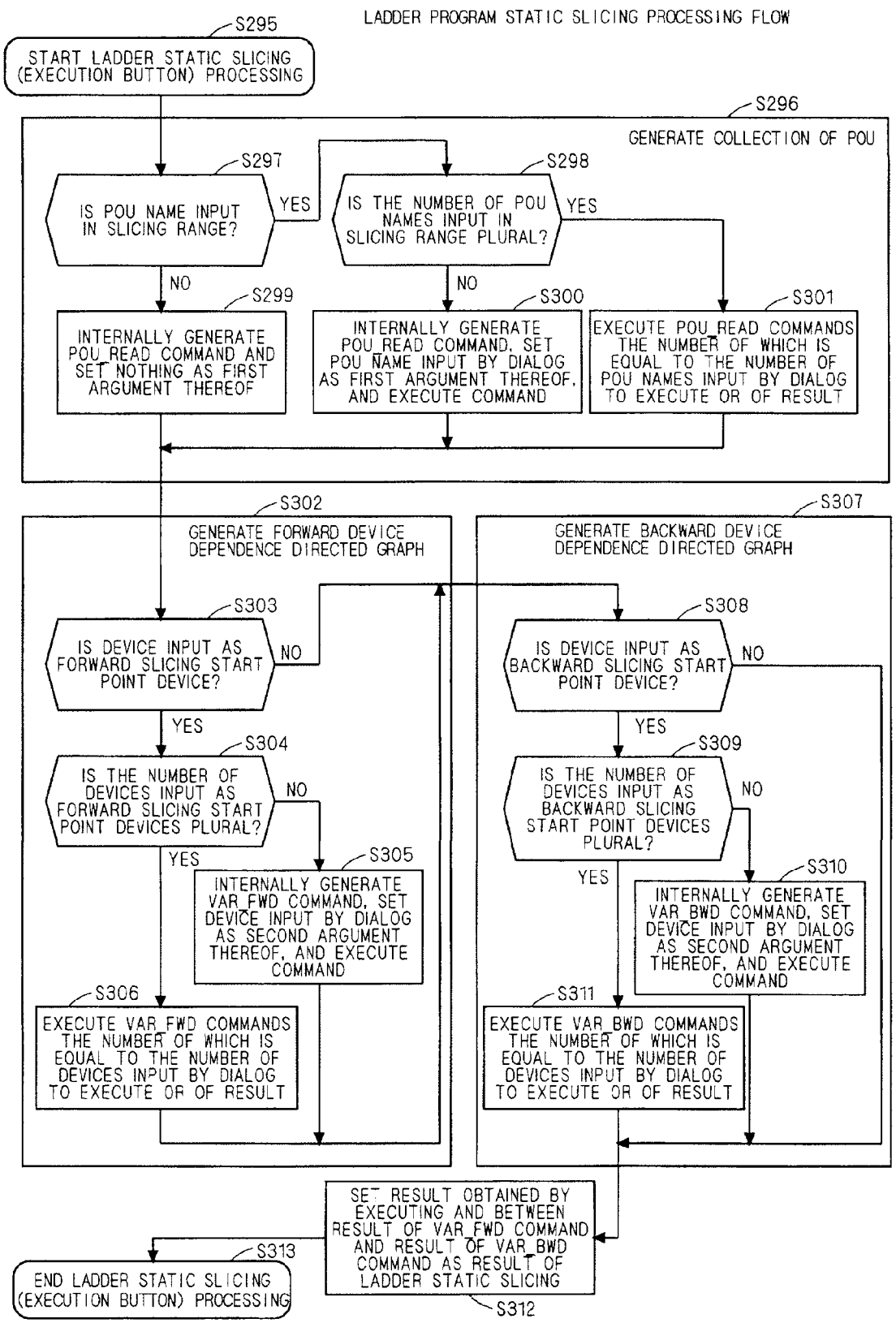
FIG. 64 is a flow chart showing a ladder program static slicing processing flow.

A processing flow executed by the ladder static slicing condition setting part 294 is shown in FIG. 64. A point at which the input contents shown in FIG. 62 are processed by the part 294 according to the processing flow in FIG. 64 will be described below.

In step S295, when a user clicks an execution button on the ladder program static slicing screen in FIG. 62, the ladder static slicing condition setting part 294 starts the following processing.

In step S297, the part 294 confirms whether a POU name is input in a slicing range in a dialog box in FIG. 62. In the example in FIG. 62, the part 294 determines "YES".

In step S298, the part 294 confirms whether the number of POU names input in a slicing range in the dialog box in FIG. 62 is plural. In the example in FIG. 62, the part 294 determines "YES".

In step S301, the part 294, with respect to the example, internally generates and executes the following command.
1) S901=POU_READ (MAIN)
2) S902=POU_READ (SUB4)
3) S903=OR (S901, S902)

In an application of step S301 in the example, the part 294 further internally generates and executes the next command.
4) S904=POU_READ (SUB9)
5) S905=OR (S903, S904)

As described above, when the part 294 internally performs generation and execution of various commands one by one, in step S301, the part 294 copes with generation of a POU collection when a plurality of POU names are input.

The part 294 uses an equation number of a final analysis command internally generated in the processing in step S296 as a first argument of extraction processing of a device dependence directed graph processed in the following step S302 and step S307. In the example, the part 294 designates equation number S905 serving as a fifth generated command as a first arguments of an analysis command VAR_FWD and an analysis command VAR_BWD In step S303, with respect to the example, the part 294 confirms that a variable (device) is input to the forward slicing start point device in FIG. 62.

In step S304, with respect to the example, the part 294 confirms that the number of variables (devices) input to the forward slicing start point device in FIG. 62 is plural.

In step S306, the part 294, with respect to the example, internally generates and executes the following command.
6) S906=VAR_FWD (S905, X67)
7) S907=VAR_FWD (S905, X89)
8) S908=OR (S906, S907)

The part 294 uses an equation number of a final command internally generated in step S302 as a first argument of AND processing between device dependence directed graphs processed in step S312. In the example, the part 294 designates equation number S908 as a first argument of AND processing.

In step S308, with respect to the example, the part 294 confirms that a variable (device) is input as a backward slicing start point device in FIG. 62.

In step S309, with respect to the example, the part 294 confirms that the number of devices input as a backward slicing start point device in FIG. 62 is not plural ("NO" is determined.) to shift to step S310.

In step S310, the part 294, with respect to the example, internally generates and executes the following command.
9) S909=VAR_BWD (S905, Y234)

The part 294 uses an equation number of a final command internally generated in step S307 as a second argument of AND processing between device dependence directed graphs processed in step S312. In the example, the part 294 designates equation number S909 as a second argument of AND.

In step S312, the part 294 internally generates and executes an analysis command AND that includes an equation number of a final command internally generated in step S302 as a first argument and an equation number of a final command internally generated in step S307 as a second argument.
10) S910=AND (S908, S909)

However, when an internally generated command is not present in step S302, the part 294 uses a processing result of a final command internally generated in step S307 as a processing result in step S312 without change.

When an internally generated command is not present in step S307, the part 294 uses a processing result of a final command internally generated in step S302 as a processing result in step S312 without change.

However, when an internally generated command is not present in steps S302 and S307, the part 294 makes the processing result in step S312 empty.

The ladder static slicing condition setting part 294 transmits a result of the device dependence directed graph obtained by the above processing to the analysis result display part 20, and the part 20 outputs a display signal to draw the result of the device dependence directed graph to the display part 4 in FIG. 1. As a result, the result of the device dependence directed graph is displayed on the screen of the display part 4.

Furthermore, when a user clicks a cross-reference button of the dialog box in FIG. 62 with the input part 5, the ladder static slicing condition setting part 294 extracts a cross-reference of a variable (device) being present in the device dependence directed graph that has been obtained, and the analysis result display part 20 displays the result. An illustration of a flow chart showing the processing flow is omitted, but a processing procedure thereof will be described below.

When the user presses (clicks) a cross-reference button on the ladder program static slicing screen, the part 294 starts processing.

The part 294 internally generates and executes an analysis command VAR_REF including equation number S910 of a final command executed by the part 294 as a first argument. At this time, the part 294 extracts a cross-reference of all variables (devices) being present in the device dependence directed graph without designating nothing as the second argument.

11) S911=VAR_REF (S910)

When a device dependence directed graph has not been obtained (has not been processed), the part 294 sets an empty processing result.

The ladder static slicing condition setting part 294 displays the cross-reference of the obtained variables (devices) through the variable use list display part 21 in FIG. 63.

Effect of Embodiment 13

A user does not need to consider a combination between program analysis conditions by herself/himself to make it possible to obtain a desired program analysis result. Therefore, labor to prepare a program analyzing function such as various cross-reference forming functions can be considerably saved.

In this manner, a developer of a program analysis support device can reduce (shorten) the number of steps (cost and period) for developing a program analysis support device to improve the efficiency of an operation to specify a place serving as a editing subject in a change of programs, analysis of a drawback operation, or the like to make it possible to shorten time required for the operation. For the program analysis support device, a program analyzing function such as various cross-reference forming functions can be easily prepared.

In this manner, since the program analyzing function such as various cross-reference forming functions is prepared for the program analysis support device, a user improves the efficiency of an operation to specify a place serving as an editing subject in a change of programs or a drawback operation to make it possible to shorten time required for the operation.

Embodiment 14

Up to now, the program analyzing functions for extraction of a device cross-reference for a collection of predetermined program POUs, extraction of a device dependence directed graph, and extraction of a POU call dependence directed graph have been described. A function of performing a logical operation (AND/OR/NOT) to these analysis results is also described. Furthermore, a function of further performing program analysis processing to the results of the program analyzing functions is also described.

When a new analyzing function (analysis command) is added to the program analysis support device according to the present invention described above, when a data format extracted by the new analyzing function (analysis command) is a new data format that has not been used in the program analysis support device according to the present invention, the characteristic point of the program analysis support device according to the present invention needs to be kept and undamaged, for example, AND/OR/NOT logical operations need to be defined for the analysis results.

The embodiment is related to a technique to add a new analyzing function (analysis command) to the program analysis support device according to the present invention described above.

Up to now, the program analyzing functions for extraction of a device cross-reference for a collection of predetermined program POUs, extraction of a device dependence directed graph, and extraction of a POU call dependence directed graph and a function of performing AND/OR/NOT logical operations to these analysis results or another program analysis have been described. When these functions are collected, the drawings in FIGS. 66 to 71 are obtained.

a) Contents in FIG. 66 showing a device cross-reference extraction command VAR_REF will be described first.

A variable (device) is designated as the second argument of the analysis command VAR_REF. On the other hand, as the first argument, an analysis result of a program analyzing function processed by the program analysis support device according to the present invention can be designated.

In the contents, a case in which an equation number that outputs a collection of POUs is designated as the first argument is the most basic processing mode (indicated by Δ in FIG. 66) of the analysis command VAR_REF.

A case in which an equation number that outputs a device dependence directed graph is designated as the first argument is a basic processing mode (indicated by ▨ in FIG. 66) of the analysis command VAR_REF.

On the other hand, a case in which a POU name is directly designated as the first argument may be conceived. Although the processing flow in this case is not described as the embodiment in the specification, with respect to the processing mode in this case, as shown in FIG. 66, the microprocessor 2 may internally process an analysis command POU_READ and then perform processing according to the most basic processing mode of the analysis command VAR_REF. More specifically, the microprocessor 2 can realize the processing in this case by a combination between other basic processing modes (indicated by Δ in FIG. 66).

The microprocessor 2 can also realize a case in which an equation number that outputs a POU call dependence directed graph is designated as the first argument by a combination of other basic processing modes (also indicated by Δ in FIG. 66).

A case in which an equation number that outputs a device cross-reference is designated as the first argument is not defined (indicated by x in FIG. 66). This is because the meaning or necessity of the definition cannot be found out.

b) The contents in FIG. 67 showing a device dependence directed graph extraction command VAR_FWD will be described below. FIG. 67 shows only the case of the forward analysis command VAR_FWD with respect to the device dependence directed graph. This point is for convenience, and the same contents as described above are proper for the backward analysis command VAR_BWD). A variable (device) is designated as the second argument of the analysis command VAR_FWD. As the first argument of the command, a user can designate an analysis result of a program analyzing function processed by the program analysis support device according to the present invention.

In the contents, a case in which an equation number that outputs a collection of POUs is designated as the first argument is the most basic processing mode (indicated by ▤ in FIG. 67) of the analysis command VAR_FWD.

On the other hand, a case in which a POU name is directly designated as the first argument may be conceived. Although the processing flow in this case is not described as the embodiment in the specification, with respect to the processing mode in this case, as shown in FIG. 67, the microprocessor 2 may internally process an analysis command POU_READ and then perform processing according to the most basic processing mode of the analysis command VAR_FWD. More specifically, the microprocessor 2 can realize the processing in this case by a combination between other basic processing modes (indicated by Δ in FIG. 67).

The microprocessor 2 can also realize a case in which an equation number that outputs a POU call dependence directed graph is designated as the first argument by a combination of other basic processing modes (also indicated by Δ in FIG. 67).

A case in which an equation number that outputs a device dependence directed graph is designated as the first argument is not defined (indicated by x in FIG. 67). This is because the meaning or necessity of the definition cannot be found out.

Similarly, a case in which an equation number that outputs a device cross-reference is designated as the first argument is also not defined (indicated by x in FIG. 67). This is also because the meaning or necessity of the definition cannot be found out.

c) The contents in FIG. 68 showing a analysis command POU_READ that extracts a collection of POUs will be described below. In this case, nothing is designated as the second argument of the analysis command POU_READ. On the other hand, as the first argument, a user can designate an analysis result of a program analyzing function processed by the program analysis support device according to the present invention.

In the contents, a case in which a name of a POU is directly designated as the first argument is the most basic processing mode (indicated by ▤ in FIG. 68) of the analysis command POU_READ.

A case in which an equation number that outputs a device cross-reference is designated as the first argument is a basic processing mode (indicated by ▨ in FIG. 68) of the analysis command POU_READ.

A case in which an equation number that outputs a POU call dependence directed graph is designated as the first argument is a basic processing mode (indicated by ▨ in FIG. 68) of the analysis command POU_READ.

On the other hand, a case an equation number that outputs a device dependence directed graph is designated as the first argument may be processed, as shown in FIG. 68, in the basic processing mode of the analysis command POU_READ after the microprocessor 2 internally processes the analysis command VAR_REF. More specifically, the microprocessor 2 can realize the processing in this case by a combination between other basic processing modes (indicated by Δ in FIG. 68).

A case in which an equation number that outputs a collection of POUs is designated as the first argument is not defined (indicated by x in FIG. 68). This is because the meaning or necessity of the definition cannot be found out.

d) The contents in FIG. 69 showing an analysis command POU_FWD that extracts a POU call dependence directed graph will be described below. In FIG. 69 shows only the case of the forward analysis command POU_FWD with respect to the POU call dependence directed graph. The same contents as described above are also established with respect to the analysis command POU_BWD. A POU name is designated as the second argument of the analysis command POU_FWD. As the first argument, a user can designate an analysis result of a program analyzing function processed by the program analysis support device according to the present invention.

In the contents, a case in which an equation number that outputs a collection of POUs is designated as the first argument is the most basic processing mode (indicated by ▤ in FIG. 69) of the analysis command POU_FWD.

On the other hand, a case in which a POU name is directly designated as the first argument may be conceived. Although the processing flow in this case is not described as the embodiment in the specification, with respect to the processing mode in this case, as shown in FIG. 69, the microprocessor 2 may internally process an analysis command POU_READ and then perform processing according to the basic processing mode of the analysis command POU_FWD. More specifically, the microprocessor 2 can realize the processing in this case by a combination between other basic processing modes (indicated by Δ in FIG. 69).

A case in which an equation number that outputs a POU call dependence directed graph is designated as the first argument is not defined (indicated by x in FIG. 69). This is because the meaning or necessity of the definition cannot be found out.

Similarly, a case in which an equation number that outputs a device cross-reference is designated as the first argument is also not defined (indicated by x in FIG. 69). This is because the meaning or necessity of the definition cannot be found out.

Similarly, a case in which an equation number that outputs a device dependence directed graph is designated as the first argument is not defined (indicated by x in FIG. 69). This is because the meaning or necessity of the definition cannot be found out.

e) Finally, the contents in FIG. 70 showing a function of performing a logical operation AND to these analysis results will be described below. In FIG. 70, although only the analysis command AND is shown with respect to the logical operation processing, the same contents are also satisfied with respect to analyzing commands OR and NOT serving as other logical operations.

In the contents, a case in which the first argument and the second argument use the same data format is the basic processing mode (indicated by ▤ in FIG. 70) of the analysis command AND. Each of data formats output by the program analysis functioning parts of the program analysis support device according to the present invention is any one of for data formats, i.e., a device cross-reference, a device dependence directed graph, a collection of POUs, and a POU call dependence directed graph, and processing flows of these cases are disclosed in the embodiments described above, respectively.

On the other hand, a method in which data formats of the first argument and the second argument are not defined when the data formats are different from each other may be conceived. However, for example, designation of an analysis command AND when an equation number that outputs a device cross-reference and an equation number that outputs a device dependence directed graph are designated as the first argument and the second argument respectively can also be interpreted as that AND processing between the device cross-reference of the first argument and the device cross-reference related to the device dependence directed graph of the second argument is intended to be extracted as a result thereof. This has been described in Embodiment 12. In this case, even though the data format of the first argument is different from the data format of the second argument, processing having most similar interpretation may be defined. The processing mode in this case, as shown in FIG. 70, the microprocessor 2 in FIG. 1 may internally process the analysis command VAR_REF and then execute the basic processing mode of the analysis command AND. More specifically, the microprocessor 2 can realize the processing in this case by a combination between other basic processing modes (indicated by Δ in FIG. 70).

A method in which a case in which the data format of the first argument and the data format of the second argument are different from each other is not defined may be conceived. However, after the processing having the most similar interpretation is defined, the microprocessor 2 in FIG. 1 may realize the processing by a combination of other basic processing modes (also indicated by Δ in FIG. 70).

In another case in which the data format of the first argument is different from the data format of the second argument, when the meaning or necessity of the definition of the case cannot be found out, the definition is not made in the present invention (indicated x in FIG. 70).

In any one of these processings in FIG. 70, even though the first argument and the second argument are inversely designated, the first argument and the second argument are symmetrically defined as the same interpretation. However, when the first argument and the second argument need to be asymmetrically defined, it is assumed that different definitions are made when the first argument and the second argument are inversely designated.

As described above, it is an important point of the present invention that, in basic processing (processing indicated by ▣ or ▨ in FIG. 70) of the program analysis functioning part in the microprocessor 2 in FIG. 1 and processing (processing indicated by Δ in FIG. 70) that can be realized by a combination of the above basic processings are definitely distinctively defined. Although the processing indicated by Δ in FIG. 70 is realized by the combination of the processing indicated by ▣ or ▨, the processing is not circulated in any way. When the relationships are collected up, a relationship shown in FIG. 71 is obtained.

When a part in charge of a new analyzing function (analysis command) is added to the microprocessor 2 in FIG. 1, parts (1) to (7) shown in FIG. 65 are defined on software. First, (1) an analysis command name is defined, and (2) a mode for designating a second argument is defined. In definition of (3) to (7), which is a basic processing mode (corresponding to ▣ or ▨), which is realized by a combination of other basic processings (corresponding to Δ), and which the meaning or the necessity of definition cannot be found out for (corresponding to x) are noted.

Furthermore, when a data format extracted by the new analyzing function is a new data format that has not been used in the program analysis support device according to the present invention, for an analysis result thereof, a function of defining AND/OR/NOT logical operations or another program analysis needs to be defined.

Therefore, a part (8) shown in FIG. 65 is defined on software.

For the definition of the program analyzing functions of the program analysis support device according to the present invention, definition to a new data format is added on software. More specifically, parts (9) to (12) in FIGS. 66 to 69 are defined.

A part (13) in FIG. 70 (logical operation between new data formats) is defined on software.

Finally, parts (14) and (15) in FIG. 70 (logical operation between the new data format and another data format) are defined on software.

Effect of Embodiment 14

1) When a functional part that performs a new analyzing function (analysis command) is added to the program analysis support device according to the present invention, processing of the new analyzing function is defined on software while keeping the characteristic point of the program analysis support device according to the present invention without damaging the characteristic point to make it possible to perform program analysis realized by freely combining program analysis conditions. On the basis of the analysis result, a user can rapidly specify a place serving as an editing subject, improve an operation to specify the place serving as the editing subject in a change of programs, analysis of a drawback operation thereof, or the like, and shorten time required for the operation.

2) When a data format extracted by the functional part that executes the new analyzing function is a new data format that has not been used in the program analysis support device, in order to make it possible to perform AND/OR/NOT logical operations to the analysis result, processing of the new analyzing function and processing of the analyzing functions of the program analysis support device according to the present invention are defined while keeping the characteristic point of the program analysis support device according to the present invention without damaging the characteristic point. For this reason, program analysis realized by freely combining program analysis conditions can be performed. On the basis of the analysis result, a user can rapidly specify a place serving as an editing subject, improve an operation to specify the place serving as the editing subject in a change of programs, analysis of a drawback operation thereof, or the like, and shorten time required for the operation.

APPENDIX (As described above, the present invention is to realize a program analysis support device that can freely combine program analysis conditions. The characteristic point of the present invention is compared with searching of a patent document like the PATOLIS (registered trade mark) described above, a different point therebetween is as follows.

More specifically, in the searching for a patent document are "repeating of application of a search formula to a population serving as a whole of a set of patent documents" and "execution of logical operation to a result of the searching", and the population serving as a subject of searching is always the whole of the set of patent documents. On the other hand, the present invention, also in the program analysis, is to realize repeating of application of "a search formula to a population that is an entire analysis subject program" and "execution of logical operation to a result thereof".

Furthermore, the present invention is to realize not only the fact that a population serving as a searching subject is always an entire analysis subject program but also "application of another search formula to a certain result.

In searching for a patent document is a result obtained by "application of a search formula to a population that is a whole of a set of patent documents" is also a set of patent documents. However, in program analysis a result obtained by "application of a search formula to a population that is an entire analysis subject program" is a set of various data types.

Therefore, as in searching for a patent document, there is program analysis that cannot be obtained by only repeating "application of a search formula to a population" and "execution of logical operation to a result thereof".

The present invention makes it possible to repeat "application of a search formula (analysis conditional equation) to a population", "application of another search formula to a result thereof", and "execution of logical operation to result thereof" to realize desired program analysis.

The embodiments of the present invention have been disclosed and described in detail above. The above description illustrates aspects to which the present invention can be applied, and the present invention is not limited to the embodiments. More specifically, various changes and modifications to the above aspects can be conceived without departing from the spirit and scope of the invention.

INDUSTRIAL APPLICABILITY

For example, the program analysis support device according to the present invention is, with respect to a measurement control program executed in various industrial controllers such as a programmable controller, a motion controller, a numerical control device controller, an inspection device controller or a display, or a microcomputer, preferably applied to improve the efficiency of an operation of analyzing a past measurement control program to develop a new measurement control program or an operation of editing/changing the program when a measurement control program is developed or debugged.

REFERENCE NUMERALS 1 program analysis support device, 2 microprocessor, 3 data storing memory, 4 display part, 5 input part, 6 storing part, 10 analysis condition setting part, 11 analysis condition executing part, 12 variable use list extraction processing executing part, 13 variable dependence extraction processing executing part, 14 POU list extraction processing executing part, 15 POU dependence extraction processing executing part, 16 analysis result logical operation processing executing part, 17 AND processing executing part, 18 OR processing executing part, 19 NOT processing executing part, 20 analysis result display part, 21 variable use list display part, 22 variable dependence display part, 23 POU list display part, 24 POU dependence display part, 294 ladder static slicing condition setting part.

The invention claimed is:

1. A program analysis support device having a program that represents a circuit diagram of relay logic and includes a plurality of hierarchical program modules, which are units of the relay logic, the device comprising:
a microprocessor configured to
input and hold a program analysis condition indicating a proposed change to the relay logic, the program analysis condition including at least one of the program modules and at least one device of the at least one of the program modules to be changed, as designated by a user,
execute analysis of the at least one program module to identify dependent devices whose operation is dependent upon the at least one device to be changed and to identify program modules containing the dependent devices,
output and store an analysis result including dependence directed graphs indicating hierarchical dependencies of the identified dependent devices,
output and store a collection of the identified program modules containing the dependent devices, and
display the analysis result wherein
the executing and the outputting and storing a collection are performed iteratively to identify other dependent devices whose operation is dependent upon the dependent devices identified in previous iterations of the executing in the program modules of the collection output in previous iterations of the outputting and storing,
thereby to improve efficiency of identifying devices and program modules affected by a change in the circuit diagram.

2. The program analysis support device according to claim 1, wherein the collection of the program modules output by the outputting and storing the collection of the program modules is a collection of all program modules included in the program.

3. The program analysis support device according to claim 1, wherein the microprocessor is further configured to output and store a cross-reference of devices present in the dependence directed graphs of the devices, and
wherein
when a collection of program modules exists in the dependence directed graphs of the devices, the microprocessor extracts a cross-reference of devices present in the dependence directed graphs of the devices and then extracts a collection of program modules present in the cross-reference of the devices.

4. A program analysis support device having a program that represents a circuit diagram of relay logic and includes a plurality of hierarchical program modules, which are units of the relay logic, the device comprising:
a microprocessor configured to
input and hold a program analysis condition indicating a proposed change to the relay logic, the program analysis condition including at least one of the program modules and at least one device of the at least one of the program modules to be changed, as designated by a user,
execute analysis of the at least one program module to identify dependent devices whose operation is dependent upon the at least one device to be changed and to identify program modules containing the dependent devices based on the program analysis condition,
extract and store an analysis result including a hierarchical relation of the identified program modules containing the identified dependent devices as dependence directed graphs indicating hierarchical dependencies of the program modules containing the dependent devices,
output and store a collection of the identified program modules containing the dependent devices, and
display the analysis result,
wherein
the executing and the outputting and storing a collection are performed iteratively to identify other program modules containing the dependent devices that are hierarchically below the program modules in the collection output in previous iterations of the outputting,
thereby to improve efficiency of identifying devices and program modules affected by a change in the circuit diagram.

5. The program analysis support device according to claim 4, wherein the microprocessor is further configured to extract a cross-reference of devices present in a program module being present in the dependence directed graphs related to the calling of the outputted program modules containing the dependent devices, and wherein the extraction further includes extracting a collection of the program modules present in the dependence directed graphs related to the calling of the program modules then extracting a cross-reference of devices described in the collection of the program modules.

6. The program analysis support device according to claim 4, wherein the microprocessor is further configured to output dependence directed graphs of devices described in the program modules by using a collection of program modules present in the dependence directed graphs related to the calling of the plurality of program modules, and wherein the extraction includes extracting the collection of the program modules present in the dependence directed graphs related to the calling of the plurality of program modules and then extracting the dependence directed graphs of the devices by using the collection of the program modules.

7. A program analysis support device having a program that represents a circuit diagram of relay logic and includes a plurality of hierarchical program modules, which are units of the relay logic, the device comprising:

a microprocessor configured to
input and hold a program analysis condition indicating a proposed change to the relay logic, the program analysis condition including at least one of the program modules and at least one device of the at least one of the program modules to be changed, as designated by a user, execute an analysis of the at least one program module to identify dependent devices whose operation is dependent upon the at least one device to be changed and to identify program modules containing the dependent devices, display an analysis result of the analysis processing, extract and store a cross-reference of the identified dependent devices included in the identified program modules, output and store dependence directed graphs of the identified dependent devices described in the identified program modules, output and store a collection of the identified program modules containing the identified dependent devices, extract and store a hierarchical relation of the identified program modules containing the identified dependent devices as dependence directed graphs, and process at least one of an AND, OR, and NOT logical operations using as arguments at least two of the stored cross-reference of the identified dependent devices, dependence directed graphs of the identified dependent devices, collection of the identified program modules and hierarchical relation of the identified program modules, thereby to improve efficiency of identifying devices and program modules affected by a change in the circuit diagram.

8. The program analysis support device according to claim 7, wherein it is assumed that one of analysis results designated as arguments of the logical operation is a collection of program modules, and the other of the analysis results is different from the collection of the program modules, when the different analysis result is a cross-reference of devices, the outputting and storing the collection of the program modules outputs a collection of program modules present in the cross-reference of the devices, when the different analysis result is a dependence directed graph of a device, the outputting and storing the collection of the program modules extracts a collection of program modules present in the dependence directed graph of the device, when the different analysis result is a directed graph of a hierarchical relation of a program module, the outputting and storing the collection of the program modules outputs a collection of program modules present in the directed graph of the hierarchical relation of the program module, in this manner, both the analysis results are set as the collection of the program modules, and assuming that one of the analysis results is the cross-reference of the device, and the other of the analysis results is different from the cross-reference of the devices, when the different analysis result is a dependence directed graph of a device, a signal is extracted that provides a cross-reference of devices being present in the dependence directed graph of the device, when the different analysis result is a directed graph of a hierarchical relation of a program module, a signal is extracted that gives a cross-reference of devices present in a program module present in the directed graph of the hierarchical relation of the program module, in this manner, both the analysis results are set as a cross-reference of devices, in this state, processing of the logical operation is performed.

9. The program analysis support device according to claim 8, wherein the microprocessor inputs the program analysis condition as a form of a conditional equation having a unique equation number, the conditional equation includes
at least one of a conditional equation that extracts a signal that provides a cross-reference of the devices,
a conditional equation that outputs a signal that provides dependence directed graphs of the devices,
a conditional equation that extracts a signal that provides a hierarchical relation of the plurality of program modules as a dependence directed graph, and
a conditional equation that processes a logical operation of the analysis results.

10. The program analysis support device according to claim 9, wherein the microprocessor causes a display device to display a cross-reference of the devices, when a processing result, such as an analysis result or a logical operation result of the conditional equation, is the cross-reference of the devices, dependence directed graphs of the devices, when the analysis result or the logical operation result is the dependence directed graphs of the devices, a collection of the program modules, when the analysis result or the logical operation result is the collection of the plurality of program modules, a directed graph of the hierarchical relation of the plurality of program modules, when the analysis result or the logical operation result is the directed graph of a hierarchical relation of the plurality of program modules, and the analysis results in units of analysis results of the conditional equations.

11. The program analysis support device according to claim 8, wherein
the microprocessor converts a form of the input program analysis condition into a form of a conditional equation having a unique equation number to execute input processing, and wherein
the conditional equation includes
at least one of a conditional equation that extracts a signal that provides a cross-reference of the devices,
a conditional equation that outputs a signal that provides dependence directed graphs of the devices,
a conditional equation that outputs a signal that provides a collection of the plurality of program modules,
a conditional equation that extracts a signal that provides a hierarchical relation of the plurality of program modules as a dependence directed graph, and
a conditional equation that processes a logical operation of the analysis results.

12. The program analysis support device according to claim 11, wherein the microprocessor causes a display device to display
a cross-reference of the devices, when a processing result, such as an analysis result or a logical operation result of the converted conditional equation, is the cross-reference of the devices,
dependence directed graphs of the devices, when the analysis result or the logical operation result is the dependence directed graphs of the devices,
a collection of the program modules, when the analysis result or the logical operation result is the collection of the plurality of program modules,
a directed graph of the hierarchical relation of the plurality of program modules, when the analysis result or the logical operation result is the directed graph of a hierarchical relation of the plurality of program modules, and
the analysis results in units of analysis results of the converted conditional equations.

13. The program analysis support device according to claim 7, wherein
the microprocessor inputs the program analysis condition as a form of a conditional equation having a unique equation number,
the conditional equation includes
at least one of a conditional equation that extracts a signal that provides a cross-reference of the devices,
a conditional equation that outputs a signal that provides dependence directed graphs of the devices,
a conditional equation that extracts a signal that provides a hierarchical relation of the plurality of program modules as a dependence directed graph, and
a conditional equation that processes a logical operation of the analysis results.

14. The program analysis support device according to claim 13, wherein the microprocessor causes a display device to display
a cross-reference of the devices, when a processing result, such as an analysis result or a logical operation result of the conditional equation, is the cross-reference of the devices,
dependence directed graphs of the devices, when the analysis result or the logical operation result is the dependence directed graphs of the devices,
a collection of the program modules, when the analysis result or the logical operation result is the collection of the plurality of program modules,
a directed graph of the hierarchical relation of the plurality of program modules, when the analysis result or the logical operation result is the directed graph of a hierarchical relation of the plurality of program modules, and
the analysis results in units of analysis results of the conditional equations.

15. The program analysis support device according to claim 7, wherein
the microprocessor converts a form of the input program analysis condition into a form of a conditional equation having a unique equation number to execute input processing, and wherein
the conditional equation includes
at least one of a conditional equation that extracts a signal that provides a cross-reference of the devices,
a conditional equation that outputs a signal that provides dependence directed graphs of the devices,
a conditional equation that outputs a signal that provides a collection of the plurality of program modules,
a conditional equation that extracts a signal that provides a hierarchical relation of the plurality of program modules as a dependence directed graph, and
a conditional equation that processes a logical operation of the analysis results.

16. The program analysis support device according to claim 15, wherein the microprocessor causes a display device to display
a cross-reference of the devices, when a processing result, such as an analysis result or a logical operation result of the converted conditional equation, is the cross-reference of the devices,
dependence directed graphs of the devices, when the analysis result or the logical operation result is the dependence directed graphs of the devices,
a collection of the program modules, when the analysis result or the logical operation result is the collection of the plurality of program modules,
a directed graph of the hierarchical relation of the plurality of program modules, when the analysis result or the logical operation result is the directed graph of a hierarchical relation of the plurality of program modules, and
the analysis results in units of analysis results of the converted conditional equations.

* * * * *